US012659899B2

(12) United States Patent
Ryu et al.

(10) Patent No.: US 12,659,899 B2
(45) Date of Patent: Jun. 16, 2026

(54) METHOD AND APPARATUS FOR INDICATING TIMING ADVANCE IN COMMUNICATION SYSTEM

(71) Applicant: Samsung Electronics Co., Ltd., Gyeonggi-do (KR)

(72) Inventors: Hyunseok Ryu, Gyeonggi-do (KR); Jeongho Yeo, Gyeonggi-do (KR); Younsun Kim, Gyeonggi-do (KR); Youngbum Kim, Gyeonggi-do (KR); Cheolkyu Shin, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 449 days.

(21) Appl. No.: 18/016,140

(22) PCT Filed: Jul. 13, 2021

(86) PCT No.: PCT/KR2021/008977
§ 371 (c)(1),
(2) Date: Jan. 13, 2023

(87) PCT Pub. No.: WO2022/015019
PCT Pub. Date: Jan. 20, 2022

(65) Prior Publication Data
US 2023/0254795 A1     Aug. 10, 2023

(30) Foreign Application Priority Data
Jul. 16, 2020     (KR) ........................ 10-2020-0088388

(51) Int. Cl.
*H04W 56/00*     (2009.01)
*H04W 84/06*     (2009.01)

(52) U.S. Cl.
CPC ........ *H04W 56/0045* (2013.01); *H04W 84/06* (2013.01)

(58) Field of Classification Search
CPC ............. H04W 56/0045; H04W 84/06; H04W 72/231; H04W 72/21; H04W 8/24;
(Continued)

(56) References Cited

U.S. PATENT DOCUMENTS 11,864,142 B2 *  1/2024  Cheng ................... H04L 1/1812
12,309,730 B2 *  5/2025  Tsai ..................... H04W 56/005
(Continued)

FOREIGN PATENT DOCUMENTS

JP        2022-549939        11/2022
WO    WO 2020/121497         6/2020
(Continued)

OTHER PUBLICATIONS

PCT/ISA/210 Search Report issued on PCT/KR2021/008977, Oct. 5, 2021 pp. 3.
(Continued)

*Primary Examiner* — Bailor C Hsu
(74) *Attorney, Agent, or Firm* — The Farrell Law Firm, P.C.

(57)     ABSTRACT

The present disclosure relates to: a communication technique for merging IoT technology with a 5G communication system for supporting a higher data transmission rate beyond a 4G system, and a system therefor. The present disclosure can be applied to intelligent services (for example, smart homes, smart buildings, smart cities, smart cars or connected cars, healthcare, digital education, retail businesses, security- and safety-related services, etc.) on the basis of 5G communication technology and IoT-related technology. Disclosed are a method and apparatus in which a terminal performs satellite communication.

16 Claims, 46 Drawing Sheets

(58) Field of Classification Search

CPC ........... H04W 56/0005; H04W 56/001; H04W 72/1268; H04B 7/1855

See application file for complete search history.

(56)                     References Cited

U.S. PATENT DOCUMENTS

| | | | | |
|---|---|---|---|---|
| 2014/0204919 A1* | 7/2014 | Chen | .................... | H04B 7/2681 |
| | | | | 370/336 |
| 2019/0150125 A1* | 5/2019 | Bagheri | ................ | H04L 69/324 |
| | | | | 370/336 |
| 2021/0105761 A1* | 4/2021 | Cheng | ................... | H04L 5/0053 |
| 2022/0086780 A1* | 3/2022 | Tsai | .................... | H04W 56/006 |
| 2022/0095258 A1* | 3/2022 | Yeo | ................... | H04W 56/0045 |
| 2022/0124795 A1* | 4/2022 | Wu | ................... | H04W 56/0045 |
| 2022/0217790 A1 | 7/2022 | Qiu et al. | | |
| 2023/0117959 A1* | 4/2023 | Tripathi | ............ | H04W 56/0045 |
| | | | | 370/328 |
| 2023/0133633 A1* | 5/2023 | Park | .................. | H04W 56/0015 |
| | | | | 370/331 |

FOREIGN PATENT DOCUMENTS

| | | |
|---|---|---|
| WO | WO 2021/062666 | 4/2021 |
| WO | WO 2021/230718 | 11/2021 |

OTHER PUBLICATIONS

PCT/ISA/237 Written Opinion issued on PCT/KR2021/008977, Oct. 5, 2021 pp. 4.

Nokia et al., "Doppler Compensation, Uplink Timing Advance and Random Access in NTN", R1-1913017, 3GPP TSG RAN WG1 #99, Reno, USA, Nov. 9, 2019, p. 30.

Ericsson, "On NTN synchronization, random access, and timing advance", R1-1910982, 3GPP TSG RAN WG1 #98bis, Chongqing, China, Oct. 5, 2019, pp. 23.

ZTE, "Summary#3 of 7.2.5.3 on UL timing and PRACH for NTN", R1-1909782, 3GPP TSG RAN WG1 #98, Prague, CZ, Sep. 3, 2019, pp. 15.

Mediatek Inc., "Delay-tolerant re-transmission mechanisms in NR-NTN", R1-1904646, 3GPP TSG RAN WG1 #96bis, Xi'an, China, Mar. 29, 2019, pp. 7.

Thales et al., "On Doppler shift compensation and Timing Advance in NTN", R1-1907390, 3GPP TSG RAN WG1 #97, Reno, USA, May 3, 2019, pp. 31.

ZTE, Summary of 7.2.5.3 on UL Timing and PRACH for NTN, R1-1911284, 3GPP TSG RAN WG1 #98bis, Oct. 14-20, 2019, 12 pages.

European Search Report dated Nov. 17, 2023 issued in counterpart application No. 21843542.8-1206, 12 pages.

Panasonic, "Timing Advance and RACH Aspect for NTN", R1-1908818, 3GPP TSG RAN WG1 #98, Aug. 26-30, 2019, 12 pages.

ZTE, "Summary of 7.2.5.3 on UL Timing and Prach", R1-1907750, 3GPP TSG RAN WG1 #97, May 13-17, 2019, 12 pages.

Japanese Office Action dated May 13, 2025 issued in counterpart application No. 2023-503061, 7 pages.

ZTE, "Discussion on the Enchancement for TA in NTN", R1-1901841, 3GPP TSG RAN WG1 #96, Feb. 25-Mar. 1, 2019, 2 pages.

Korean Office Action dated Feb. 28, 2026 issued in counterpart application No. 10-2020-0088388, 5 pages.

* cited by examiner

FIG. 5

| Orbit type | Height | Period |
|------------|--------|--------|
| LEO | 500~1000 km | 90~120 min |
| MEO | 5000~15000 km | Approx 6 hours |
| GEO | Approx 36,000 km | Approx 24 hours |

Communications on the move

Realize mobile communication service in ship and airplane

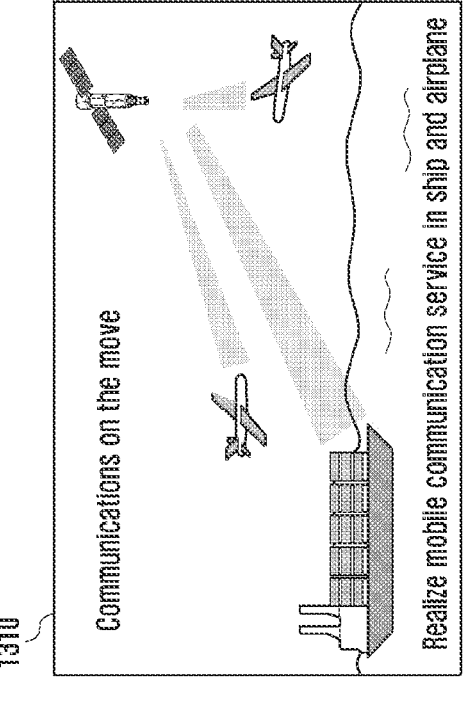

1330

Remote area backhauling

Realize wireless backhaul by combining base station and terminals supporting satellite communication

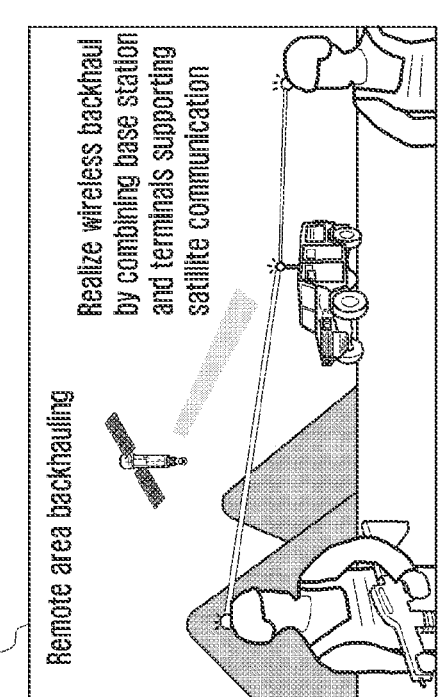

1300

Personal emergency service

Implement satellite-terminal direct communication function in smartphone

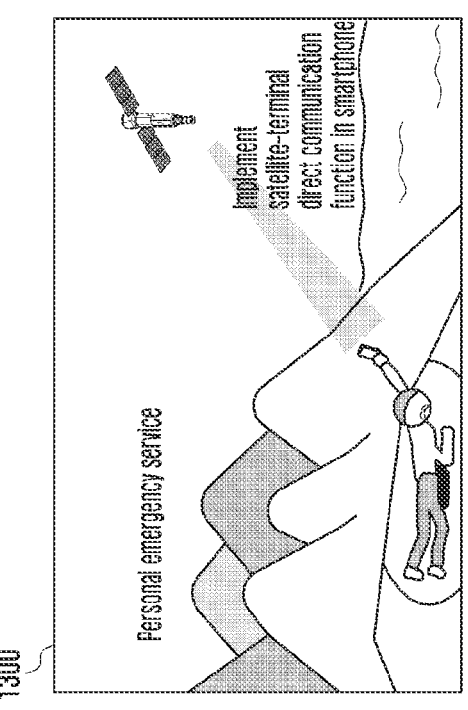

1320

Enterprise service

Perform real-time track/control of ship/truck/drone without border restriction

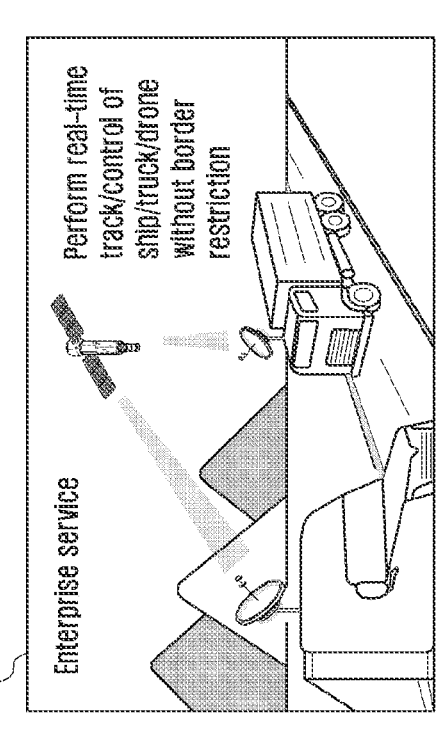

- Case: LEO 1200, uplink

| Freq [GHz] | 2 |
|---|---|
| bandwidth [MHz] | 0.36 |
| SNR [dB] | -2.63 |
| SIR [dB] | 2.0 |
| SINR [dB] | -3.92 |
| MCS index | 2 |
| required repetition | 0 |
| TBS [bits] | 56 |
| TTI [ms] | 0.5 |
| approx. throughput | 112 kbps |

Thermal Noise = -119.1 dBm

Noise figure: 5 dB

Achievable SNR -2.63 dB

Rx antenna gain 30 dBi

- Free space path loss: 164.5 dB
- Atmospheric path loss: 0.1 dB
- Shadowing margin: 3 dB
- Scintillation loss: 2.2 dB
- Additional loss: 0 dB Path los 169.8 dB

LEO 1,200 km

EIRP: 23 dBm

| Case: GEO, uplink | |
|---|---|
| Freq [GHz] | 2 |
| bandwidth [MHz] | 0.36 |
| SNR [dB] | -10.8 |
| SIR [dB] | 2.0 |
| SINR [dB] | -11 |
| gap to MCS [dB] | 4.8 |
| required repetition | 3.0 |
| TBS [bits] | 32 |
| TTI [ms] | 15 |
| approx. throughput | 21 kbps |

FIG. 16
● Link budget between UE and satellite
　• Path loss : (1600)
　　FSPL $(d, f_c) = 32.45 + 20 \log_{10}(f_c) + 20 \log_{10}(d)$
　• Rx antenna gain for UL : 24 dBi (LEO), 45.5 dBi (GEO)
● Link budget between UE and terrestrial gNB
　• Path loss (LOS) : (1610)
　　$PL_2 = 28.0 + 40 \log_{10}(d_{3D}) + 20 \log_{10}(f_c) - 9 \log_{10}((d'_{BP})^2 + (h_{BS} - h_{UT})^2)$
　• Path loss (NLOS) : (1620)
　　$PL`_{UMa-NLOS} = 13.54 + 39.08 \log_{10}(d_{3D}) + 20 \log_{10}(f_c) - 0.6 (h_{UT} - 1.5)$
　• Rx antenna gain for UL : ~12 dBi
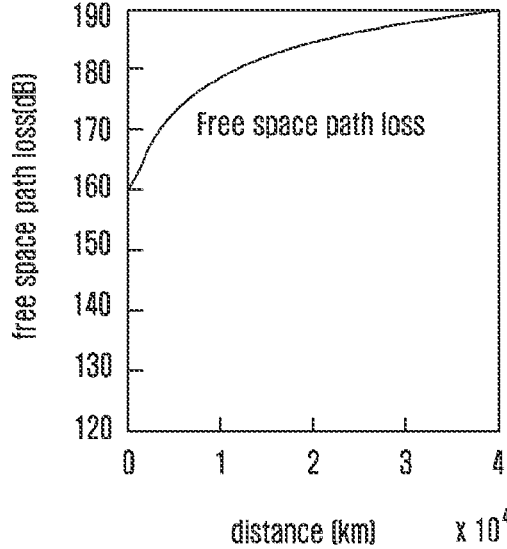
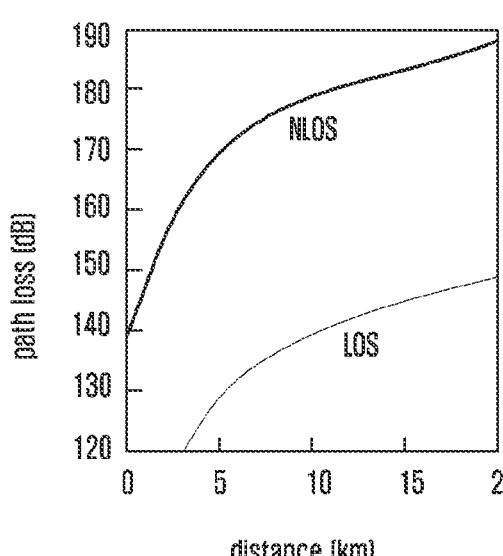

FIG. 17
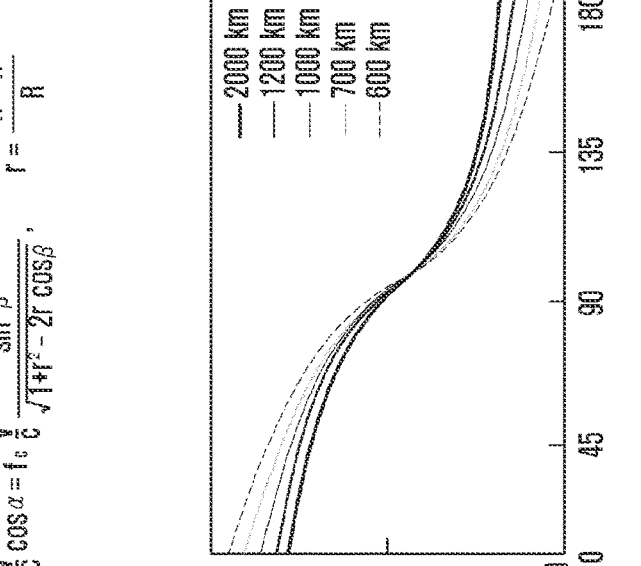
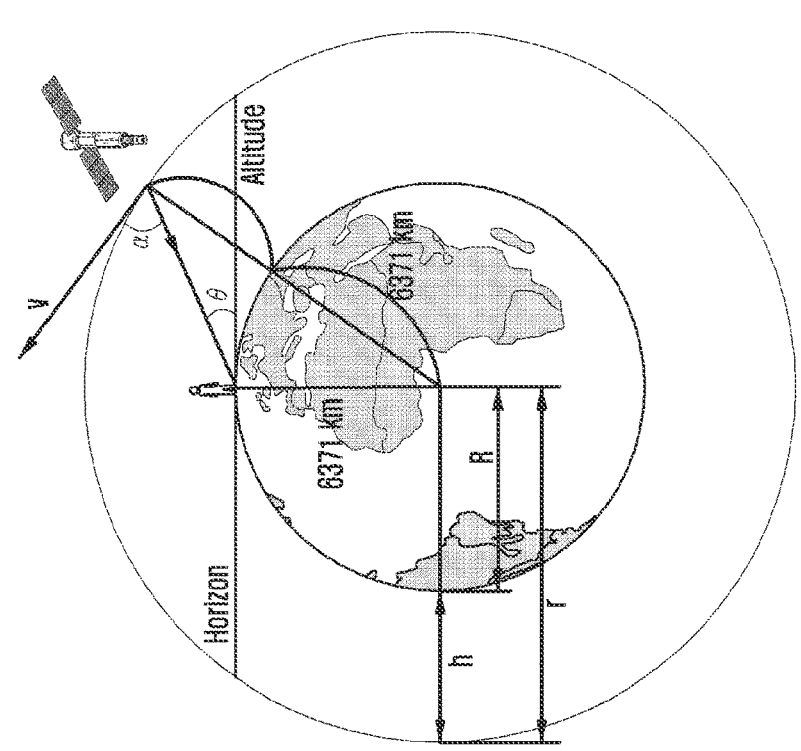

FIG. 20
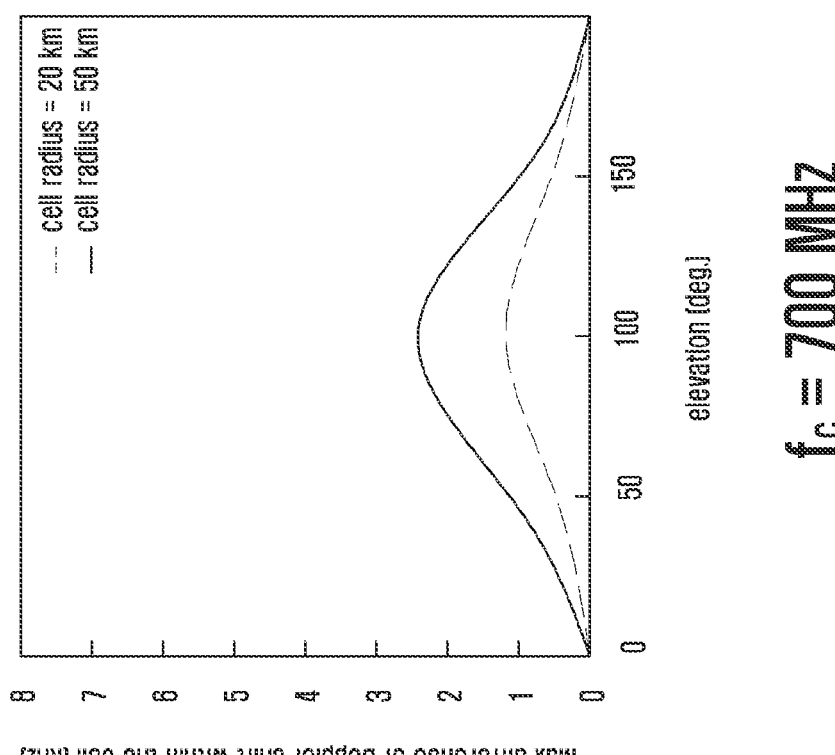
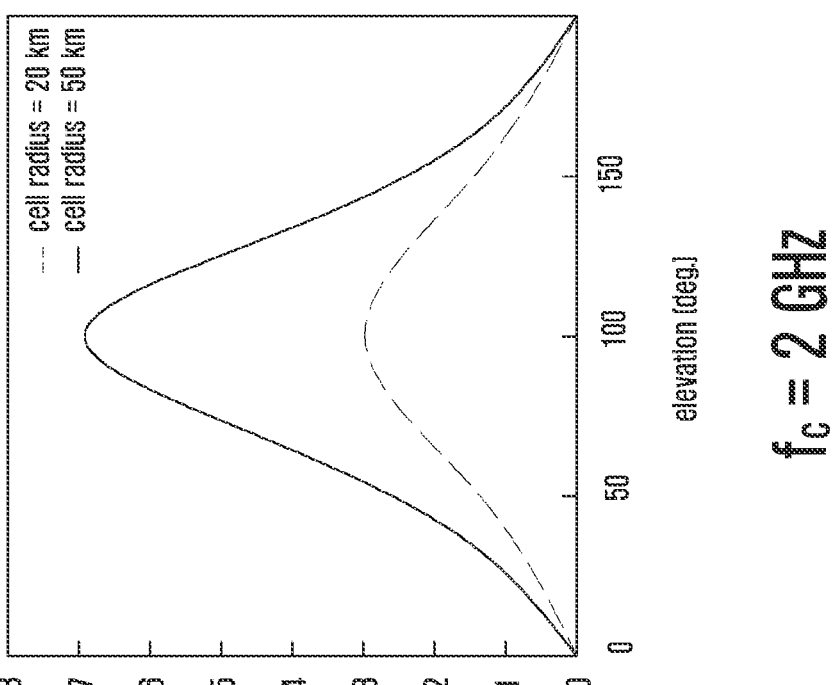

FIG. 21
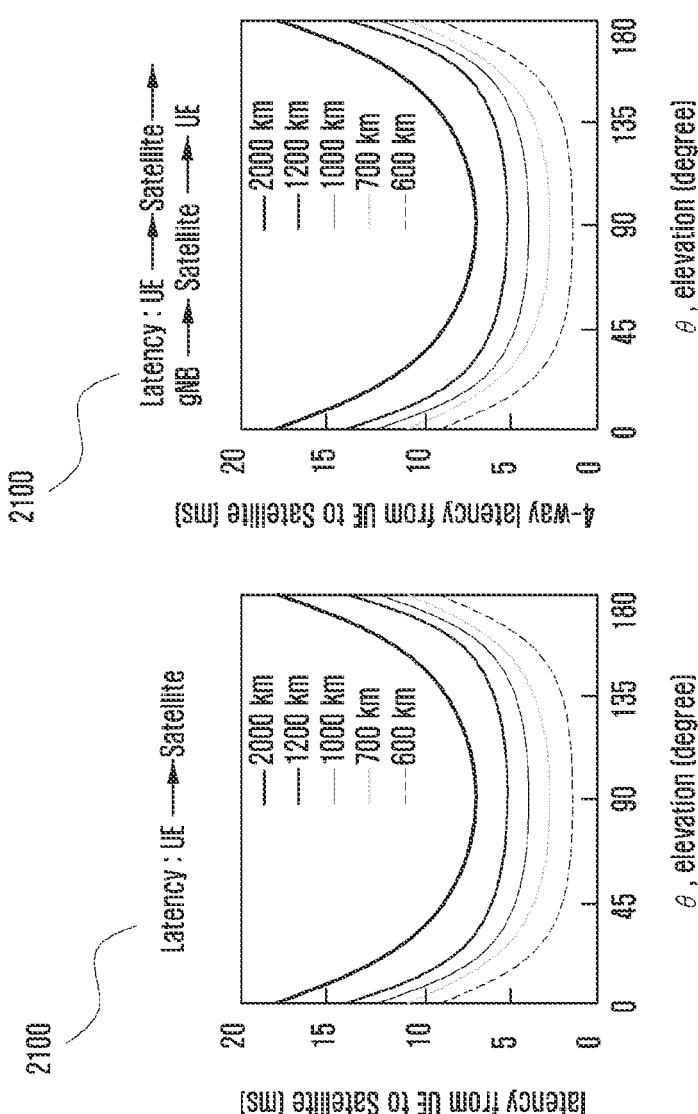
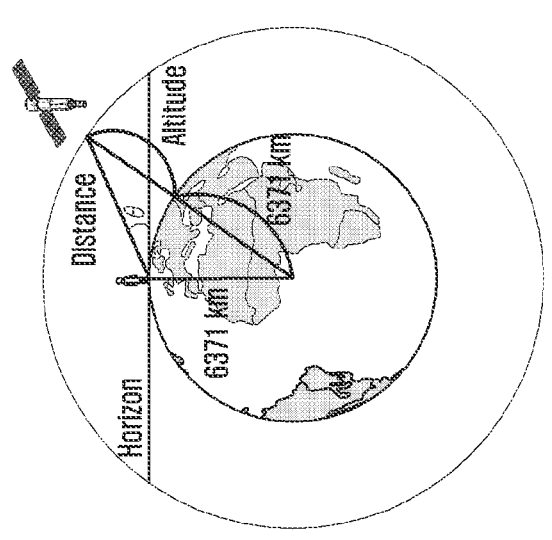

FIG. 27A

Solar Array 2700

Main mission antennas (L-band) 2710

Ka-band antennas (feeder link) 2720

Ka-band antennas (inter-satellite link) 2730

FIG. 28

| Terrestrial network | ~100 km | RTT = ~0.67 ms |
| Satellite network | Satellite in low orbit : ~2,000 km | |

Altitude of satellite 700 km

| Elevation angle $\theta$ | 0° | 45° | 90° | 135° | 180° |
|---|---|---|---|---|---|
| Distance between terminal and satellite, d | 3069 km | 945 km | 700 km | 945 km | 3069 km |
| Radio RTT between terminal and base station | 40.9 ms | 12.6 ms | 9.3 ms | 12.6 ms | 40.9 ms |

• Assume that distance between terminal and satellite and distance between satellite and base station distance are same

• Round-trip latency between terminal and base station = 2 X round-trip latency between terminal and satellite

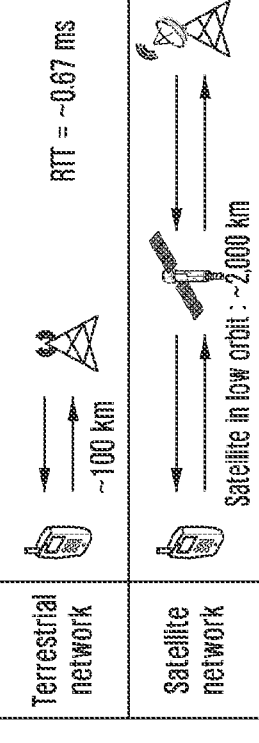

Horizon d 6371 km

Altitude

FIG. 29

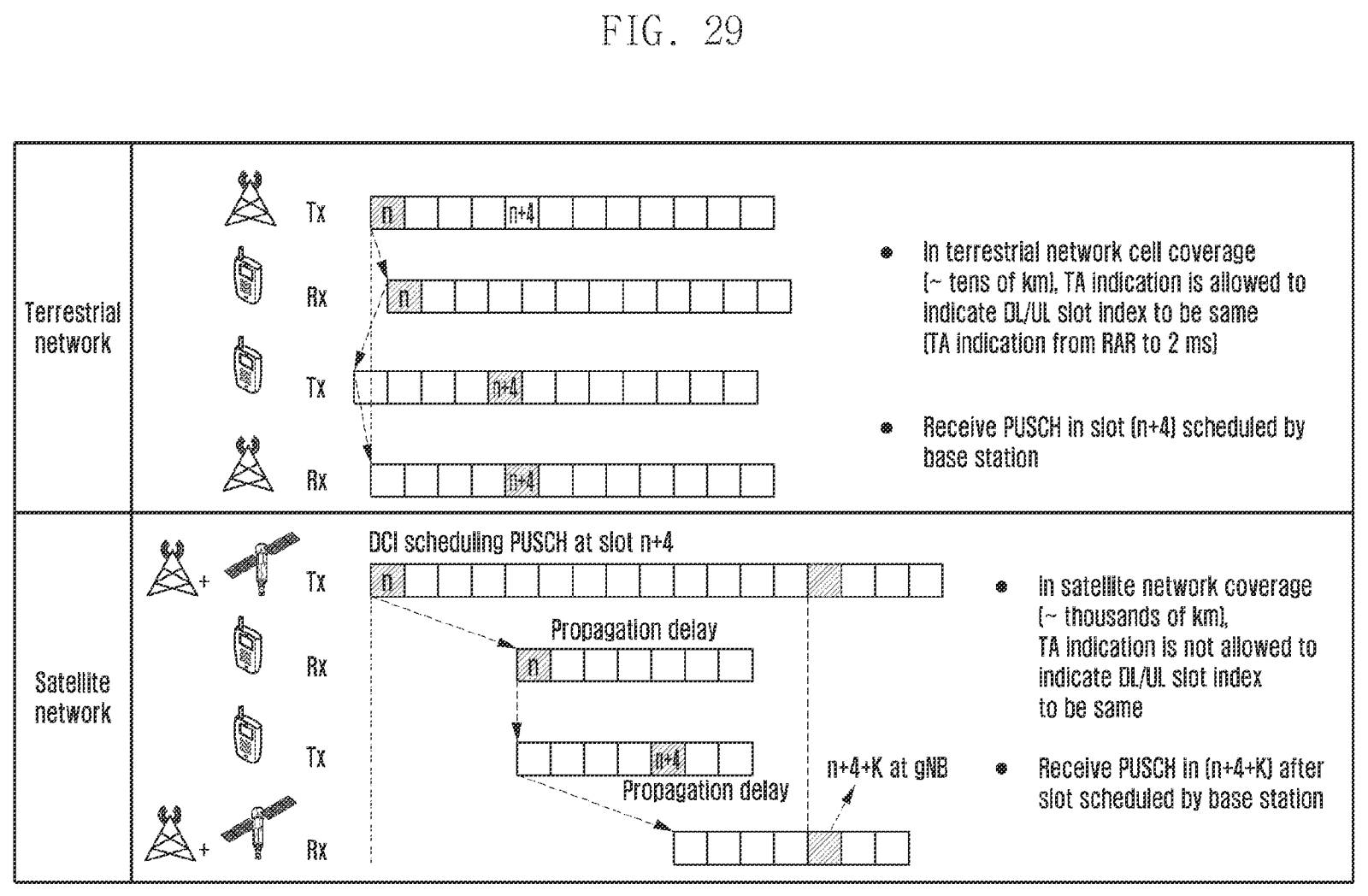

Terrestrial network

TX

RX

TX

RX

- In terrestrial network cell coverage (~ tens of km), TA indication is allowed to indicate DL/UL slot index to be same (TA indication from RAR to 2 ms)

- Receive PUSCH in slot (n+4) scheduled by base station

Satellite network

TX

RX

TX

RX

DCI scheduling PUSCH at slot n+4

Propagation delay

Propagation delay n+4+K at gNB

- In satellite network coverage (~ thousands of km), TA indication is not allowed to indicate DL/UL slot index to be same

- Receive PUSCH in (n+4+K) after slot scheduled by base station

| Terrestrial network | Cell radius | |
|---|---|---|
| Maximum RTT difference | 10 km | 0.067 ms |
| | 50 km | 0.33 ms |
| | 100 km | 0.67 ms |

| Satellite network | | Altitude of satellite 700km | |
|---|---|---|---|
| | Beam diameter | Elevation angle | |
| | | 0° | 90° |
| Maximum RTT difference | 50 km | 0.003 ms | 0.33 ms |
| | 100 km | 0.013 ms | 0.67 ms |
| | 1000 km | 1.17 ms | 6.67 ms |

| Altitude of satellite 700 km | | | | | |
|---|---|---|---|---|---|
| Time (second) | 0 | 200 | 400 | 600 | 800 |
| Elevation angle $\theta$ | 0° | 16.9° | 76.1° | 156.4° | 177.0° |
| Radio RTT between terminal and base station | 40.9 ms | 23.1 ms | 9.6 ms | 19.2 ms | 36.8 ms |

Movement of satellite along its trajectory
(846 seconds based on satellite in altitude of 700km)

FIG. 31B

METHOD AND APPARATUS FOR INDICATING TIMING ADVANCE IN COMMUNICATION SYSTEM

PRIORITY

This application is a National Phase Entry of PCT International Application No. PCT/KR2021/008977 which was filed on Jul. 13, 2021, and claims priority to Korean Patent Application No. 10-2020-0088388, which was filed on Jul. 16, 2020, the entire content of each of which is incorporated herein by reference.

TECHNICAL FIELD

The disclosure relates to a communication system and, more particularly, to a communication system in which, when a terminal transmits and receives a signal to and from a base station through a satellite, correction for time offset may be required due to a long distance between the terminal and the satellite. Accordingly, the disclosure provides a method and apparatus in which the base station indicates time offset information to the terminal and the terminal corrects the time offset by using the indicated information.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed. The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

In the late 2010s and early 2020s, as the cost of launching satellites has dramatically decreased, more companies have been trying to provide communication services through satellites. Accordingly, the satellite network has emerged as a next-generation network system for supplementing the existing terrestrial network. Although the satellite network does not provide a user experience at the level of the terrestrial network, the satellite network can provide communication services in an area in which it is difficult to establish a terrestrial network or in a disaster situation. As described in the above, economic feasibility is secured through a recent sharp reduction in the cost of launching satellites. Several companies and 3GPP organizational partners are also promoting direct communication between smartphones and satellites.

DISCLOSURE OF INVENTION

Technical Problem

In case that a terminal is to perform connection to a base station through a satellite, a large propagation delay occurs in the arrival of radio waves because of a long distance of hundreds of km, thousands of km, or more between the terminal and the satellite and between the satellite and the base station on the ground. Such a large propagation delay is much larger than that in a situation in which the terminal and the base station communicate directly in a terrestrial network.

Further, such a propagation delay changes according to time because the satellite is constantly moving. The propagation delay of all terminals with the satellite or the base station changes.

The disclosure relates to a communication system, and more particularly, provides a method and apparatus in which, when a terminal transmits and receives a signal to and from a base station through a satellite, the base station indicates time offset and the terminal corrects the time offset based on the indication, in order to correct a time-varying propagation delay occurring according to a long distance to the satellite and a movement of the satellite.

Solution to Problem

The disclosure has been made to address the above-mentioned problems, and to provide a method performed by a base station in a communication system, the method including:

transmitting information indicating a delay change rate to a terminal; and receiving an uplink signal transmitted by the terminal based on the delay change rate, wherein the information indicating the delay change rate is transmitted via higher layer signaling or L1 control information. In addition, the method further includes transmitting, to the terminal, information on at least one of a time point and a period in which the delay change rate is applied. Alternatively, the method further includes transmitting one or more pieces of TA loop configuration information to the terminal; and transmitting information on the TA value and a TA loop index to the terminal. The method further includes transmitting, to the terminal, information on a timing advance (TA) value through a system information block, wherein the information on the TA value includes at least one of first TA information common to a terminal group and second TA information indicated to a specific terminal. In addition, the method further includes transmitting one or more pieces of TA loop configuration information to the terminal; and transmitting information on the TA value and a TA loop index to the terminal.

In addition, provided is a method performed by a terminal in a communication system, the method including: receiving information indicating a delay change rate from a base station; identifying a delay to be applied based on the information indicating the delay change rate; and transmitting an uplink signal to the base station by applying the identified delay thereto, wherein the information indicating the delay change rate is transmitted via higher layer signaling or L1 control information. In addition, provided is a base station in a communication system, the base station including: a transceiver; and a controller which is connected to the transceiver and configured to perform control to transmit information indicating a delay change rate to a terminal, and receive an uplink signal transmitted by the terminal based on the delay change rate, wherein information indicating the delay change rate is transmitted via higher layer signaling or L1 control information.

In addition, provided is a terminal in a communication system, the terminal including: a transceiver; and a controller which is connected to the transceiver and configured to perform control to: receive information indicating a delay change rate from a base station; identify a delay to be applied based on the information indicating the delay change rate; and transmit an uplink signal to the base station by applying the identified delay thereto, wherein the information indicating the delay change rate is transmitted via higher layer signaling or L1 control information.

Advantageous Effects of Invention

According to the disclosure described above, a terminal may access a base station through a satellite, the base station indicates time offset to the terminal, and the terminal corrects the time offset, so as to enable effective transmission and reception of signals between the base station and the terminal.

BRIEF DESCRIPTION OF DRAWINGS

FIG. 5 illustrates an example of a process in which one transport block is divided into multiple code blocks and CRCs are added thereto;

FIG. 13 illustrates a utilization scenario of satellite-terminal direct communication;

FIG. 16 illustrates a path loss value according to a path loss model between a terminal and a satellite, and a path loss according to a path loss model between a terminal and a terrestrial base, station;

FIG. 17 illustrates equations for calculation of the amount of Doppler shift experienced by a signal, which is transmitted from a satellite and received by a terrestrial user according to an altitude and a location of the satellite, and a location of a terminal user on the ground, and results thereof;

FIG. 20 illustrates a difference in Doppler shift occurring in one beam according to the location of a satellite determined from an elevation angle;

FIG. 21 illustrates a latency taken from a UE to a satellite and a round trip latency among the UE, the satellite, and a base station according to the location of the satellite determined according to an elevation angle;

FIG. 27A illustrates an example of continuous movement of a satellite in a UE located on the ground or on the earth as the satellite revolves around the Earth along a satellite orbit;

FIG. 28 illustrates an example of a difference in propagation delay in a terrestrial network and propagation delay in a satellite network;

FIG. 29 illustrates an example of applying a timing advance in a terrestrial network and a satellite network;

FIG. 31B illustrates an example in which a plurality of UEs are located in one beam area provided by one satellite;

MODE FOR THE INVENTION

Figure 1:
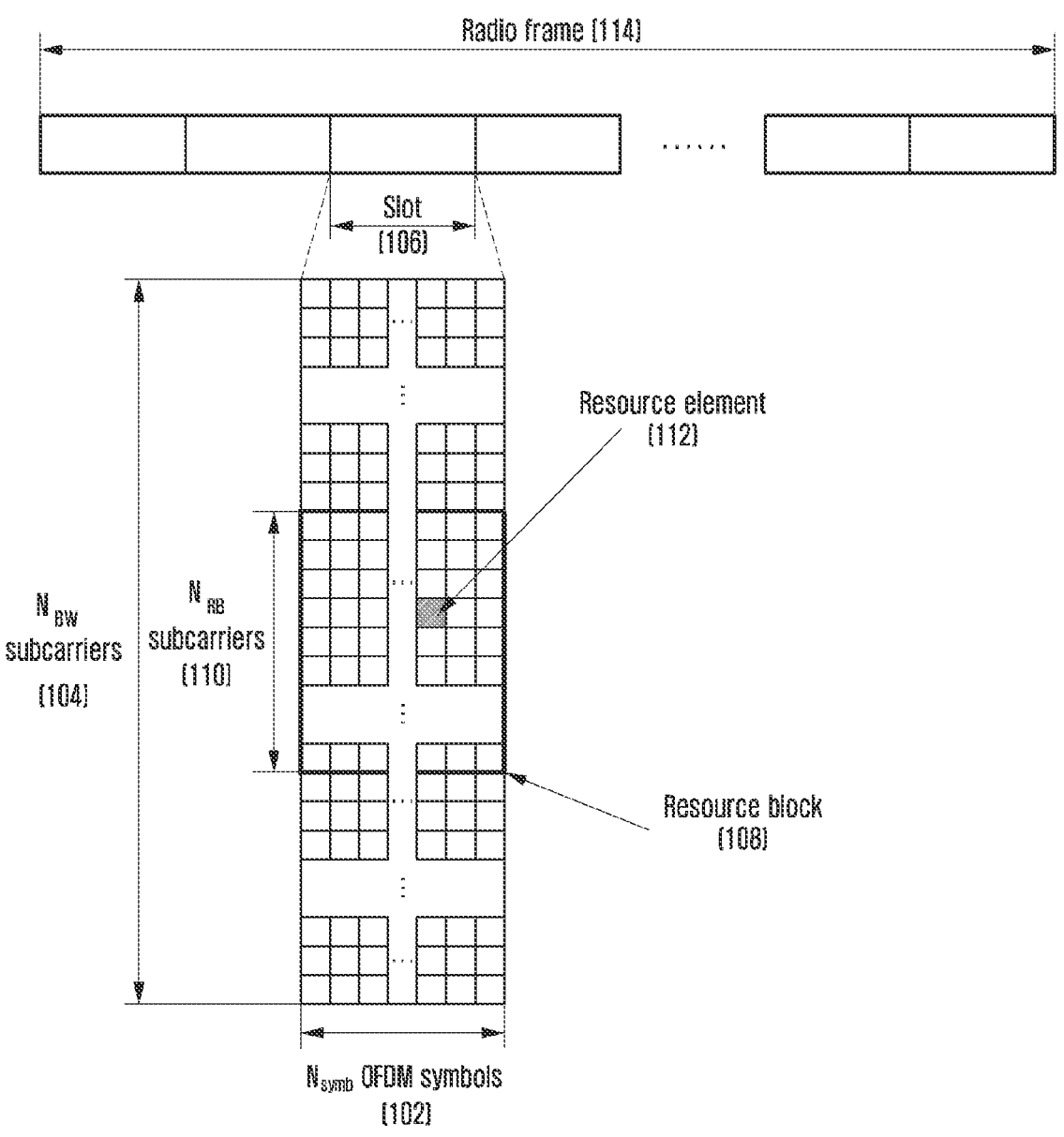
FIG. 1 illustrates a basic structure of a time-frequency domain, which is a radio resource domain in which data or a control channel is transmitted in a downlink or uplink in an NR system.

A new radio (NR) access technology that is new 5G communication is designed to allow various services to be freely multiplexed in time and frequency resources, and accordingly, waveform/numerology, reference signals, and the like may be dynamically or freely allocated according to the needs of a corresponding service. In wireless communication, data transmission that is optimized via measurement of a channel quality and interference amount is important to provide an optimal service to a terminal. Accordingly, it is requested to exactly measure a channel state. However, unlike 4G communication in which a channel and an interference characteristic are not sharply changed according to a frequency resource; in a case of a 5G channel, a channel and an interference characteristic are significantly changed according to services, and thus there is a need to support a frequency resource group (FRG) subset so as to separately measure the channel and the interference characteristic. Meanwhile, types of services that are supported in the NR system may be classified into categories including enhanced mobile broadband (eMBB), massive machine-type communication (mMTC), ultra-reliability low-latency communication (URLLC) services, or the like. The eMBB may be a service for high-speed transmission of a large amount of data, the mMTC may be a service for minimum power consumption of a UE and access of multiple UEs, and the URLLC may be a service for high reliability and low latency. Different requirements may be applied according to the types of services to be applied to a UE.

As such, a plurality of services may be provided to a user in a communication service, and in order to provide the user with the plurality of services, a method of providing the services according to respective characteristics in same time duration and an apparatus using the method are required. Hereinafter, embodiments of the disclosure will be described in detail with reference to the accompanying drawings.

In describing the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services. Furthermore, as 5G wireless communication systems, 5G or new radio (NR) communication standards are under development.

As a typical example of the broadband wireless communication system, an NR system employs an orthogonal frequency division multiplexing (OFDM) scheme in a downlink (DL) and an uplink (UL). More specifically, the NR system employs a cyclic-prefix OFDM (CP-OFDM) scheme in a downlink and employs two schemes, that is, a discrete Fourier transform spreading OFDM (DFT-S-OFDM) scheme, as well as the CP-OFDM scheme, in an uplink. The uplink indicates a radio link through which a user equipment (UE) (or a mobile station (MS)) transmits data or control signals to a base station (BS) (or gNode B), and the downlink indicates a radio link through which the base station transmits data or control signals to the UE. The above multiple access schemes separate data or control information of respective users by allocating and operating time-frequency resources for transmitting the data or control information for each user so as to avoid overlapping each other, that is, so as to establish orthogonality.

The NR system adopts a hybrid automatic repeat request (HARQ) scheme of retransmitting data through a physical layer when a decoding failure occurs in initial transmission. The HARQ scheme indicates that, when a receiver fails to correctly decode data, the receiver transmits decoding failure indication information (e.g., negative acknowledgement (NACK)) to a transmitter so as to allow the transmitter to retransmit the data through the physical layer. The receiver may combine the data, which is retransmitted by the transmitter, with data previously failed in decoding, thereby increasing data reception performance. Further, when the receiver correctly decodes the data, the transmitter transmits decoding success indication information (e.g., acknowledgement (ACK)) to the transmitter so as to allow the transmitter to transmit new data.

FIG. 1 illustrates a basic structure of a time-frequency domain, which is a radio resource domain in which data or a control channel is transmitted via uplink or downlink in an NR system.

In FIG. 1, the horizontal axis indicates a time domain and the vertical axis indicates a frequency domain. In the time domain, the minimum transmission unit is an OFDM symbol, and $N_{symb}$ number of OFDM symbols 102 constitute one slot 106. The length of a subframe may be defined as 1.0 ms, and the length of a radio frame 114 may be defined as 10 ms. In the frequency domain, the minimum transmission unit is a subcarrier, and the bandwidth of the entire system transmission band may be configured by a total of New subcarriers 104. 1 frame may be defined as 10 ms. 1 subframe may be defined as 1 ms, and accordingly, 1 frame may be configured by a total of 10 subframes. 1 slot may be defined as 14 OFDM symbols (that is, the number of symbols per slot $$\left(N_{symb}^{slot}\right) = 14\right).$$

Figure 2:
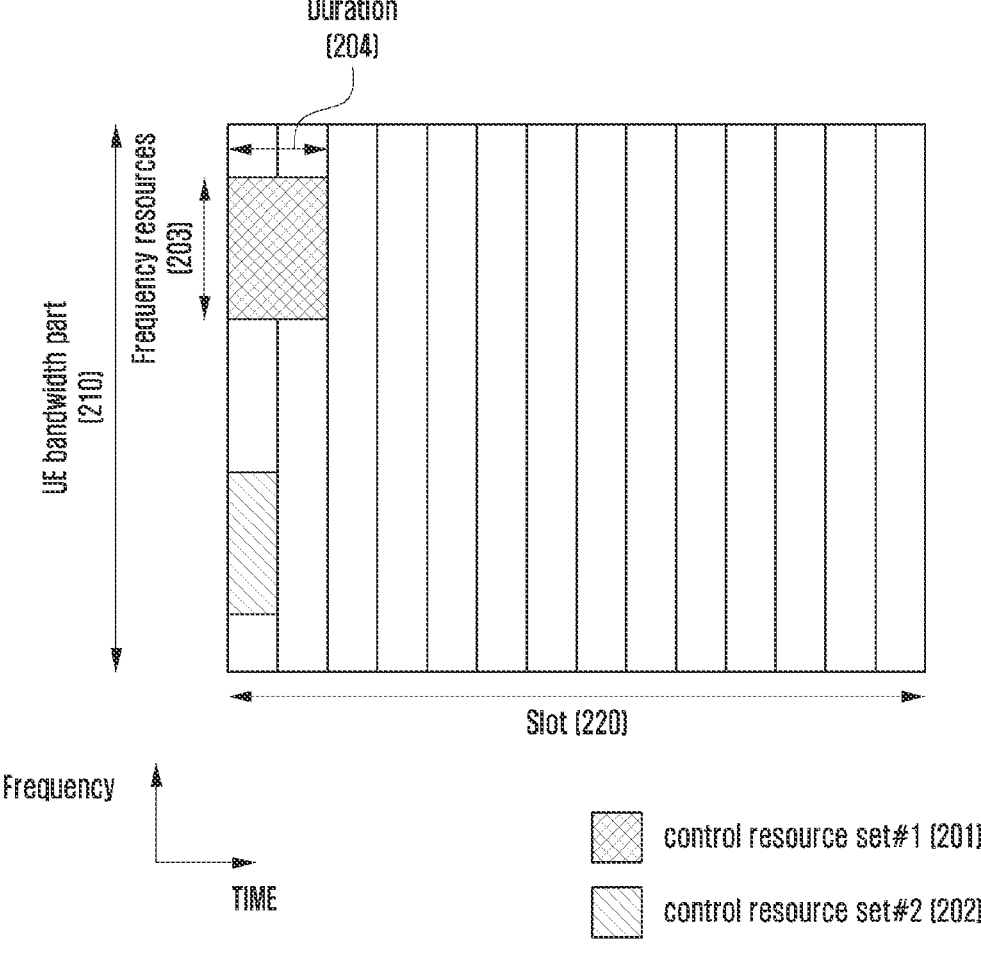
FIG. 2 illustrates a control resource set in which a downlink control channel is transmitted in a 5G wireless communication system.

1 subframe may be configured by one or multiple slots, and the number of slots per 1 subframe may differ according to configuration value μ for a subcarrier spacing. In the example of FIG. 2, a case in which the subcarrier spacing configuration value μ has a value of '0' (μ=0) and a case in which the subcarrier spacing configuration value μ has a value of '1' (μ=1) are illustrated. In a case of μ=0, 1 subframe may include 1 slot, and in a case of μ=1, 1 subframe may include two slots. That is, the number of slots per 1 subframe $$\left(N_{slot}^{subframe,\mu}\right)$$

may differ according to a subcarrier spacing configuration value μ, and accordingly, the number of slots per one frame $$\left(N_{slot}^{frame,\mu}\right)$$

may differ. The $$N_{slot}^{subframe,\mu}$$

and the $$N_{slot}^{frame,\mu}$$

according to each subcarrier spacing configuration μ may be defined as [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80- | 8 |
| 4 | 14 | 160 | 16 |

A UE before radio resource control (RRC) connection may be configured with an initial bandwidth part (initial BWP) for initial access from a base station through a master information block (MIB). More specifically, the UE may receive configuration information about a search apace and a control resource set (CORESET) through which the physical downlink control channel (PDCCH) for reception of system information required for initial access (may correspond to remaining system information (RMSI) or system information block 1 (SIB 1) through the MIB at the initial access stage. The control resource set (CORESET) and search space, which are configured through the MIB, may be regarded as identity (ID) 0, respectively. The base station may notify the UE of configuration information, such as frequency allocation information, time allocation information, and numerology for the control resource set #0 through the MIB. In addition, the base station may notify the UE of configuration information regarding the monitoring periodicity and occasion for the control resource set #0, that is, configuration information regarding the search space #0, through the MIB. The UE may regard the frequency domain configured as the control resource set #0, obtained from the MIB, as an initial BWP for initial access. Here, the identifier (ID) of the initial BWP may be regarded as zero.

The MIB may include the following pieces of information.

```
-- ASN1START
-- TAG-MIB-START
MIB :=                  SEQUENCE {
    system FrameNumber      BIT STRING (SIZE (6)),
    subCarrierSpacingCommon  ENUMERATED {scs15or60,
scs30or120},
    ssb-SubcarrierOffset     INTEGER (0..15),
    dmrs-TypeA-Position      ENUMERATED {pos2, pos3},
    pdcch-ConfigSIB1         PDCCH-ConfigSIB1,
    cellBarred               ENUMERATED {barred, notBarred},
    intraFreqReselection     ENUMERATED {allowed, notAllowed},
    spare                    BIT STRING (SIZE (1))
}
-- TAG-MIB-STOP
-- ASN1STOP
```

MIB field descriptions cellBarred

Value barred means that the cell is barred, as defined in TS 38.304 [20].

dmrs-TypeA-Position

Position of (first) DM-RS for downlink (see TS 38.211 [16], clause 7.4.1.1.2) and uplink (see TS 38.211 [16], clause 6.4.1.1.3).

intraFreqReselection

Controls cell selection/reselection to intra-frequency cells when the highest ranked cell is barred, or treated as barred by the UE, as specified in TS 38.304 [20].

pdcch-ConfigSIB1

Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213 [13], clause 13).

ssb-SubcarrierOffset

Corresponds to kSSB (see TS 38.213 [13]), which is the frequency domain offset between SSB and the overall resource block grid in number of subcarriers. (See TS 38.211 [16], clause 7.4.3.1). The value range of this field may be extended by an additional most significant bit encoded within PBCH as specified in TS 38.213 [13].

This field may indicate that this cell does not provide SIB1 and that there is hence no CORESET #0 configured in MIB (see TS 38.213 [13], clause 13). In this case, the field pdcch-ConfigSIB1 may indicate the frequency positions where the UE may (not) find a SS/PBCH with a control resource set and search space for SIB1 (see TS 38.213 [13], clause 13).

subCarrierSpacingCommon

Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 KHz.

systemFrameNumber

The 6 most significant bits (MSB) of the 10-bit System Frame Number (SFN). The 4 LSB of the SFN are conveyed in the PBCH transport block as part of channel coding (i.e., outside the MIB encoding), as defined in clause 7.1 in TS 38.212 [17].

In a method for configuring the BWP, the UEs before the RRC connection may receive configuration information about the initial bandwidth part through the master information block (MIB) in the initial connection operation. More specifically, the UE may be configured with a control region or control resource set (CORESET) for a downlink control channel through which downlink control information (DCI) for scheduling a system information block (SIB) can be transmitted from a MIB of a physical broadcast channel (PBCH). The bandwidth of the control resource set configured through the MIB may be regarded as the initial BWP. The UE may receive, through the configured initial BWP, a physical downlink shared channel (PDSCH) through which the SIB is transmitted. The initial BWP may be used for other system information (OSI), paging, and random access as well as the reception of the SIB.

When one or more BWPs have been configured for a UE, the base station may indicate the UE to switch the BWP by using a bandwidth part indicator field in DCI.

In the time-frequency domain, the basic unit of a resource is a resource element (RE) 112, which may be represented by an OFDM symbol index and a subcarrier index. A resource block (RB) 108 (or physical resource block (PRB)) may be defined as $N_{RB}$ 110 number of consecutive subcarriers 110 in the frequency domain. Generally, the minimum transmission unit of data is the RB unit. In an NR system, generally, $N_{symb}$ may be equal to 14, $N_{RB}$ may be equal to 12, and $N_{BW}$ may be proportional to the bandwidth of the system transmission band. A data rate increases in proportion to the number of RBs scheduled to a UE.

In the NR system, in a case of an FDD system operating the uplink and the downlink by distinguishing them according to frequency, a downlink transmission bandwidth and an uplink transmission bandwidth may be different from each other. A channel bandwidth indicates an RF bandwidth corresponding to the system transmission bandwidth. Table 2 and table 3 show part of a correspondence relationship between a system transmission bandwidth, a subcarrier spacing, and a channel bandwidth defined in the NR system in a frequency band lower than 6 GHz and a frequency band higher than 6 GHz, respectively. For example, an NR system having a 100 MHz channel bandwidth with a 30 kHz subcarrier width is configured by a transmission bandwidth of 273 RBs. Hereinafter, N/A may be a combination of a bandwidth and a subcarrier, which is not supported by the NR system.

TABLE 2

| | | | | | Configuration of frequency range 1 (FR1) | | | | | | | |
| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 108 | 133 | 180 | 216 | 270 | N/A | N/A | N/A | N/A |
| 30 | 11 | 24 | 38 | 51 | 85 | 78 | 106 | 133 | 182 | 217 | 245 | 273 |
| 60 | N/A | 11 | 18 | 24 | 31 | 38 | 51 | 65 | 79 | 107 | 121 | 135 |

TABLE 3

| Configuration of frequency range 2 (FR2) | | | | | |
|---|---|---|---|---|---|
| Channel bandwidth $BW_{Channel}$ [MHz] | Subcarrier spacing | 50 MHz | 100 MHz | 200 MHz | 400 MHz |
| Transmission bandwidth configuration $N_{RB}$ | 60 kHz | 66 | 132 | 264 | N/A |
| | 120 kHz | 32 | 66 | 132 | 264 |

In the NR system, the frequency range may be divided into FR1 and FR2 and defined as shown in Table 4 below.

TABLE 4

| Frequency range designation | Corresponding frequency range |
|---|---|
| FR1 | 450 MHz-7125 MHz |
| FR2 | 24250 MHz-52600 MHz |

In the above, the ranges of FR1 and FR2 may be changed and applied differently. For example, the frequency range of FR1 may be changed and applied from 450 MHz to 6000 MHz.

Next, a synchronization signal (SS)/PBCH block in 5G will be described.

The SS/PBCH block may refer to a physical layer channel block including a primary SS (PSS), a secondary SS (SSS), and a PBCH. Specifically, the SS/PBCH block is as follows:

PSS: may serve as a signal for a reference for downlink time/frequency synchronization and provide some information of a cell ID.

SSS: may serve as a reference for downlink time/frequency synchronization, and provide the remaining cell ID information that is not provided by the PSS. In addition, the SSS may serve as a reference signal for demodulation of the PBCH.

PBCH: may provide essential system information required for transmission or reception of a data channel and a control channel of a UE. The essential system information may include search space related control information indicating radio resource mapping information of a control channel, scheduling control information for a separate data channel for transmission of system information, and the like.

SS/PBCH block: the SS/PBCH block may include a combination of a PSS, an SSS, and a PBCH.

One or multiple SS/PBCH blocks may be transmitted within 5 ms, and each of the transmitted SS/PBCH blocks may be distinguished by indices.

The UE may detect the PSS and the SSS in the initial access operation, and may decode the PBCH.

The UE may obtain the MIB from the PBCH, and may be configured with the control resource set (CORESET) #0 (which may correspond to the control resource set having the CORESET index of 0) therefrom. The UE may monitor the control resource set #0 under the assumption that a demodulation reference signal (DMRS) transmitted in the selected SS/PBCH block and the control resource set #0 is quasi-co-located (QCLed). The UE may receive system information based on downlink control information transmitted from the control resource set #0. The UE may obtain, from the received system information, configuration information related to a random access channel (RACH) required for initial access. The UE may transmit a physical RACH (PRACH) to the base station by considering the selected SS/PBCH index, and the base station having received the PRACH may obtain information about an SS/PBCH block index selected by the UE. Through this process, the base station may know which block is selected among the SS/PBCH blocks by the UE, and may know that the control resource set #0 associated therewith is monitored.

Next, downlink control information (DCI) in a 5G system will be described in detail. In the 5G system, scheduling information about uplink data (or physical uplink shared channel (PUSCH)) or downlink data (or physical downlink shared channel (PDSCH)) is transmitted from a base station to a UE through DCI. The UE may monitor a fallback DCI format and a non-fallback DCI format with regard to the PUSCH or the PDSCH. The fallback DCI format may include a predefined fixed field between the base station and the UE, and the non-fallback DCI format may include a configurable field. In addition, there are various formats of DCI, and according to each format, whether DCI for power control or DCI for notifying of a slot format indicator (SFI), etc. may be indicated.

The DCI may be transmitted through a PDCCH which is a physical downlink control channel after performing channel coding and modulation processing thereon. A cyclic redundancy check (CRC) may be attached to a DCI message payload, and the CRC may be scrambled by a radio network temporary identifier (RNTI) corresponding to the identification information of the UE. Depending on the purpose of the DCI message, for example, a UE-specific data transmission, a power adjustment command, or a random access response, different RNTIs may be used. That is, the RNTI is not explicitly transmitted, but is included in a CRC calculation process and then transmitted. When receiving the DCI message transmitted through the PDCCH, the UE may check a CRC by using an assigned RNTI. When a CRC check result is correct, the UE may identify that the corresponding message has been transmitted to the UE. The PDCCH is mapped and transmitted in a control resource set (CORESET) configured for the UE.

For example, DCI for scheduling a PDSCH for system information (SI) may be scrambled by an SI-RNTI. DCI for scheduling a PDSCH for a random access response (RAR) message may be scrambled by a random access (RA)-RNTI. DCI for scheduling a PDSCH for a paging message may be scrambled by a paging (P)-RNTI. DCI for notifying of a slot format indicator (SFI) may be scrambled by an SFI-RNTI. DCI for notifying of transmit power control (TPC) may be scrambled by a TPC-RNTI. DCI for scheduling UE-specific PDSCH or PUSCH may be scrambled by a cell RNTI (C-RNTI).

DCI format 0_0 may be used as a fallback DCI for scheduling a PUSCH. Here, a CRC may be scrambled by a C-RNTI. The DCI format 0_0 in which the CRC is scrambled by the C-RNTI may include, for example, pieces of information below.

TABLE 5

Identifier for DCI formats - [1] bit

Frequency domain resource assignment – $\lceil \log_2(N_{RB}^{UL,BWP}(N_{RB}^{UL,BWP} + 1)2) \rceil$ bits Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled. PUSCH - [2] bits
Uplink/supplementary UL (UL/SUL) indicator - 0 or 1 bit DCI format 0_1 may be used as a non-fallback DCI for scheduling a PUSCH. Here, a CRC may be scrambled by a C-RNTI. DCI format 0_1 in which the CRC is scrambled by the C-RNTI may include, for example, pieces of information below.

TABLE 6

- Carrier indicator - 0 or 3 bits
- UL/SUL indicator - 0 or 1 bit
- Identifier for DCI formats - [1] bits
- Bandwidth part indicator - 0, 1 or 2 bits

TABLE 6-continued

- Frequency domain resource assignment

• For resource allocation type 0, $\lceil N_{RB}^{UL,BWP} / P \rceil$ bits

• For resource allocation type 1, $\lceil \log_2(N_{RB}^{UL,BWP}(N_{RB}^{UL,BWP} + 1)/2) \rceil$ bits

- Time domain resource assignment -1, 2, 3, or 4 bits
- VRB-to-PRB mapping (virtual resource block-to-physical resource block mapping) - 0 or 1 bit, only for resource allocation type 1.
  • 0 bit if only resource allocation type 0 is configured;
  • 1 bit otherwise.
- Frequency hopping flag - 0 or 1 bit, only for resource allocation type 1.
  • 0 bit if only resource allocation type 0 is configured.
  • 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
  • 1 bit for semi-static HARQ-ACK codebook;
  • 2 bits for dynamic HARQ-ACK codebook with single HARQ-ACK codebook.
- 2nd downlink assignment index - 0 or 2 bits
  • 2 bits for dynamic HARQ-ACK codebook with two HARQ-ACK sub-codebooks;
  • 0 bit otherwise.
- TPC command for scheduled PUSCH - 2 bits

- SRS resource indicator - $\left\lceil \log_2 \left( \sum_{k=1}^{L_{max}} \binom{N_{SRS}}{k} \right) \right\rceil$ or $\lceil \log_2(N_{SRS}) \rceil$ bits

• $\left\lceil \log_2 \left( \sum_{k=1}^{L_{max}} \binom{N_{SRS}}{k} \right) \right\rceil$ bits for non-codebook based PUSCH transmission;

•$\lceil \log(N_{SRS}) \rceil$ bits for codebook based PUSCH transmission.

- Precoding information and number of layers -up to 6 bits
- Antenna ports - up to 5 bits
- SRS request - 2 bits

TABLE 6-continued

- CSI request - 0, 1, 2, 3, 4, 5, or 6 bits
- Code block group (CBG) transmission information - 0, 2, 4, 6, or 8 bits
- PTRS-DMRS association (Phase tracking reference signal-demodulation reference signal association)- 0 or 2 bits.
- beta_offset indicator - 0 or 2 bits
- Demodulation reference signal (DMRS) sequence initialization - 0 or 1 bit DCI format 1_0 may be used as a fallback DCI for scheduling a PDSCH. Here, a CRC may be scrambled by a C-RNTI. DCI format 1_0 in which the CRC is scrambled by the C-RNTI May include, for example, the following pieces of information below.

TABLE 7

- Identifier for DCI formats - [1] bit

– Frequency domain resource assignment – $\left[\left\lceil \log_2\left(N_{RB}^{DL,BWP}\left(N_{RB}^{DL,BWP}+1\right)/2\right)\right\rceil\right]$ bits

- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator- 3 bits
- PDSCH-to-HARQ feedback timing indicator- [3] bits DCI format 1_1 may be used as a non-fallback DCI for scheduling a PDSCH. Here, a CRC may be scrambled by a C-RNTI. DCI format 1_1 in which the CRC is scrambled by the C-RNTI may include, for example, pieces of information below.

TABLE 8

- Carrier indicator - 0 or 3 bits
- Identifier for DCI formats - [1] bits
- Bandwidth part indicator - 0, 1 or 2 bits
- Frequency domain resource assignment

• For resource allocation type 0, $\left\lceil N_{RB}^{DL,BWP}/P\right\rceil$ bits

• For resource allocation type 1, $\left\lceil \log_2\left(N_{RB}^{DL,BWP}\left(N_{RB}^{DL,BWP}+1\right)/2\right)\right\rceil$ bits

- Time domain resource assignment -1, 2, 3, or 4 bits
- VRB-to-PRB mapping - 0 or 1 bit, only for resource allocation type 1.
    • 0 bit if only resource allocation type 0 is configured;
    • 1 bit otherwise.
- PRB bundling size indicator - 0 or 1 bit
- Rate matching indicator - 0, 1, or 2 bits
- ZP CSI-RS trigger - 0, 1, or 2 bits
For transport block 1:
- Modulation and coding scheme - 5 bits
- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ feedback timing indicator - 3 bits
- Antenna ports - 4, 5 or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit Hereinafter, a method of allocating time domain resources for a data channel in a 5G communication system will be described.

A base station may configure, for a UE, a table for time-domain resource allocation information for a downlink data channel (PDSCH) and an uplink data channel (PUSCH) via higher layer signaling (e.g., RRC signaling). With regard to PDSCH, a table including maxNrofDL-Allocations=16 entries may be configured, and with regard to PUSCH, a table including maxNrofUL-Allocations=16 entries may be configured. The time-domain resource allocation information may include PDCCH-to-PDSCH slot timing (corresponding to a time interval in slot units between a timing at which a PDCCH is received and a timing at which a PDSCH scheduled by the received PDCCH is transmitted, and denoted by K0), PDCCH-to-PUSCH slot timing (corresponding to a time interval in slot units between a timing at which a PDCCH is received and a timing at which a PUSCH scheduled by the received PDCCH is transmitted, and denoted by K2), information on the position and length of a start symbol in which the PDSCH or PUSCH is scheduled within a slot, a mapping type of PDSCH or PUSCH, and the like. For example, information such as [Table 9] and [Table 10] below may be notified of from the base station to the UE.

TABLE 9

PDSCH-TimeDomainResourceAllocationList information element
PDSCH-TimeDomainResourceAllocationList ::=  SEQUENCE (SIZE(1..maxNrofDL-Allocations)) OF PDSCH-TimeDomainResourceAllocation
PDSCH-TimeDomainResourceAllocation ::=  SEQUENCE {
    k0 INTEGER(0..32) OPTIONAL, -- Need S
    (PDCCH-to-PDSCH timing, in units of slot)
    mappingType  ENUMERATED {typeA, typeB},
    (PDSCH mapping type)
    startSymbol AndLength                    INTEGER (0..127)
    (Start symbol and length of PDSCH)
}

TABLE 10

PUSCH-TimeDomainResourceAllocation information element
PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation :=  SEQUENCE {
    k2 INTEGER(0..32) OPTIONAL, -- Need S
    (PDCCH-to-PUSCH timing, in units of slot)
    mappingType  ENUMERATED {typeA, typeB},
    (PUSCH mapping type)
    startSymbolAndLength  INTEGER (0..127)
    (Start symbol and length of PUSCH)
}

The base station may notify one of the entries in the above-described table representing the time-domain resource allocation information to the UE via L1 signaling (e.g., DCI) (e.g., may be indicated by a "time-domain resource allocation" field in DCI). The UE may acquire time-domain resource allocation information for the PDSCH or PUSCH based on the DCI received from the base station.

Hereinafter, a downlink control channel in a 5G communication system will be described in more detail with reference to the drawings.

FIG. 2 illustrates an example of a control resource set in which a downlink control channel is transmitted in a 5G wireless communication system. FIG. 2 illustrates an example in which a UE bandwidth part 210 is configured in a frequency axis and two control resource sets (control resource set #1 201 and control resource set #2 220) are configured in 1 slot 220 in a time domain. The control resource sets 201 and 220 may be configured in a specific frequency resource 203 within the entire UE BWP 210 in the frequency axis. The control resource set may be configured with one or multiple OFDM symbols in the time axis, and this may be defined as a control resource set duration 204. Referring to an example illustrated in FIG. 2, the control resource set #1 201 is configured with the control resource set duration of two symbols, and the control resource set #2 220 is configured with the control resource set duration of one symbol.

The above described control resource set in the 5G system may be configured for the UE by the base station via higher layer signaling (e.g., system information, master information block (MIB), or radio resource control (RRC) signaling). The configuration of the control resource set for the UE may be understood as providing information such as a control resource set identity, a frequency location of the control resource set, a symbol length of the control resource set, and the like. The higher layer signaling may include, for example, pieces of information of Table 11 below.

TABLE 11

```
ControlResourceSet ::= SEQUENCE {
Corresponds to L1 parameter 'CORESET-ID'
controlResourceSetId ControlResourceSetId,
(control resource set Identity)
frequency DomainResources BIT STRING (SIZE (45)),
(frequency domain resource allocation information)
duration INTEGER (1..maxCoReSetDuration),
(time domain resource allocation information)
cce-REG-MappingType CHOICE {
(CCE-to-REG mapping type)
Interleaved SEQUENCE {
reg-BundleSize ENUMERATED {n2, n3, n6},
(REG bundle size)
precoderGranularity ENUMERATED {sameAsREG-bundle,
allContiguousRBs},
interleaverSize ENUMERATED {n2, n3, n6}
(interleaver size)
shiftIndex INTEGER(0..maxNrofPhysicalResourceBlocks-1) OPTIONAL
(interleaver shift (Shift))
},
nonInterleaved NULL
},
tci-StatesPDCCH SEQUENCE (SIZE (1..maxNrofTCI-StatesPDCCH)) OF
TCI-StateId OPTIONAL,
(QCL configuration information)
tci-PresentInDCI ENUMERATED {enabled} OPTIONAL, -- Need S
}
```

In Table 11, tci-StatesPDCCH (simply referred to as transmission configuration indication (TCI) state) configuration information may include information about one or more synchronization signal (SS)/physical broadcast channel (PBCH) block (that is, synchronization signal block (SSB)) indices having a quasi-co-located (QCLed) relationship with a DMRS transmitted in the corresponding control resource set or a channel state information reference signal (CSI-RS) index. For example, each control information included in DCI format 1_1 that is scheduling control information (DL grant) for downlink data may be as follows.

Carrier indicator: indicates on which carrier the data scheduled by DCI is transmitted—0 or 3 bits Identifier for DCI formats: indicates DCI format, and specifically, is an indicator for distinguishing whether the corresponding DCI is for downlink or uplink.—[1] bits Bandwidth part indicator: indicates if there is a change in the bandwidth part—0, 1, or 2 bits Frequency domain resource assignment: is resource allocation information indicating frequency domain resource allocation, and a resource expressed varies depending on whether the resource allocation type is 0 or 1.

Time domain resource assignment: is resource allocation information indicating time domain resource allocation, and may indicate one configuration of a predetermined PDSCH time domain resource allocation list or higher layer signaling—1, 2, 3, or 4 bits VRB-to-PRB mapping: indicates a mapping relationship between a virtual resource block (VRB) and a physical resource block (PRB)—0 or 1 bit PRB bundling size indicator: indicates the physical resource block bundling size assuming that the same precoding is applied—0 or 1 bit Rate matching indicator: indicates a rate match group to be applied, among rate match groups configured via a higher layer applied to the PDSCH—0, 1, or 2 bits ZP CSI-RS trigger: triggers a zero power channel state information reference signal—0, 1, or 2 bits Transport block (TB)-related configuration information: indicates a modulation and coding scheme (MCS), a new data indicator (NDI), and a redundancy version (RV) for one or two TBs.

Modulation and coding scheme (MCS): indicates a modulation scheme and a coding rate used for data transmission. That is, MCS may indicate a coding rate value capable of indicating TBS and channel coding information together with information on whether it is QPSK, 16QAM, 64QAM, or 256QAM.

New data indicator: indicates whether HARQ initial transmission or retransmission.

Redundancy version: indicates a redundancy version of HARQ.

HARQ process number: indicates the HARQ process number applied to a PDSCH—4 bits Downlink assignment index: indicates an index for generating a dynamic HARQ-ACK codebook when reporting HARQ-ACK for PDSCH—0 or 2 or 4 bits TPC command for scheduled PUCCH: indicates power control information applied to PUCCH for HARQ-ACK report for PDSCH—2 bits PUCCH resource indicator: is information indicating the resource of PUCCH for HARQ-ACK report for PDSCH—3 bits PDSCH-to-HARQ_feedback timing indicator: indicates configuration information on which slot the PUCCH for HARQ-ACK report for PDSCH is transmitted—3 bits Antenna ports: indicates information indicating an antenna port of a PDSCH DMRS and a DMRS CDM group in which the PDSCH is not transmitted—4, 5 or 6 bits Transmission configuration indication: information indicating beam related information of PDSCH—0 or 3 bits SRS request: information requesting SRS transmission—2 bits CBG transmission information: information indicating which code block group (CBG) data is transmitted through a PDSCH when code block group-based retransmission is configured—0, 2, 4, 6, or 8 bits CBG flushing out information: information indicating whether an earlier received code block group by a UE can be used for HARQ combining—0 or 1 bit DMRS sequence initialization: indicates the DMRS sequence initialization parameter—1 bit In the above, in a case of data transmission through PDSCH or PUSCH, time domain resource assignment may be performed via information about a slot in which a PDSCH/PUSCH is transmitted, a start symbol position S in the corresponding slot, and the number L of symbols to which the PDSCH/PUSCH is mapped. In the above, S may be a relative position from the start of a slot, L may be the number of consecutive symbols, and S and L may be determined based on a start and length indicator value (SLIV) defined by Equation (1) as follows.

$$[Equation\ 1]$$

$$\begin{aligned} &\text{if } (L-1) \leq 7 \text{ then} \\ &\qquad SLIV = 14 \cdot (L-1) + S \\ &\text{else} \\ &\qquad SLIV = 14 \cdot (14 - L + 1) + (14 - 1 - S) \\ &\text{where } 0 < L \leq 14 - S \end{aligned}$$

In the NR system, the UE may receive, through RRC configuration, configuration in which an SLIV value, a PDSCH/PUSCH mapping type, and information on a slot in which a PDSCH/PUSCH is transmitted are included in one row (for example, the information may be configured in the form of a table). Subsequently, in the time domain resource assignment of the DCI, by indicating an index value in the table configured as above, a base station may transmit, to a UE, the SLIV value, the PDSCH/PUSCH mapping type, and information on the slot in which the PDSCH/PUSCH is transmitted.

In the NR system, the PDSCH mapping type is defined by type A and type B. In the PDSCH mapping type A, the first symbol among DMRS symbols is located at the second or the third OFDM symbol in a slot. In the PDSCH mapping type B, the first symbol of DMRS symbol is located at the first OFDM symbol in a time domain resource assigned via PUSCH transmission. The downlink data may be transmitted through a PDSCH serving as a physical channel for downlink data transmission. The PDSCH may be transmitted after a control channel transmission interval, and scheduling information such as a specific mapping position and modulation scheme in the frequency domain is determined based on DCI transmitted through the PDCCH.

Via an MCS in the control information included in the DCI, a base station may report the modulation scheme applied to a PDSCH to be transmitted to a UE, and the size (transport block size (TBS)) of data to be transmitted. In an embodiment, the MCS may be configured by 5 bits or more or fewer bits. The TBS corresponds to a size before channel coding for error correction is applied to data (transport block, TB) to be transmitted by a base station.

In the disclosure, a transport block (TB) may include a medium access control (MAC) header, a MAC control element (CE), one or more MAC service data units (SDUs), and padding bits. Alternatively, the TB may indicate the unit of data, which is dropped from a MAC layer to a physical layer, or a MAC protocol data unit (MAP PDU).

The modulation scheme supported by the NR system are quadrature phase shift keying (QPSK), 16 quadrature amplitude modulation (16 QAM), 64 QAM, and 256 QAM. Modulation orders (Qm) of the QPSK, 16 QAM, 64 QAM, and 256 QAM correspond to 2, 4, 6, and 8, respectively. That is, 2 bits per symbol in a case of QPSK modulation, 4 bits per symbol in a case of 16 QAM modulation, 6 bits per symbol in a case of 64 QAM modulation, and 8 bits per symbol in a case of 256 QAM modulation may be transmitted.

Figure 3:
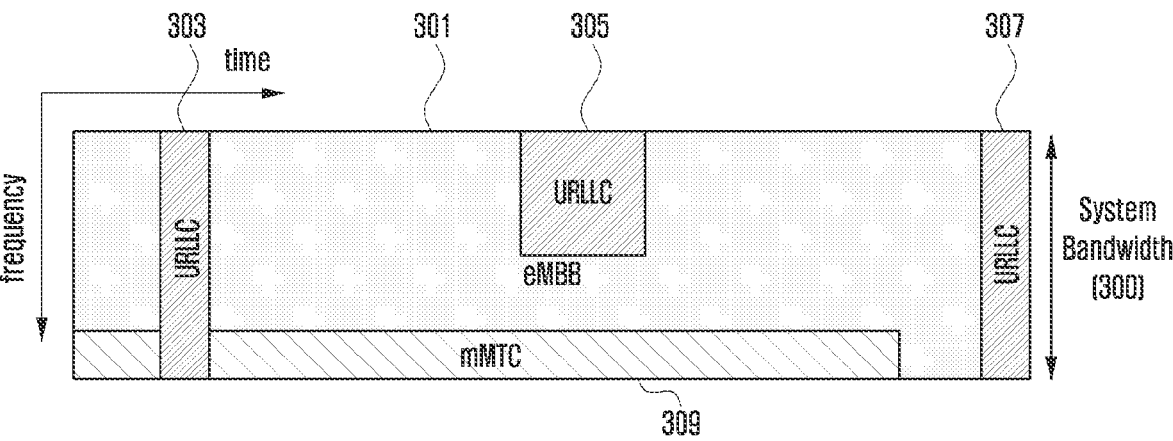
FIG. 3 illustrates an example in which eMBB, URLLC, and mMTC data are allocated in an entire system frequency band.
Figure 4:
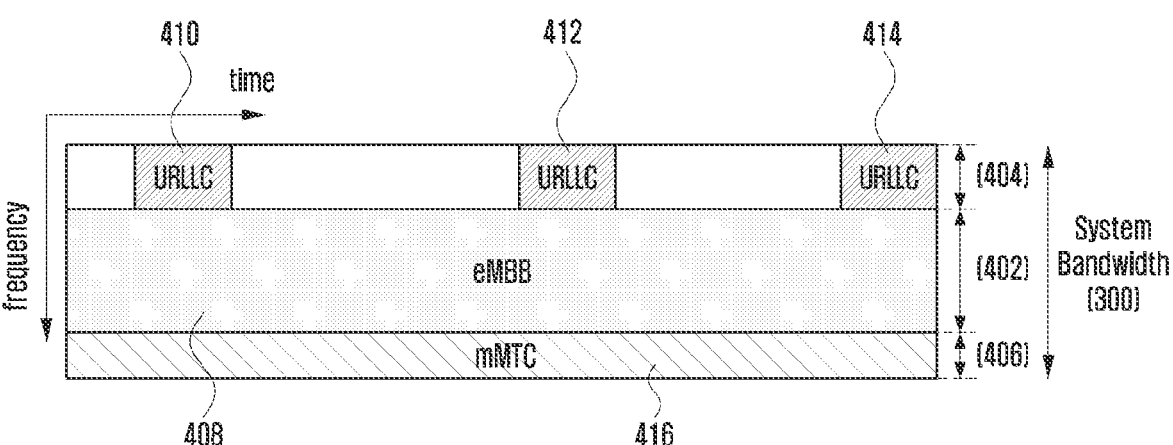
FIG. 4 illustrates an example in which eMBB, URLLC, and mMTC data are allocated in a divided system frequency band.

FIGS. 3 and 4 illustrate an example in which pieces of data for eMBB, URLLC, and mMTC, which are services considered in the 5G or NR system, are allocated in frequency-time resources.

Referring to FIGS. 3 and 4, there may be identified a scheme in which frequency and time resources are allocated for performing information transmission in each system.

FIG. 3 illustrates an example in which eMBB, URLLC, and mMTC data are allocated in the entire system frequency bandwidth. First, FIG. 3 illustrates an aspect in which eMBB, URLLC, and mMTC data are allocated in the entire system frequency bandwidth 300. In the middle of allocation and transmission of eMBB 301 and mMTC 309 in a specific frequency bandwidth, if URLLC data 303, 305, and 307 occur and transmission thereof is thus necessary, the URLLC data 303, 305, and 307 may be transmitted without emptying the portion in which the eMBB 301 and the mMTC 309 have been already allocated and without transmitting the same. Since the URLLC needs to reduce a latency in the middle of service, URLLC data 303, 305, and 307 may be allocated to a portion of the resource 301 to which the eMBB is allocated, and thus may be transmitted. In a case where URLLC is additionally allocated and transmitted in the resource to which the eMBB is allocated, eMBB data may not be transmitted in an overlapping frequency-time resource, and accordingly, the transmission performance of the eMBB data may be lowered. That is, in the above case, eMBB data transmission failure due to URLLC allocation may occur.

FIG. 4 illustrates an example in which the system frequency bandwidth is divided and eMBB, URLLC, and mMTC data are allocated to the divided frequency band. In FIG. 4, the entire system frequency bandwidth 400 may be divided into sub-bands 402, 404, and 406 and used for transmission of a service and data. Information associated with the sub-band configuration may be predetermined, and the information may be transmitted to a UE by a base station via higher layer signaling. Alternatively, the sub-bands may be randomly divided by a base station or a network node and services may be provided to the UE without transmitting separate sub-band configuration information. FIG. 4 illustrates that the sub-band 402 is used for eMBB data transmission, the sub-band 404 is used for URLLC data transmission, and the sub-band 406 is used for mMTC data transmission.

In order to explain a method and apparatus proposed in the embodiment, the terms "physical channel" and "signal", pertaining to the NR system may be used. However, details of the embodiment may be applied to a wireless communication system other than the NR system. Hereinafter, embodiments of the disclosure will be described in detail with reference to the accompanying drawings. In addition, in the description of the disclosure, if it is determined that a detailed description of a related function or configuration may unnecessarily obscure the subject matter of the disclosure, the detailed description thereof will be omitted. In addition, the terms to be described later are terms defined considering functions in the disclosure, which may vary according to intentions or customs of users and operators. Therefore, the definition should be made based on the content throughout this specification.

In the disclosure, a downlink (DL) refers to a wireless transmission path of a signal to be transmitted from a base station to a UE, and an uplink (UL) refers to a wireless transmission path of a signal to be transmitted from a UE to a BS.

Although the NR system is described as an example in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art.

In the disclosure, legacy terms of a physical channel and a signal may be interchangeably used with data or a control signal. For example, a PDSCH refers to a physical channel via which data is transmitted, but in the disclosure, the PDSCH may refer to data.

Hereinafter, in the disclosure, higher layer signaling refers to a method of transmitting a signal from a base station to a UE by using a DL data channel of a physical layer or transmitting a signal from the UE to the BS by using a UL data channel of a physical channel, and may also be referred to as RRC signaling or a MAC control element (MAC CE).

Figure 5:
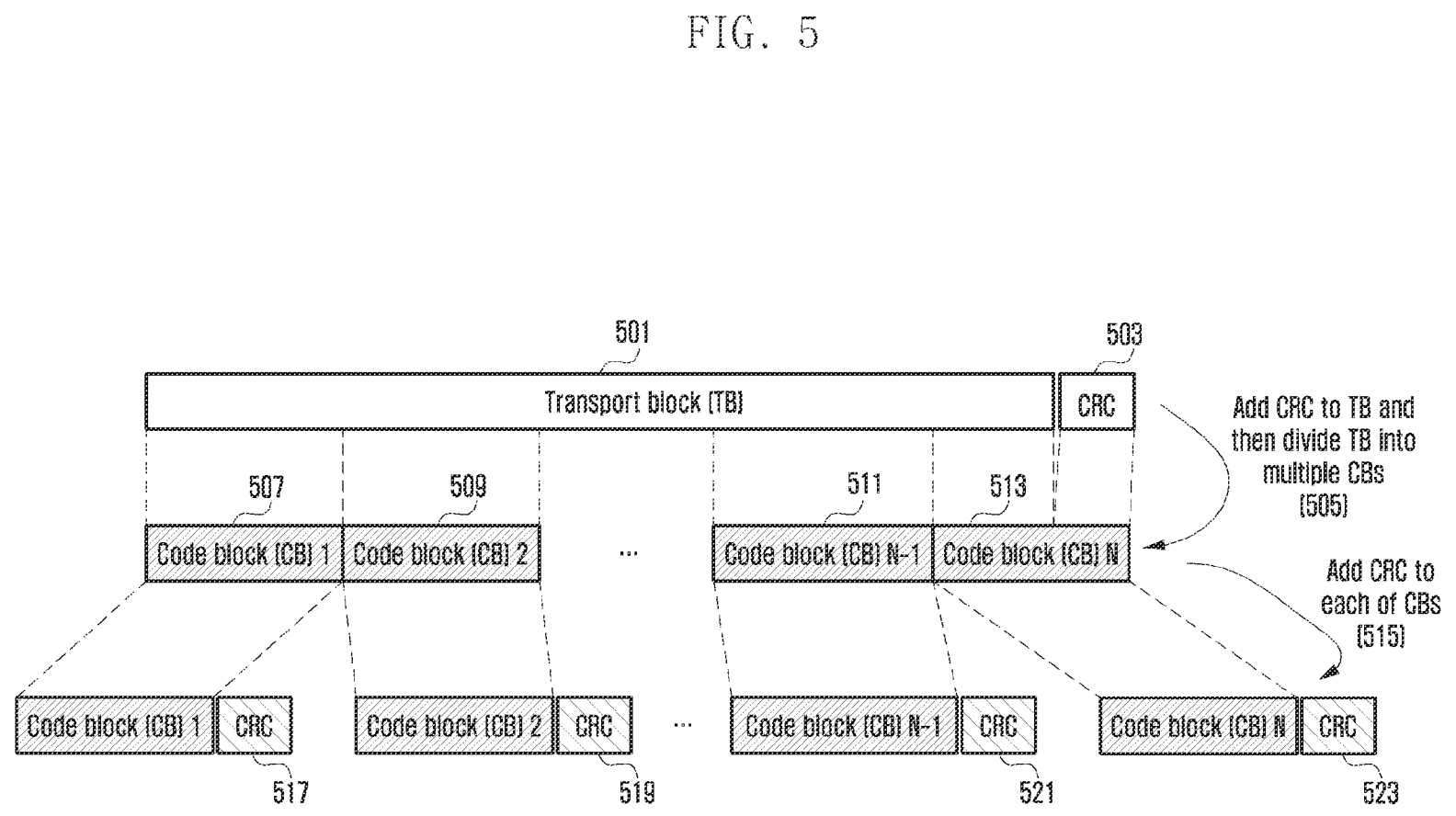

FIG. 5 illustrates an example of a procedure in which one transport block is divided into a plurality of code blocks and a CRC is added thereto.

Referring to FIG. 5, a CRC 503 may be added to the last or first part of one transport block (TB) 501 to be transmitted in an uplink or downlink transmission. The CRC 503 may have 16 bits, 25 bits, a previously fixed number of bits, or a variable number of bits depending on a channel condition, and may be used to determine whether channel coding is successful. A block including the TB 501 and the CRC 503 added thereto may be divided into a plurality of code blocks (CBs) 507, 509, 511, and 513 (indicated by reference numeral 505). Here, the CBs may be divided while having the predetermined maximum size, and in this case, the last CB 513 may be smaller than the other CBs 507, 509, and 511. However, this is only an example and according to another example, the last CB 513 may have the same length as those of the other CBs 507, 509, and 511 by inserting 0, 1, or any other random value to the last CB 513.

In addition, CRCs 517, 519, 521, and 523 may be respectively added to the CBs 507, 509, 511, and 513 (indicated by reference numeral 515). A CRC may have 16 bits, 24 bits, or a prefixed number of bits, and may be used in determination of whether channel coding is successful.

The TB 501 and cyclic generator polynomial may be used to generate the CRC 503, and the cyclic generator polynomial may be defined in various ways. For example, assuming that cyclic generator polynomial for a 24-bit CRC is $gCRC24A(D)=D^{24}+D^{23}+D^{18}+D^{17}+D^{14}+D^{11}+D^{10}+D^7+D^6+D^5+D^4+D^3+D+1$, and L=24, for TB data $a_0, a_1, a_2, \ldots, a_{A-1}$, CRC $p_0, p_1, p_2, \ldots, p_{L-1}$ may be determined to be a value with a remainder of 0 which is obtained by dividing $a_0 D^{A+23}+a_2 D^{A+22}+\ldots+a_{A-1}D^{24}+p_0D^{23}+p_1D^{22}+\ldots+p_{22}D^1+p_{23}$ by $gCRC24A(D)$. In the above example, it has been described assuming that the CRC length L is 24 as an example, but a CRC length L may be determined to be any of various lengths including 12, 16, 24, 32, 40, 48, 64, or the like.

After a CRC is added to a TB in the above procedure, the TB+CRC may be divided into N CBs 507, 509, 511, and 513. The CRC 517, 519, 521, and 523 may be respectively added to the divided CBs 507, 509, 511, and 513 (indicated by reference numeral 515). Compared to the CRC added to the TB, a CRC added to a CB may have a different length or different cyclic generator polynomial may be used to generate the CRC. In addition, the CRC 503 added to the TB, and the CRC 517, 519, 521, and 523 added to the CBs may be omitted according to a type of a channel code to be applied to a CB. For example, when an LDPC code, not a turbo code, is to be applied to the CBs, the CRCs 517, 519, 521, and 523 to be added to the CBs respectively may be omitted. However, even when the LDPC is applied, the CRCs 517, 519, 521, and 523 may be added as they are to the CBs. In addition, when a polar code is used, a CRC may be added or omitted.

As described above with reference to FIG. 5, a maximum length of one CB may be determined according to a type of channel coding to be applied, and a TB to be transmitted and a CRC to be added to the TB may be divided into a plurality of CBs according to the maximum length of the CB.

In the LTE system, a CRC for CB is added to a divided CB, and a data bit of the CB and the CRC are encoded with a channel code to determine coded bits, and each of the coded bits is rate matched in a predefined manner such that a bit number may be determined.

In the NR system, a TB size (TBS) may be calculated through processes below.

Stage 1: $N'_{RE}$ that is the number of REs per one PRB, which is allocated to PDSCH mapping in an allocated resource. $N'_{RE}$ may be calculated as $$N_{sc}^{RB} \cdot N_{symb}^{sh} - N_{DMRS}^{PRB} - N_{oh}^{PRB}.$$

Here, $$N_{sc}^{RB}$$

is 12, and $$N_{symb}^{sh}$$

may indicate the number of OFDM symbols allocated to a PDSCH.

$$N_{DMRS}^{PRB}$$

indicates the number of REs per one PRB, which is occupied by a DMRS of a same CDM group.

$$N_{oh}^{PRB}$$

indicates the number of REs per one PRB, which is occupied by an overhead configured by higher layer signaling, and may be configured to be one of 0, 6, 12, and 18. Thereafter, $N_{RE}$ that is a total number of REs allocated to the PDSCH may be calculated. $N_{RE}$ is calculated as min(156, $N'_{RE}$)·$n_{PRB}$ and $n_{PRB}$ indicates the number of PRBs allocated to the UE.

Stage 2: $N_{info}$ that is temporary information bits may be calculated as $N_{RE}$·R·$Q_m$·v. Here, R indicates a code rate, $Q_m$ indicates a modulation order, and information of the value may be delivered by using a table predefined with a MCS bit field of DCI. In addition, v indicates the number of allocated layers. If $N_{info} \leq 3824$, TBS may be calculated through Stage 3 below. Otherwise, TBS may be calculated through Stage 4.

Stage 3: $N'_{info}$ may be calculated by using equations of $$N'_{info} = \max(24, 2^n \cdot \left\lfloor \frac{N_{info}}{2^n} \right\rfloor)$$

and $$n = \max(3, \lfloor \log_2(N_{info}) \rfloor - 6).$$

TBS may be determined as a value closest to $N_{info}$ from among values in Table 12 below that are not smaller than $N'_{info}$.

TABLE 12

| Index | TBS |
|-------|-----|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |

TABLE 12-continued

| Index | TBS |
|-------|-----|
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Stage 4: $N'_{info}$ may be calculated by using equations of $$N'_{info} = \max(3840, 2^n \times \text{round}\left( \frac{N_{info} - 24}{2^n} \right))$$

and $$n = \lfloor \log_2(N_{info} - 24) \rfloor - 5.$$

TBS may be determined based on a value of $N'_{info}$ and [pseudo-code 1] below. C below corresponds to the number of code blocks included in one TB.

[Pseudo-code 1 Start]
    if R≤1/4

$$TBS = 8 * C * \left\lceil \frac{N'_{info} + 24}{8 * C} \right\rceil - 24, \text{ where } C = \left\lceil \frac{N'_{info} + 24}{3816} \right\rceil$$

else

-continued if $N'_{info} > 8424$ $$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if
end if
[Pseudo-code 1 End]

In the NR system, when one CB is input to an LDPC encoder, the CB may be output with parity bits added thereto. Here, an amount of parity bits may vary according to an LDCP base graph. With respect to a particular input, a method by which all parity bits generated by LDPC coding are transmitted may be referred to as full buffer rate matching (FBRM), and a method by which the number of transmittable parity bits is limited may be referred to as limited buffer rate matching (LBRM). When a resource is allocated for data transmission, an output of an LDPC encoder is generated as a circular buffer, and bits of the generated buffer are transmitted repeatedly as much as the allocated resource, and a length of the circular buffer may be $N_{cb}$.

When the number of all parity bits generated by LDPC coding is N, $N_{cb}=N$ in the FBRM scheme. In the LBRM, $N_{cb}=\min(N, N_{ref})$, $N_{ref}$ is given by $$\left\lfloor \frac{TBS_{LBRM}}{C \cdot R_{LBRM}} \right\rfloor,$$

and $R_{LBRM}$ may be determined as 2/3. In order to obtain $TBS_{LBRM}$, the aforementioned method of calculating TBS is used, whereas the calculation may be performed based on assumption of a maximum number of layers and a maximum modulation order which are supported by a UE in a corresponding cell. When MCS Table for supporting 256QAM is configured to be used for at least one BWP in a corresponding cell, a maximum modulation order $Q_m$ may be assumed to be 8, and when the MCS table above is not configured to be used, the maximum modulation order $Q_m$ may be assumed to be 6 (64QAM), a code rate may be assumed to be 948/1024 that is a maximum code rate, $N_{RE}$ may be assumed to be $$156 \cdot n_{PRB},$$

and $n_{PRB}$ may be assumed to be $n_{PRB,LBRM}$. $n_{PRB,LBRM}$ may be given in Table 13 below.

TABLE 13

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |

TABLE 13-continued

| Maximum number of PRBs across all configured BWPs of a carrier | $n_{PRB,LBRM}$ |
|---|---|
| 136 to 162 | 162 |
| 163 to 217 | 217 |
| Larger than 217 | 273 |

In the NR system, a maximum data rate supported by the UE may be determined by using Equation 2 below.

[Equation 3]

data rate (in *Mbps*) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j)\mu}}{T_s^\mu} \cdot (1 - OH^{(j)}) \right)$$

In Equation 2, J may indicate the number of carriers grouped due to carrier aggregation (CA), $R_{max}=948/1024$, $$v_{Layer}^{(j)}$$

may indicate a maximum number of layers, $$Q_m^{(j)}$$

may indicate a maximum modulation order, $f^{(j)}$ may indicate a scaling index, and u may indicate a subcarrier spacing. The UE may report one value among 1, 0.8, 0.75, and 0.4 as $f^{(j)}$, and μ may be given in Table 14 below.

TABLE 14

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In addition, $$T_s^\mu$$

indicates an average OFDM symbol length, $$T_s^\mu$$

may be calculated by TH $$\frac{10^{-3}}{14 \cdot 2^\mu},$$

and $$N_{PRB}^{BW(j),\mu}$$

indicates a maximum number of RBs in BW(j). OH$^{(j)}$ indicates an overhead value which may be given as 0.14 in a DL of FR1 (a band equal to or less than 6 GHz) and as 0.18 in an UL, and may be given as 0.08 in a DL of FR2 (a band greater than 6 GHz) and as 0.10 in an UL. A maximum data rate in a DL in a cell having a frequency bandwidth of 100 MHz in 30 kHz subcarrier spacing may be calculated as Table 15 below by using Equation 2.

TABLE 15

| f$^{(j)}$ | v$_{Layers}^{(j)}$ | Q$_m^{(j)}$ | Rmax | N$_{PRB}^{BW(j),\mu}$ | T$_s^\mu$ | OH$^{(j)}$ | data rate |
|------|------|------|------------|------|-------------|------|--------|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate of actual data transmission which can be measured by the UE may be a value obtained by dividing a data amount by a data transmission time. This may correspond to a value which is TBS in 1 TB transmission or a value which is obtained by dividing a sum of TBS by a TTI length in 2 TB transmission. For example, according to assumption with respect to calculation of Table 15, a maximum actual data rate in a DL in a cell having a frequency bandwidth of 100 MHz in 30 kHz subcarrier spacing may be determined according to the number of allocated PDSCH symbols, as in Table 16 below.

TABLE 16

| N$_{symb}^{sh}$ | N$_{DMRS}^{PRB}$ | N$_{RR}$ | N$_{RE}$ | N$_{info}$ | n | N$_{info}$ | C | TBS | TTI length (ms) | data rate (Mbps) |
|------|------|------|------|-----------|-----|-----------|-----|-----------|----------|----------|
| 3 | 8 | 28 | 7644 | 226453.5 | 12 | 225,280 | 27 | 225,480 | 0.107143 | 2,101.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.3 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.461286 | 2,612.68 |
| 14 | 8 | 160 | 43680 | 1294020.0 | 15 | 1,277,952 | 152 | 1,277,992 | 0.500000 | 2,555.98 |

A maximum data rate supported by the UE may be identified based on Table 15, and an actual data rate following allocated TBS may be identified via Table 16. Here, there may be a case where an actual data rate is greater than a maximum data rate according to scheduling information.

In a wireless communication system, particularly, in the NR system, a data rate the UE can support may be defined between the base station and the UE. The data rate may be calculated by using a maximum frequency band, a maximum modulation order, a maximum number of layers, and the like which are supported by the UE. However, the calculated data rate may be different from a value calculated from a transport block size (TBS) of a transport block (TB) and a length of a transmission time interval (TTI) which are used in actual data transmission.

Accordingly, the UE may be allocated a TBS being greater than a value corresponding to a data rate the UE supports, and in order to prevent this, there may be restriction of scheduling of TBS according to the data rate the UE supports.

Figure 6:
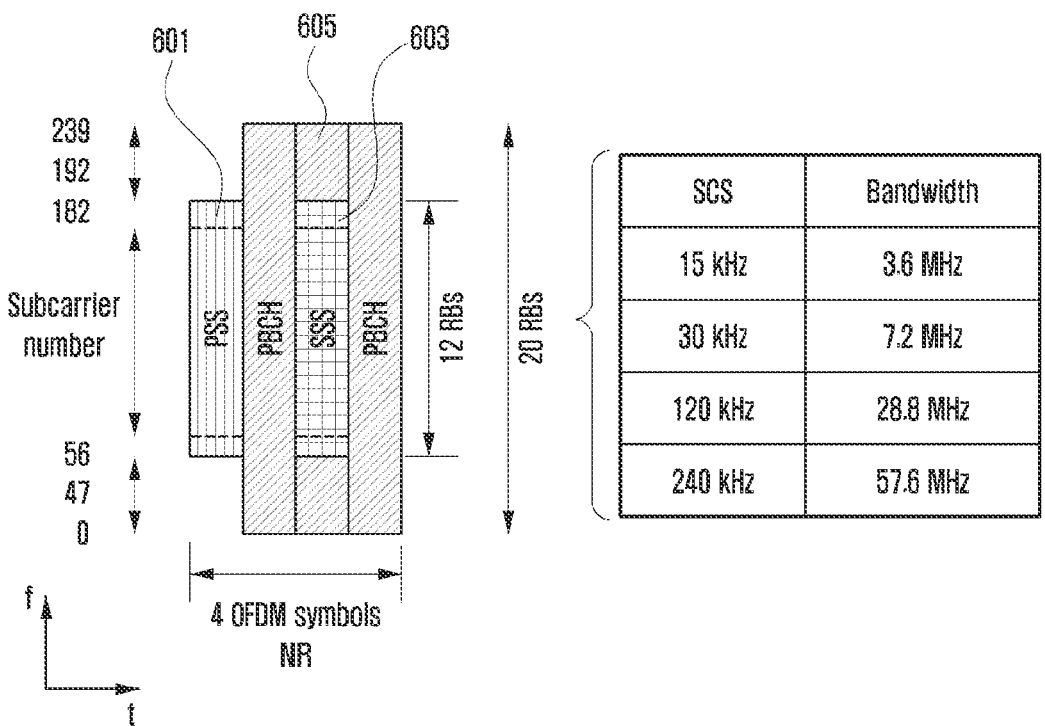
FIG. 6 illustrates a configuration in which a synchronization signal (SS) and a physical broadcast channel (PBCH) of an NR system are mapped in a frequency and a time domain.

FIG. 6 illustrates an aspect in which a synchronization signal (SS) and a physical broadcast channel (PBCH) in the NR system are mapped to frequency and time domains.

A primary synchronization signal (PSS) 601, a secondary synchronization signal (SSS) 603, and a PBCH are mapped to 4 OFDM symbols; the PSS and the SSS are mapped to 12 RBs, and the PBCH is mapped to 20 RBs. Table in FIG. 6 illustrates how a frequency band of 20 RBs is changed according to subcarrier spacings (SCSs). A resource region on which a PSS, an SSS, and a PBCH are transmitted may be referred to as an SS/PBCH block. In addition, the SS/PBCH block may be referred to as an SSB block.

Figure 7:
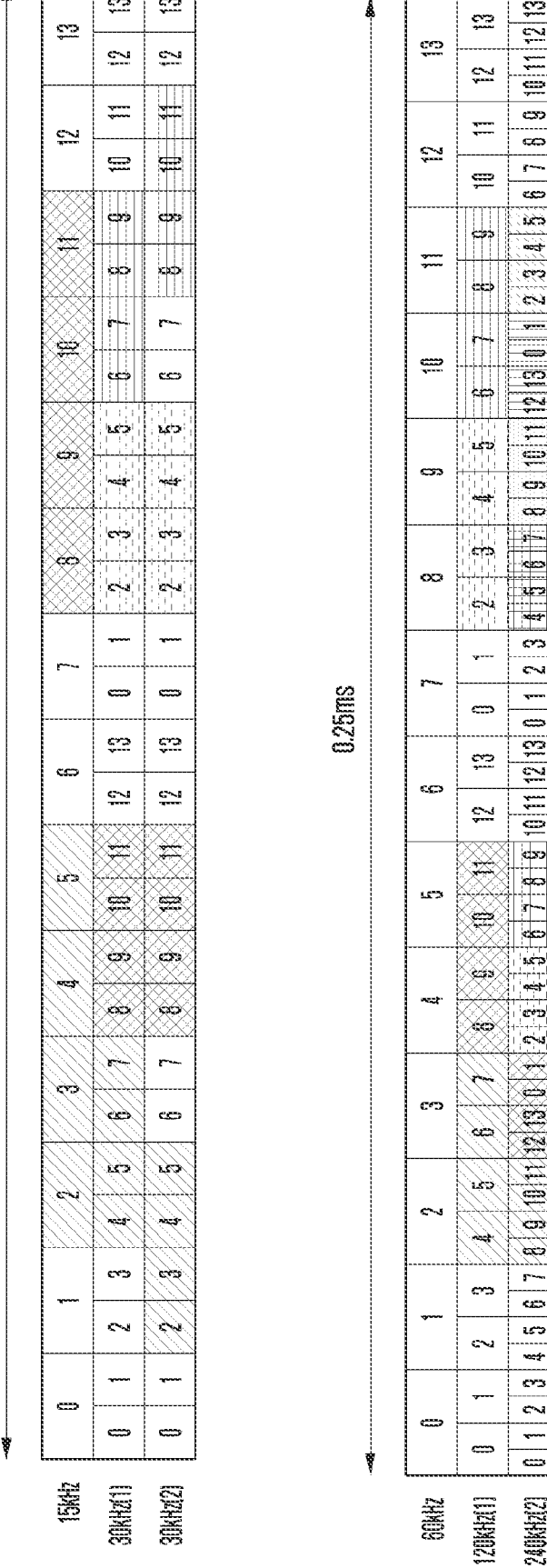
FIG. 7 illustrates a symbol to which an SS/PBCH block may be transmitted according to a subcarrier spacing.

FIG. 7 illustrates symbols on which an SS/PBCH block can be transmitted according to a subcarrier spacing.

Referring to FIG. 7, a subcarrier spacing may be configured as 15 kHz, 30 kHz, 120 kHz, 240 kHz, and the like, and a position of a symbol on which an SS/PBCH block (or an SSB block) can be located may be determined according to each subcarrier spacing. FIG. 7 illustrates positions of symbols on which an SSB block may be transmitted according to a subcarrier spacing from among symbols within 1 ms, and it is not always necessary to transmit the SSB block in a region shown in FIG. 7. A position in which the SSB block is transmitted may be configured for the UE by system information or dedicated signaling.

In general, the UE is distant from the base station, and thus, a signal transmitted from the UE may be received by the base station after a propagation delay. The propagation delay refers to a value obtained by dividing, by a speed of light, a path on which a radio wave is delivered from the UE to the base station, and in general, the propagation delay may refer to a value obtained by dividing a distance between the UE and the base station by a speed of light. In an embodiment, in a case of a UE located at a place being distant by 100 km from the base station, a signal transmitted from the UE is received by the base station after 0.34 msec. On the other hand, a signal transmitted from the base station is received by the UE after 0.34 msec. As described above, a time a signal transmitted from a UE reaches a base station may vary according to a distance between the UE and the base station. Therefore, when a plurality of UEs located at different places simultaneously transmit signals, a time the signals reach a base station may vary. In order to allow the signals transmitted from the plurality of UEs to simultaneously reach the base station by solving this problem, a time in which a UE transmits a UL signal may be different for each of the UEs according to locations thereof. In the 5G, NR, and LTE systems, this is referred to as a timing advance.

Figure 8:
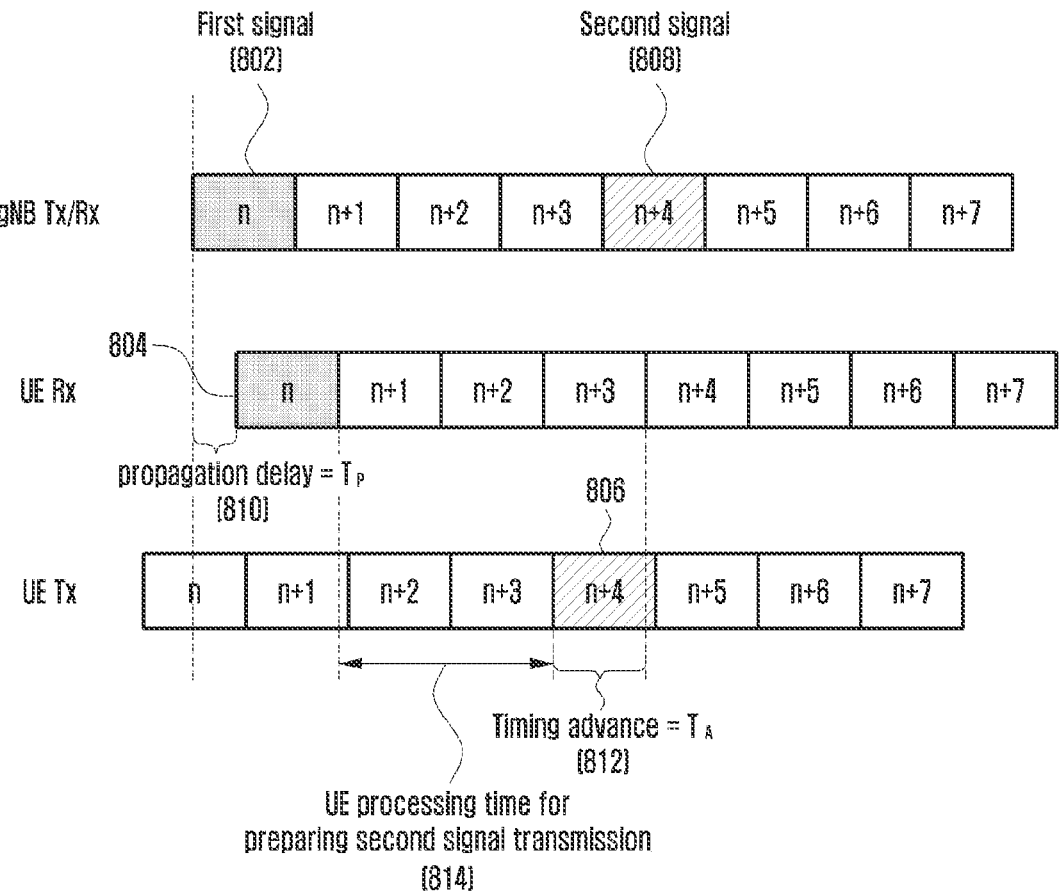
FIG. 8 illustrates a UE processing time according to a timing advance when a UE receives a first signal and transmits a second signal in response thereto in a 5G or NR system according to a disclosed embodiment.

FIG. 8 illustrates UE processing time according to a timing advance when a UE receives a first signal and transmits a second signal in response thereto, in the 5G or NR system according to the disclosed embodiment.

Hereinafter, UE processing time according to a timing advance is described in detail. When a base station transmits UL scheduling grant (UL grant) or DL control signal and data (DL grant and DL data) to a UE in a slot n 802, the UE may receive the UL grant or the DL control signal and data in a slot n 804. Here, the UE may receive a signal after a propagation delay ($T_p$) 810, compared to a time when the base station has transmitted the signal. In the embodiment of the disclosure, when the UE receives a first signal in the slot n 804, the UE transmits a second signal corresponding thereto in a slot (n+4) 806. When the UE transmits a signal to the base station, in order to make the signal arrive at the base station at a particular time, the UE may transmit HARQ ACK/NACK with respect to UL data or DL data on a timing 806 advanced by a timing advance (TA) 812 before a slot (n+4), in which the UE has received a reference signal. Therefore, in the embodiment of the disclosure, a time in which the UE can receive UL grant and transmit UL data or receive DL data and prepare to deliver HARQ ACK or NACK may be a time corresponding to 3 slots excluding a TA (indicated by reference numeral 814).

In order to determine the aforementioned timing, the base station may calculate an absolute value of the TA of the UE. The base station may calculate the absolute value of the TA by adding or subtracting variation in a value of the TA, which is delivered by higher layer signaling, to or from a value of the TA which is first delivered to the UE in a random access procedure when the UE initially accesses. In the disclosure, the absolute value of the TA may correspond to a value obtained by subtracting a start time of an n-th TTI the UE receives from a start time of an n-th TTI the UE transmits.

One of important references of performance of a cellular wireless communication system is packet data latency. To this end, in an LTE system, transmission and reception of a signal are performed in units of a subframe having a transmission time interval (TTI) of 1 ms. The LTE system operating in the above described manner may support a UE (a short-TTI UE) having a shorter TTI than 1 ms. In the 5G or NR system, a TTI may be shorter than 1 ms. The short-TTI UE is appropriate for a voice over LTE (VoLTE) service or a service such as a remote control, for which latency is important. In addition, the short-TTI UE may be an entity capable of implementing mission-critical IoT on a cellular communication base.

In the 5G or NR system, when the base station transmits a PDSCH including DL data, DCI for scheduling the PDSCH may indicate a K1 value corresponding to timing information by which the UE transmits HARQ-ACK information of the PDSCH. In a case where it is not indicated that the HARQ-ACK information including a timing advance is to be transmitted earlier than symbol L1, the HARQ-ACK information including a timing advance may be transmitted from the UE. That is, the HARQ-ACK information including a timing advance may be transmitted to the base station at a point of time equal to or after the symbol L1. In a case where it is indicated that the HARQ-ACK information including a timing advance is to be transmitted earlier than the symbol L1, the HARQ-ACK information may not be valid HARQ-ACK information in HARQ-ACK transmission from the UE to the base station.

The symbol L1 may be a first symbol on which a cyclic prefix (CP) starts after $T_{proc,1}$ from a last point of time of the PDSCH. $T_{proc,1}$ may be calculated by using Equation 3 below.

$$T_{proc,1} = ((N_1 + d_{1,1} + d_{1,2})(2048 + 144) \cdot \kappa 2^{-\mu}) \cdot T_c \qquad \text{[Equation 3]}$$

In Equation 3 described above, $N_1$, $d_{1,1}$, $d_{1,2}$, $\kappa$, $\mu$, and $T_c$ may be defined as below.

When HARQ-ACK information is transmitted via a PUCCH (a UL control channel), $d_{1,1}=0$, and when the HARQ-ACK information is transmitted via a PUSCH (a UL shared channel or data channel), $d_{1,1}=1$.

In a case where the UE is configured with a plurality of activated configuration carriers or carriers, a maximum timing difference between the carriers may be reflected on second signal transmission.

In a case of a PDSCH mapping type A, i.e., in a case where a first DMRS symbol position is a third or fourth symbol of a slot, when a position index i of a last symbol of a PDSCH is smaller than 7, it is defined that $d_{1,2}=7-i$.

In a case of a PDSCH mapping type B, i.e., in a case where a first DMRS symbol position is a first symbol of a PDSCH, when a length of the PDSCH is 4 symbols, $d_{1,2}=3$, and when a length of the PDSCH is 2 symbols, $d_{1,2}=3+d$, where d refers to the number of symbols over which a PDCCH including the PDSCH and a control signal for scheduling the PDSCH is overlapped.

$N_1$ is defined as in Table 17 below according to $\mu$. $\mu=0, 1, 2, 3$ respectively indicate subcarrier spacings of 15 kHz, 30 kHz, 60 kHz, 120 kHz.

TABLE 17

| | PDSCH · decoding · time · $N_1$ · [symbols] | |
| --- | --- | --- |
| $\mu$ | No · additional · PDSCH · DM-RS·configured | Additional · PDSCH · DM-RS configured |
| 0 | 8 | 13 |
| 1 | 10 | 13 |
| 2 | 17 | 20 |
| 3 | 20 | 24 |

A value of $N_1$ which is provided in Table 17 described above may be different values according to UE capabilities.

$T_c=1/(\Delta f_{max} \cdot N_f)$, $\Delta f_{max}=480 \cdot 10^3$ Hz $N_f=4096$, $\kappa=T_s/T_c=64$, $T_s=1/(\Delta f_{ref} \cdot N_{f,ref})$, $\Delta f_{ref}=15 \cdot 10^3$ Hz, $N_{f,ref}=2048$ are defined, respectively.

Further, in the 5G or NR system, when the base station transmits control information including UL grant, the base station may indicate a K2 value corresponding to timing information by which the UE transmits UL data or a PUSCH.

In a case where it is not indicated that the PUSCH including a timing advance is to be transmitted earlier than a symbol L2, the PUSCH including a timing advance may be transmitted from the UE to the base station. That is, the PUSCH including a timing advance may be transmitted from the UE to the base station at a point of time equal to or after the symbol L2. In a case where it is indicated that the PUSCH including a timing advance is to be transmitted earlier than the symbol L2, the UE may ignore UL grant control information from the base station.

The symbol L2 may be a first symbol on which a CP of a PUSCH symbol which has to be transmitted after $T_{proc,2}$ from a last point of time of a PDCCH including scheduling grant is started. $T_{proc,2}$ may be calculated by using Equation 4 below.

$$T_{proc,2}=((N_2+d_{2,1})(2048+144) \cdot \kappa 2^{-\mu}) \cdot T_C \qquad \text{[Equation 4]}$$

In Equation 4 described above, $N_2$, $d_{2,1}$, $\kappa$, $\mu$, and $T_C$ may be defined as below.

In a case where a first symbol among symbols allocated to a PUSCH includes only a DMRS, $d_{2,1}=0$, and except for the case, $d_{2,1}=1$.

In a case where the UE is configured with a plurality of activated configuration carriers or carriers, a maximum timing difference between the carriers may be reflected on second signal transmission.

$N_2$ is defined as in Table 18 below according to $\mu$. $\mu=0, 1, 2, 3$ respectively indicate subcarrier spacings of 15 kHz, 30 kHz, 60 kHz, 120 kHz.

TABLE 18

| $\mu$ | PUSCH · preparation · time · $N_2$ · [symbols] |
|---|---|
| 0 | 10 |
| 1 | 12 |
| 2 | 23 |
| 3 | 36 |

A value of $N_2$ which is provided in Table 18 described above may be different values according to UE capabilities.

$T_c=1/(\Delta f_{max} \cdot N_f)$, $\Delta f_{max}=480 \cdot 10^3$ Hz, $N_f=4096$, $\kappa=T_s/T_c=64$, $T_s=1/(\Delta f_{ref} \cdot N_{f,ref})$, $\Delta f_{ref}=15 \cdot 10^3$ Hz, $N_{f,ref}=2048$ are respectively define, as above.

On the other hand, the 5G or NR system may configure a bandwidth part (BWP) within one carrier so as to allow a particular UE to perform transmission and reception within the configured BWP. This may be performed to reduce power consumption of the UE. The BS may configure a plurality of BWPs, and may change an activated BWP in control information. A period of time allowed for the UE to switch a BWP may be defined as in Table 19 below.

TABLE 19

| Frequency · Range | Scenario | Type · 1 · delay · (us) | Type · 2 · delay · (us) |
|---|---|---|---|
| 1 | 1 | 60 | 200 |
| | 2 | 60 | 200 |
| | 3 | 60 | 200 |
| | 4 | 40 | 95 |
| 2 | 1 | 60 | 200 |
| | 2 | 60 | 200 |
| | 3 | 60 | 200 |
| | 4 | 40 | 95 |

In Table 19, frequency range 1 refers to a frequency band equal to or less than 6 GHZ, and frequency range 2 refers to a frequency band greater than 6 GHz. In the above escribed embodiment of the disclosure, type 1 and type 2 may be determined according to UE capabilities. In the above-described embodiment of the disclosure, scenarios 1, 2, 3, and 4 may be given as in Table 20 below.

TABLE 20

| | Center·frequency · is · changeable | Center· frequency · is unchangeable |
|---|---|---|
| Frequency· bandwidth· is changeable | Scenario·3 | Scenario·2 |
| Frequency· bandwidth· is unchangeable | Scenario·1 | scenario·4·in·case·of·changing in·subcarrier·spacing |

Figure 9:
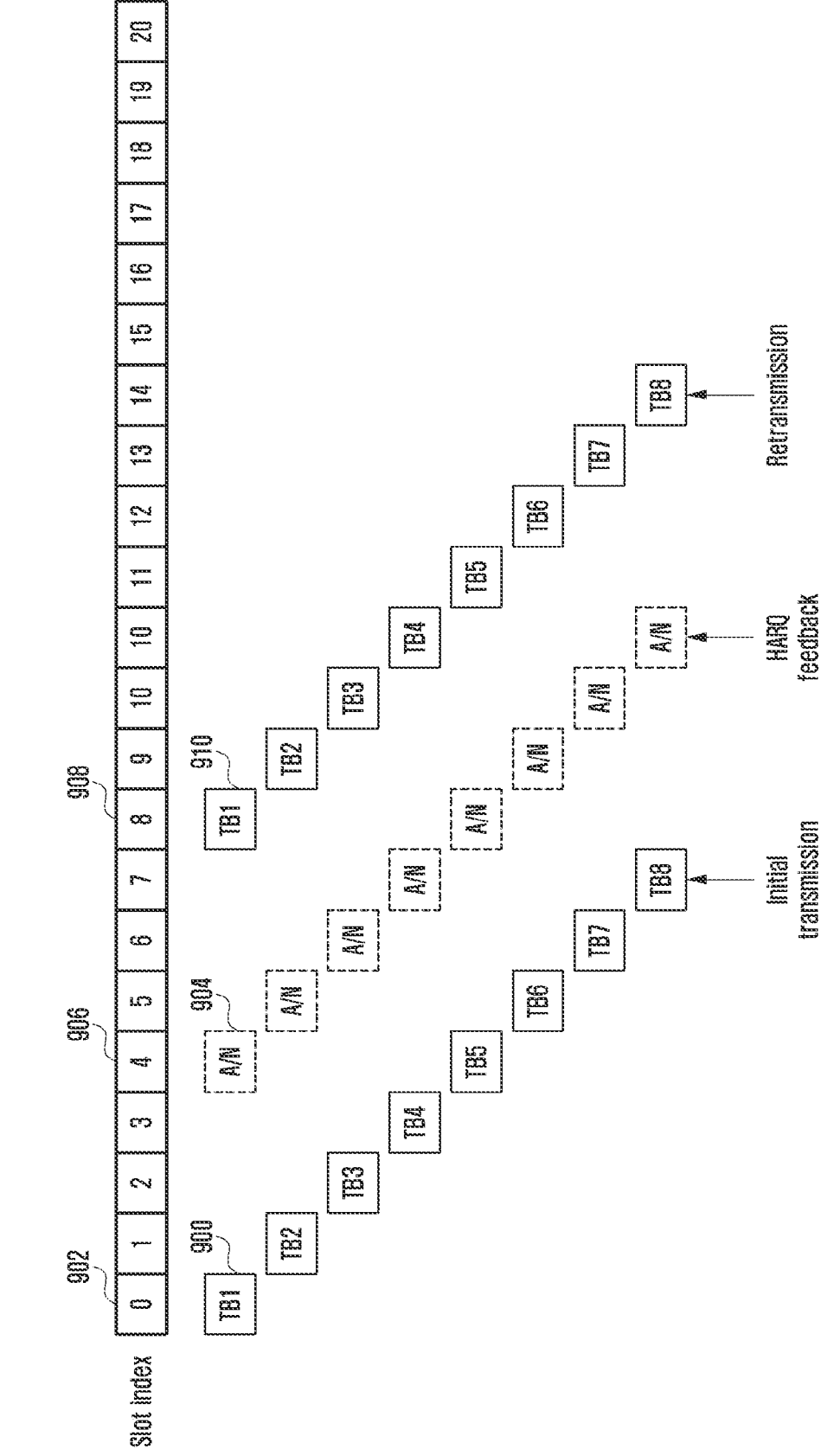
FIG. 9 illustrates an example in which data (e.g., TBs) is scheduled and transmitted according to a slot, a HARQ-ACK feedback for the corresponding data is received, and retransmission is performed according to the feedback.

FIG. 9 illustrates an example in which a base station schedules pieces of data (e.g., TBs) according to slots and transmits the data, receives HARQ-ACK feedback with respect to the data, and performs retransmission, in response to the feedback. Referring to FIG. 9, TB1 900 is initially transmitted in slot 0 902, and ACK/NACK feedback 904 in response thereto is transmitted in slot 4 906. If initial transmission of TB1 is failed and NACK is received, retransmission of TB1 may be performed in slot 8 908 (indicated by reference numeral 910). A time when ACK/NACK feedback is transmitted and a time when retransmission is performed may be predetermined, or may be determined according to control information and/or a value indicated by higher layer signaling.

FIG. 9 illustrates an example in which TB1 to TB8 are sequentially scheduled to slots starting from slot 0 and are transmitted. This may correspond to, for example, a case where HARQ process IDs 0 to 7 are respectively allocated to TB1 to TB8 and TB1 to TB8 are transmitted. If the number of HARQ process IDs the base station and the UE can use is only 4, sequential transmission of 8 different TBs may not be performed.

Figure 10:
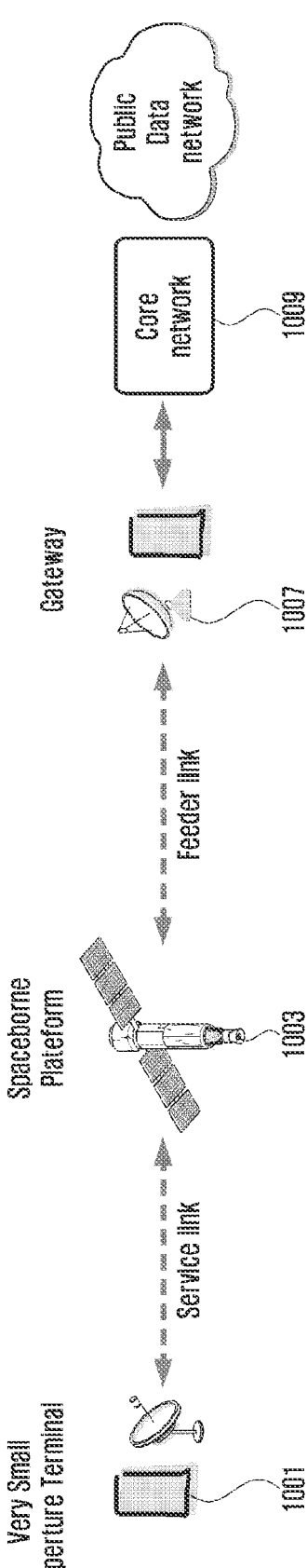
FIG. 10 illustrates an example of a communication system using a satellite.

FIG. 10 illustrates an example of a communication system using a satellite. For example, when a terminal 1001 transmits a signal to a satellite 1003, the satellite 1003 transfers the signal to a base station 1005, and the base station 1005 processes the received signal and transmits a signal including a request for a subsequent operation thereto to the terminal 1001, which may be transmitted again through the satellite 1003. In the above, since a distance is long between the terminal 1001 and the satellite 1003, and a distance is also long between the satellite 1003 and the base station 1005, a timing required for data transmission or reception between the terminal 1001 and the base station 1005 becomes longer.

Figure 11:
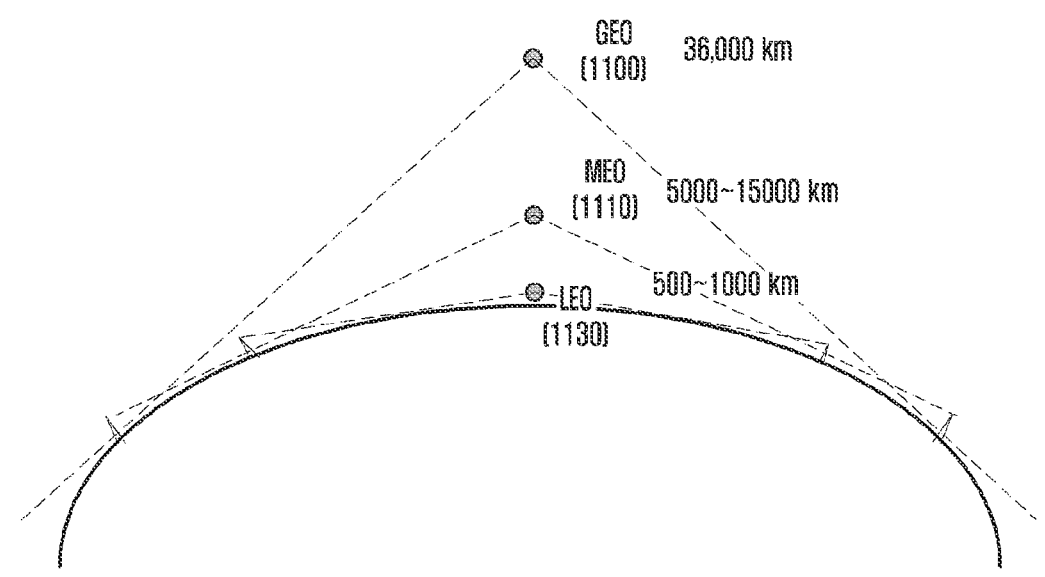
FIG. 11 illustrates a period in which a communication satellite revolves around the Earth according to an altitude or height of a satellite.

FIG. 11 illustrates a period in which a communication satellite revolves around the Earth according to an altitude or height of the satellite. Satellites for communication may be classified into low Earth orbit (LEO), middle Earth orbit (MEO), geostationary Earth orbit (GEO) satellites, and the like according to the orbit of the satellite. In general, a GEO 1100 refers to a satellite of approximately 36000 km in altitude, an MEO 1110 refers to a satellite of an altitude of 5000 to 15000 km, and the LEO refers to a satellite of an altitude of 500 to 1000 km. A period in which the satellite revolves around the Earth varies according to each altitude. In a case of the GEO 1100, a period in which the GEO satellite revolves around the Earth is about 24 hours, the MEO 1110 has the orbital period of about 6 hours, and the LEO 1130 has the orbital period about 90 to 120 minutes. Due to relatively low altitude, low orbit (2,000 km or lower) satellites have advantages in propagation delay and loss compared to geostationary (36,000 km) satellites.

Figure 12:
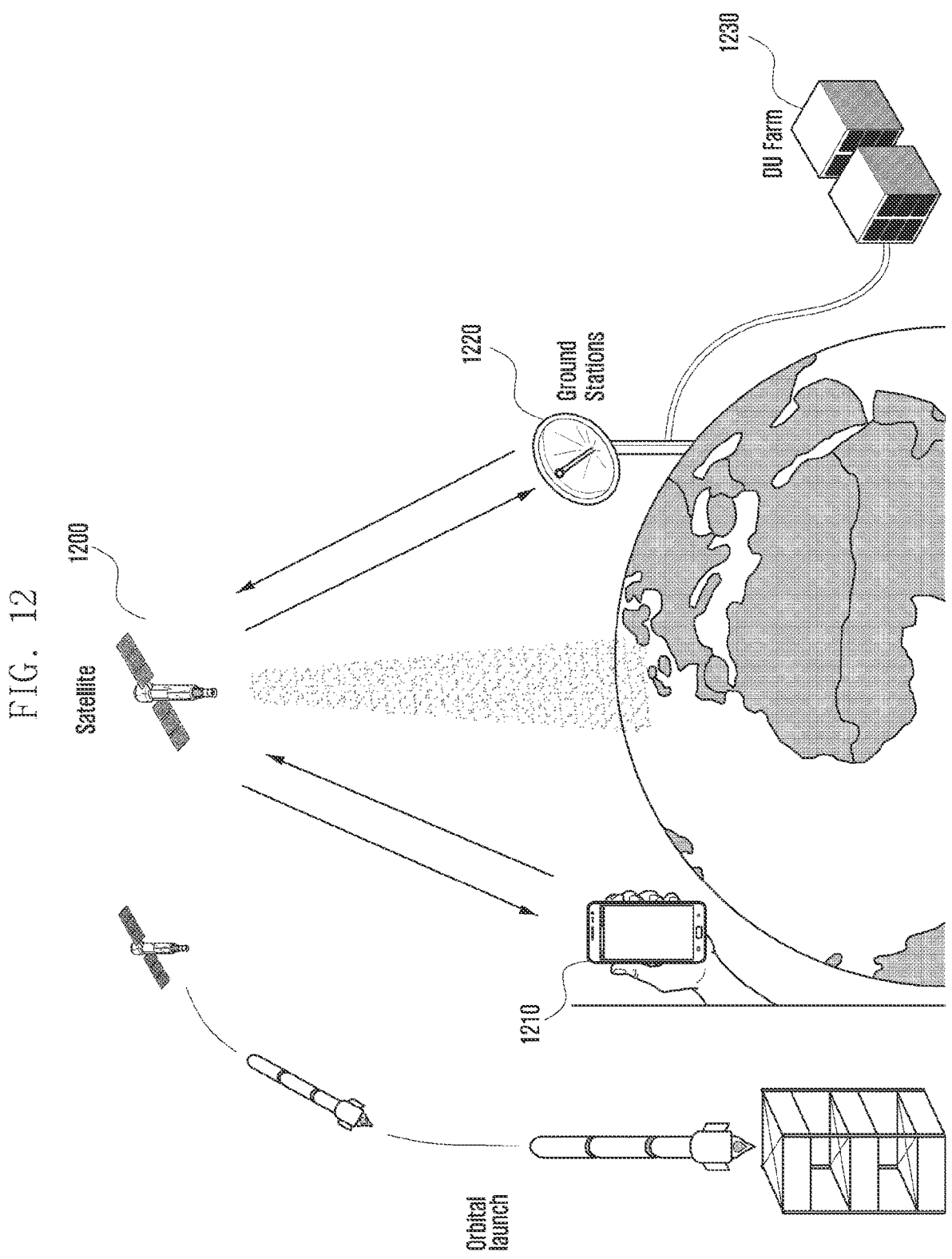
FIG. 12 illustrates a conceptual diagram of satellite-to-terminal direct communication.

FIG. 12 illustrates a conceptual diagram of satellite-to-terminal direct communication. A satellite 1200, which is located at the altitude of 100 km or higher by the rocket, transmits or receives a signal to or from a terrestrial terminal 1210, and also transmits or receives a signal to or from a ground station 1220 connected to a terrestrial base station (DU farms) 1230.

FIG. 13 illustrates a utilization scenario of satellite-terminal direct communication. Satellite-terminal direct communication can support a communication service for specialized purposes in the form of supplementing the coverage limit of the terrestrial network. For example, by implementing the satellite-terminal direct communication function in a user terminal, transmission and reception of the user's emergency rescue and/or disaster signals in places that are not covered by the terrestrial network communication are possible (indicated by reference numeral 1300), a mobile communication service can be provided to a user in an area where terrestrial network communication is impossible, such as a ship and/or an air (indicated by reference numeral 1310), and the location of ships, trucks, and/or drones can be tracked and controlled in real time without border restrictions (indicated by reference numeral 1320). In addition, by supporting the satellite communication function for a base station, it is possible to use the satellite communication to function as a backhaul of the base station and perform the backhaul function when physically distant (indicated by reference numeral 1330).

Figure 14:
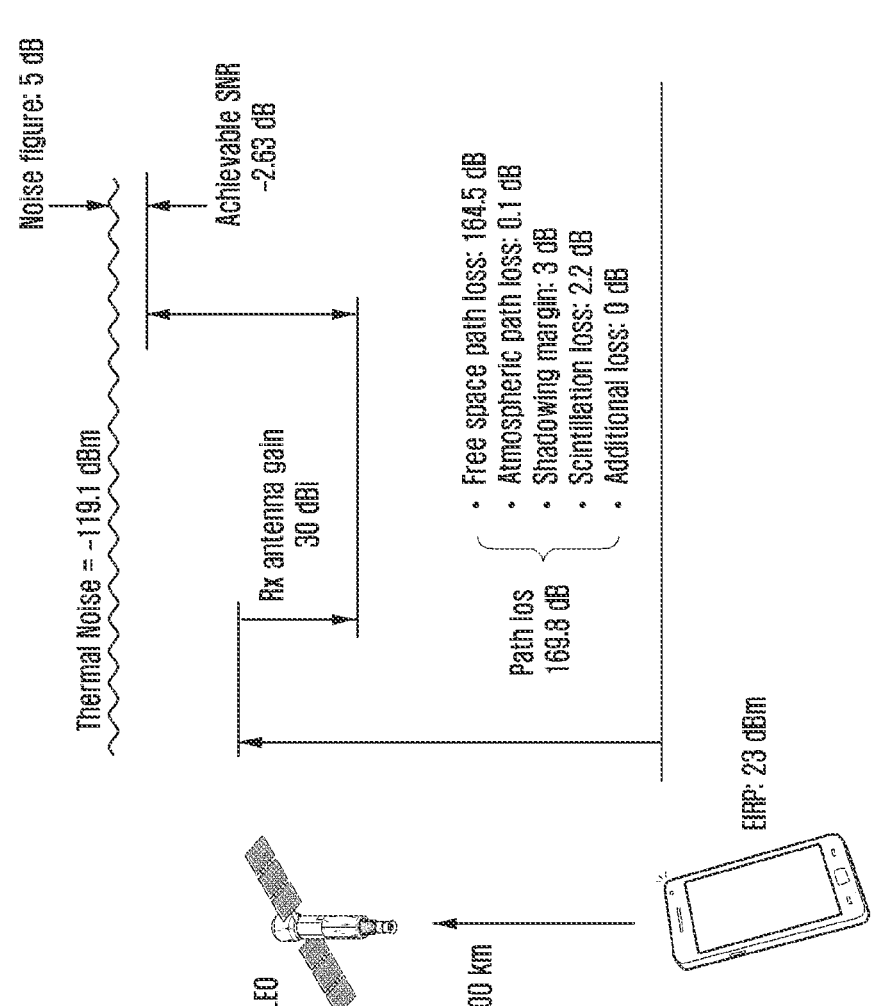
FIG. 14 illustrates an example of calculating an expected data rate (or throughput) in an uplink when an LEO satellite at an altitude of 1200 km and a terrestrial terminal perform direct communication.

FIG. 14 illustrates an example of calculating an expected data rate (throughput) in an uplink when an LEO satellite at the altitude of 1200 km and a terrestrial terminal perform direct communication. In the uplink, when the transmission effective isotropic radiated power (EIRP) of the terrestrial terminal is 23 dBm, the path loss of the radio channel to the satellite is 169.8 dB, and the satellite reception antenna gain is 30 dBi, the achievable signal-to-noise ratio (SNR) is estimated to be −2.63 dB. Here, the path loss may include a path loss in free space, a loss in the atmosphere, and the like. When a signal-to-interference ratio (SIR) is assumed to be 2 dB, the signal-to-interference and noise ratio (SINR) is calculated as −3.92 dB, and here when using subcarrier spacing of 30 kHz and frequency resources of 1 PRB, it may be possible to achieve a transmission rate of 112 kbps.

Figure 15:
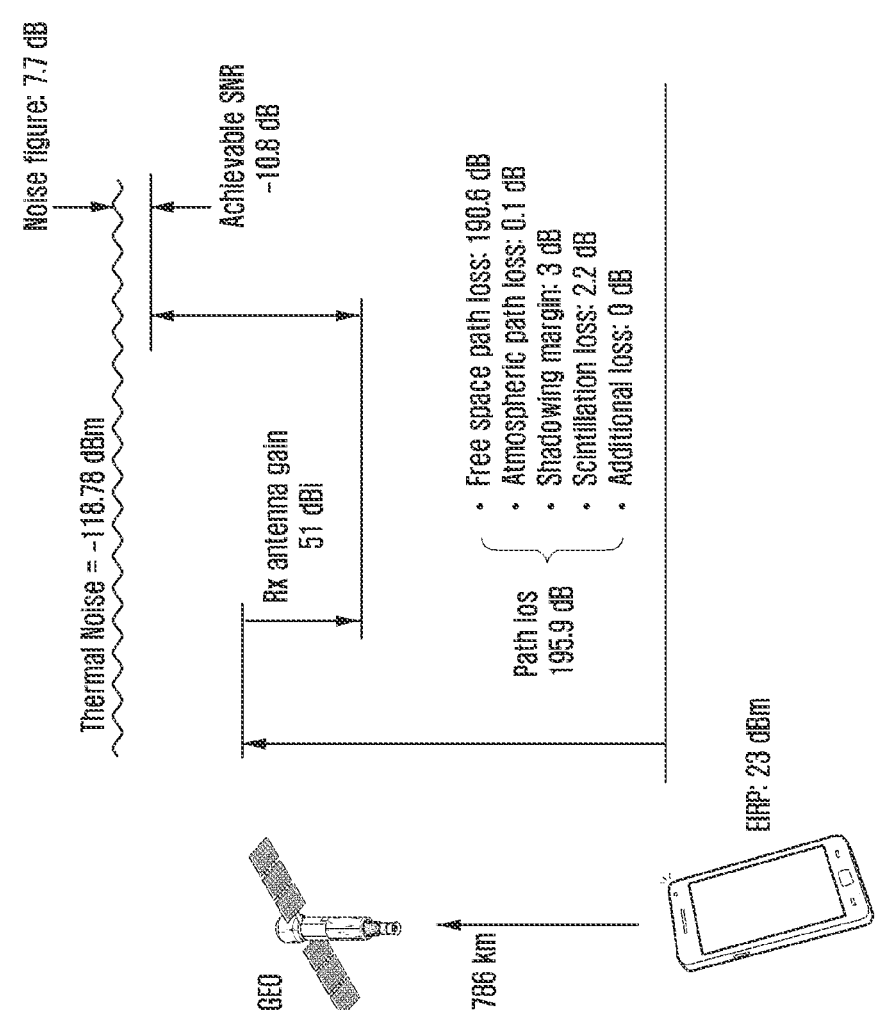
FIG. 15 illustrates an example of calculating an expected data rate (or throughput) in an uplink when a GEO satellite at an altitude of 35,786 km and a terrestrial terminal perform direct communication.

FIG. 15 illustrates an example of calculating an expected data rate (throughput) in an uplink when a GEO satellite at the altitude of 35,786 km and a terrestrial terminal perform direct communication. When the transmission EIRP of the terrestrial terminal in the uplink is 23 dBm, the path loss of the radio channel to the satellite is 195.9 dB, and the satellite reception antenna gain is 51 dBi, the achievable SNR is estimated to be −10.8 dB. Here, the path loss may include a path loss in free space, a loss in the atmosphere, and the like.

When an SIR is 2 dB, an SINR is calculated to be −11 dB. Here, when a 30 kHz subcarrier spacing and a frequency resource of 1 PRB are used, a transmission rate of 21 kbps can be achieved, which can be obtained by performing three times of repetitive transmissions.

FIG. 16 illustrates a path loss value according to a path loss model between a terminal and a satellite, and a path loss according to a path loss model between a terminal and a terrestrial base station. In FIG. 16, "d" corresponds to a distance and "$f_c$" is the frequency of a signal. In free space where communication between the terminal and the satellite is performed, a path loss (FSPL) 1600 is inversely proportional to the square of the distance. However, a path loss (PL2, PL'$_{Uma-NLOS}$) on the ground including air in which communication between the terminal and the terrestrial gNB is performed (indicated by reference numerals 1610 and 1620) is inversely proportional to the fourth power of the distance. $d_{3D}$ is the straight line distance between the terminal and the base station, $h_{BS}$ is the height of the base station, and $h_{UT}$ is the height of the terminal. $d'_{BP}$ is calculated as $d'_{BP}=4 \times h_{BS} \times h_{UT} \times f_c/c$. $f_c$ is the center frequency in units of Hz, and c is the speed of light in units of m/s.

In satellite communications (or non-terrestrial network), a Doppler shift occurs due to the continuous and rapid movement of the satellite, that is, a frequency offset of a transmission signal may occur.

Figure 18:
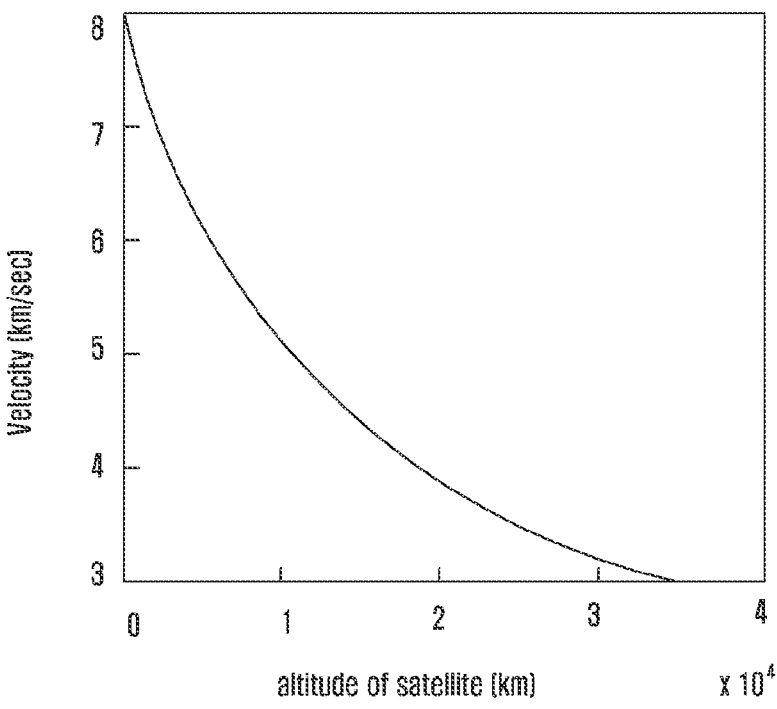
FIG. 18 illustrates the speed of a satellite calculated at an altitude of the satellite.

FIG. 17 illustrates equations for calculation of the amount of Doppler shift experienced by a signal, which is transmitted from a satellite and received by a terrestrial user according to the altitude and location of the satellite and the position of a terminal user on the ground, and results thereof. Where the radius of the Earth is "R", "h" is the altitude of the satellite, "v" is the speed at which the satellite revolves around the Earth, and "$f_c$" is the frequency of the signal. The speed of the satellite may be calculated based on the altitude of the satellite, and due to the speed of the satellite, the speed at which gravity, which is a force in which the Earth pulls the satellite, and a centripetal force generated as the satellite revolves become the same, and this may be calculated as shown in FIG. 18. FIG. 18 illustrates the speed of the satellite calculated at the altitude of the satellite. As can be seen from FIG. 17, since each angle α is determined by the elevation angle θ, the value of the Doppler shift is determined according to the elevation angle θ.

Figure 19:
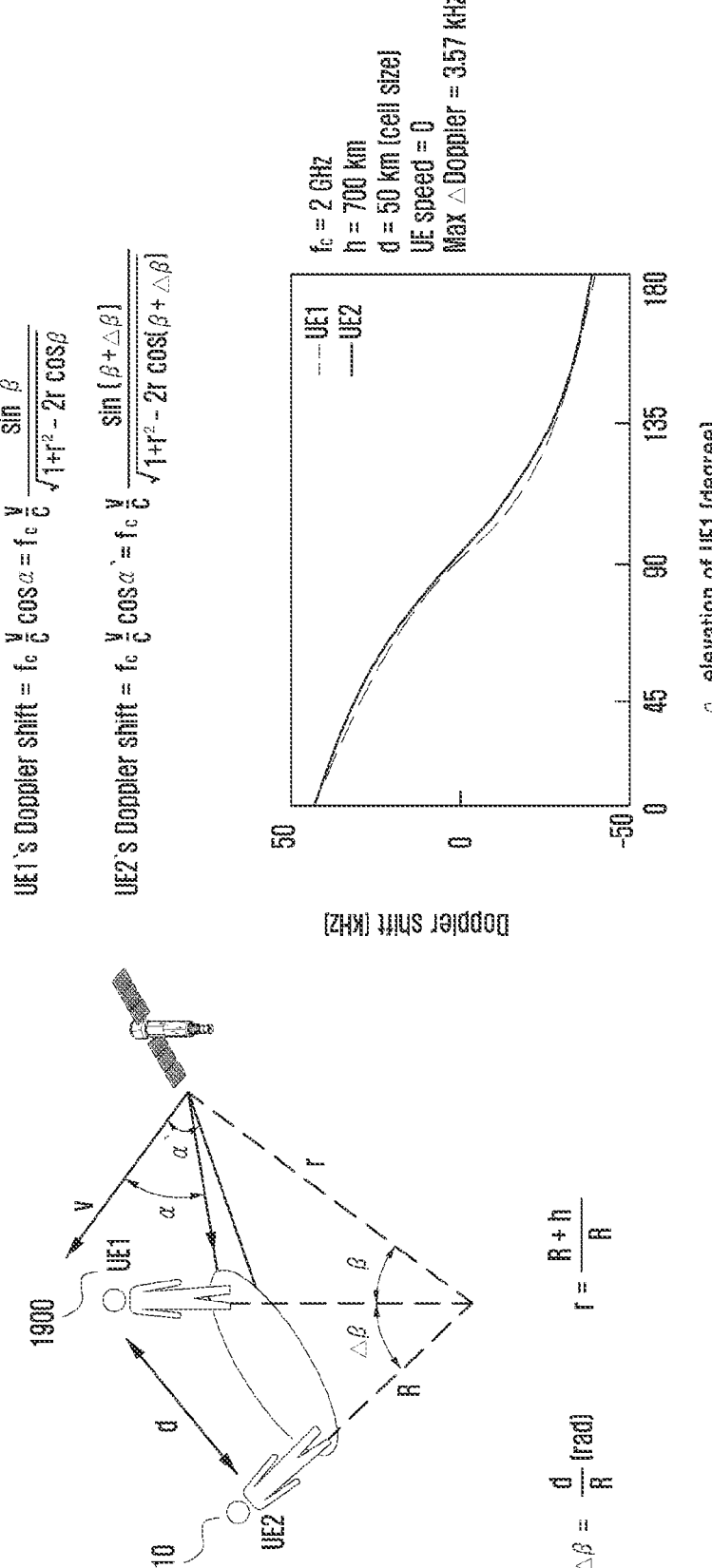
FIG. 19 illustrates Doppler shifts experienced by different terminals in one beam, which is transmitted by a satellite to the ground.

FIG. 19 illustrates Doppler shifts experienced by different terminals in one beam, which is transmitted by a satellite to the ground. In FIG. 19, the Doppler shifts experienced by UE 1 1900 and UE 2 1910 according to the elevation angle θ are calculated, respectively. This is the result obtained under an assumption that the center frequency is 2 GHz, the satellite altitude is 700 km, the diameter of one beam is 50 km on the ground, and the speed of the UE is 0. In addition, the Doppler shift calculated in the disclosure may ignore the effect of the Earth's rotation speed, and this consideration may occur because the Earth's rotation speed is slower than the speed of the satellite.

FIG. 20 shows the difference in Doppler shift occurring in one beam according to the position of a satellite determined from an elevation angle. It can be seen that the difference in Doppler shift within the beam (or cell) is the greatest when the satellite is positioned directly above the beam, that is, when the elevation angle is 90 degrees. This may occur because when the satellite is located above the center, the Doppler shift values at one end of the beam and at the other end have positive and negative values, respectively.

Figure 22:
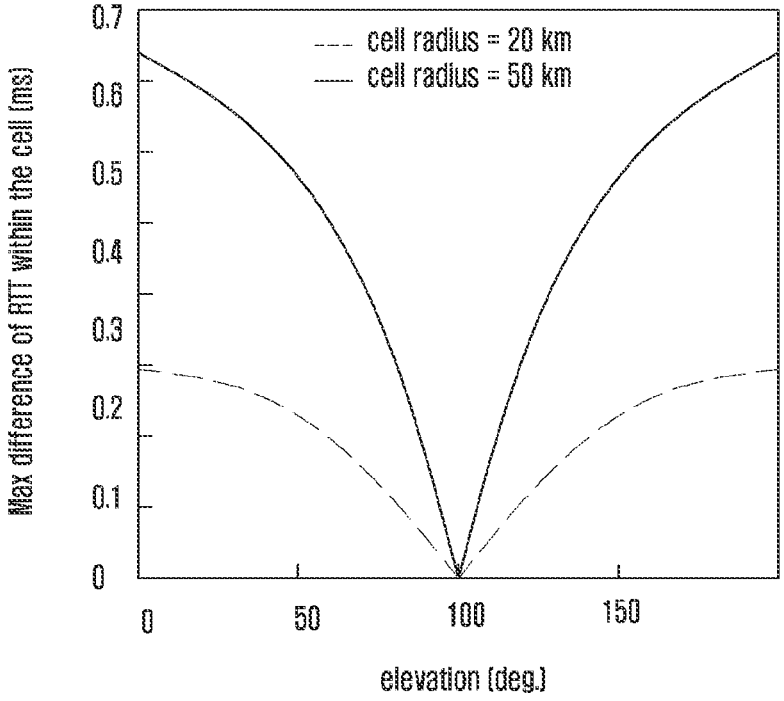
FIG. 22 illustrates a maximum difference value of a round trip latency which varies according to a user's location in one beam.

On the other hand, in satellite communication, since a satellite is far from a user on the ground, a large latency occurs compared to the terrestrial network communication. FIG. 21 illustrates a latency taken from a UE to a satellite and a round trip latency among the UE, the satellite, and a base station according to the location of the satellite determined according to an elevation angle. Reference numeral 2100 indicates the latency from the UE to the satellite, and reference numeral 2110 indicates the round trip latency among the UE, the satellite, and the base station. Here, a latency between the satellite and the base station has been assumed to be equal to a latency between the UE and the satellite. FIG. 22 illustrates the value of maximum difference in round-trip latencies that vary according to a user's position in one beam. For example, when the beam radius (or cell radius) is 20 km, the difference in round-trip latencies to the satellite, which UEs in different positions within the beam experience differently depending on the location of the satellite, is about 0.28 ms or less.

In satellite communication, transmission and reception of a signal to and from a base station by a UE may be understood as that the signal is transmitted through a satellite. That is, in a downlink, a satellite may receive a signal, having been transmitted to the satellite by the base station, and then transmit the received signal to the UE. In an uplink, the satellite may receive a signal, having been transmitted by the UE, and then transmit the received signal to the base station. In the above, after receiving the signal, the satellite may perform frequency shift on the signal to transmit the frequency shifted signal, or may perform signal processing such as decoding, re-encoding, etc., based on the received signal to transmit the signal processed signal.

In a case of LTE or NR, a UE may access the base station through the following procedure.

Stage 1: The UE receives a synchronization signal (or a synchronization signal block (SSB), which may include a broadcast signal) from a base station. The synchronization signal may include a primary synchronization signal (PSS), a secondary synchronization signal (SSS), and a physical broadcast channel (PBCH). The synchronization signal may include information such as a slot boundary and a frame number of a signal transmitted by the base station, downlink and uplink configuration, and the like. In addition, based on the synchronization signal, the UE may acquire a subcarrier offset, scheduling information for system information transmission, and the like.

Stage 2: The UE receives system information (system information block (SIB)) from the base station. The SIB may include information for performing initial access and random access. The information for performing the random access may include resource information for transmitting the random access preamble.

Stage 3: The UE transmits a random access preamble (or message 1 (msg1)) to a random access resource configured in stage 2. The preamble may be a signal determined based on the information configured in stage 2 using a predetermined sequence. The base station receives the preamble transmitted by the UE. The base station attempts to receive a preamble, which is configured in a resource configured by the base station itself without knowing which UE has transmitted the preamble, and if reception of the preamble is successful, the base station may know that at least one UE has transmitted the preamble.

Stage 4: When the preamble is received in stage 3, a base station transmits a random access response (RAR, or message 2 (msg2)) in response thereto. The UE that has transmitted the random access preamble in stage 3 may attempt to receive the RAR transmitted by the base station in this stage 4. The RAR is transmitted on a PDSCH, and a PDCCH for scheduling the PDSCH is transmitted together with the PDSCH or before the PDSCH. A CRC scrambled with an RA-RNTI value is added to DCI for scheduling the RAR, and the DCI (and CRC) is channel-coded and then mapped to the PDCCH and transmitted. The RA-RNTI may be determined based on the time and frequency resources via which the preamble in stage 3 is transmitted.

The maximum time limit until the UE, which has transmitted the random access preamble in stage 3, receives the RAR in the stage 4 may be configured in the SIB transmitted in stage 2. This may be configured limitedly, for example, up to 10 ms or 40 ms. That is, if the UE that has transmitted the preamble in stage 3 does not receive the RAR within a time determined based on, for example, the configured maximum time of 10 ms, the UE may transmit the preamble again. The RAR may include scheduling information for allocating a resource of a signal to be transmitted by the UE in stage 5, which is the next stage.

Figure 23:
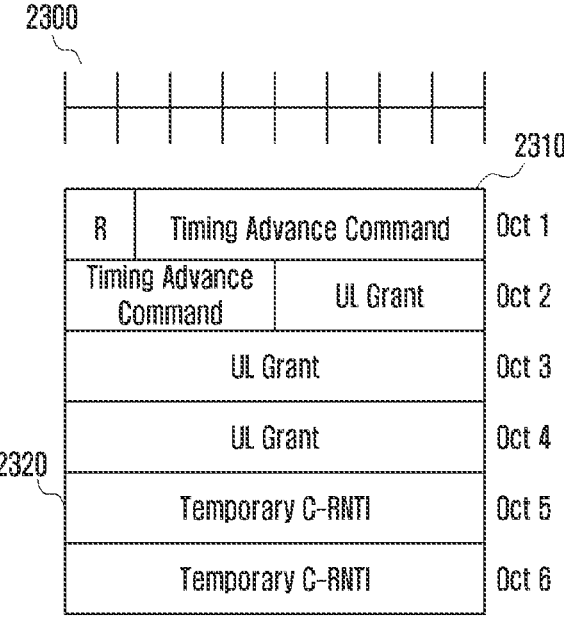
FIG. 23 illustrates an example of an information structure of an RAR.

FIG. 23 illustrates an example of an information structure of an RAR. An RAR 2300 may be, for example, a MAC PDU, and may also include information 2310 on timing advance (TA) to be applied by a UE and a temporary C-RNTI value 2320 to be used from the next stage.

Stage 5: The UE having received the RAR in stage 4 transmits message 3 (msg3) to the base station according to the scheduling information included in the RAR. The UE may include the UE own ID value in the msg3 and transmit. The base station may attempt to receive the msg3 according to the scheduling information transmitted by the base station itself in stage 4.

Stage 6: The base station receives the msg3, identifies the ID information of the UE, and then generates message 4 (msg4) including the ID information of the UE and transmits the generated msg4 to the UE. After transmitting the msg3 in stage 5, the UE may attempt to receive the msg4 to be transmitted in stage 6 thereafter. After receiving the msg4 and performing decoding thereon, the UE may compare the ID value included in the msg4 with the ID value transmitted by the UE itself in stage 5, so as to identify whether the msg3 transmitted by the UE itself is received by the base station. There may be a constraint on time until the UE receives the msg4 in this stage 6 after transmitting the msg3 in stage 5, and this maximum time may also be configured via the SIB in stage 2.

When the initial access procedure using the above stages is applied to satellite communication, a propagation delay required for satellite communication may become a problem. For example, an interval, that is, the maximum time (e.g., a random access window) from time at which the UE transmits a random access preamble (or PRACH preamble) in stage 3 to time at which the UE receives the RAR in stage 4 may be configured via ra-ResponseWindow. In the conventional LTE or 5G NR system, this maximum time may be configured up to about 10 ms.

Figure 24:
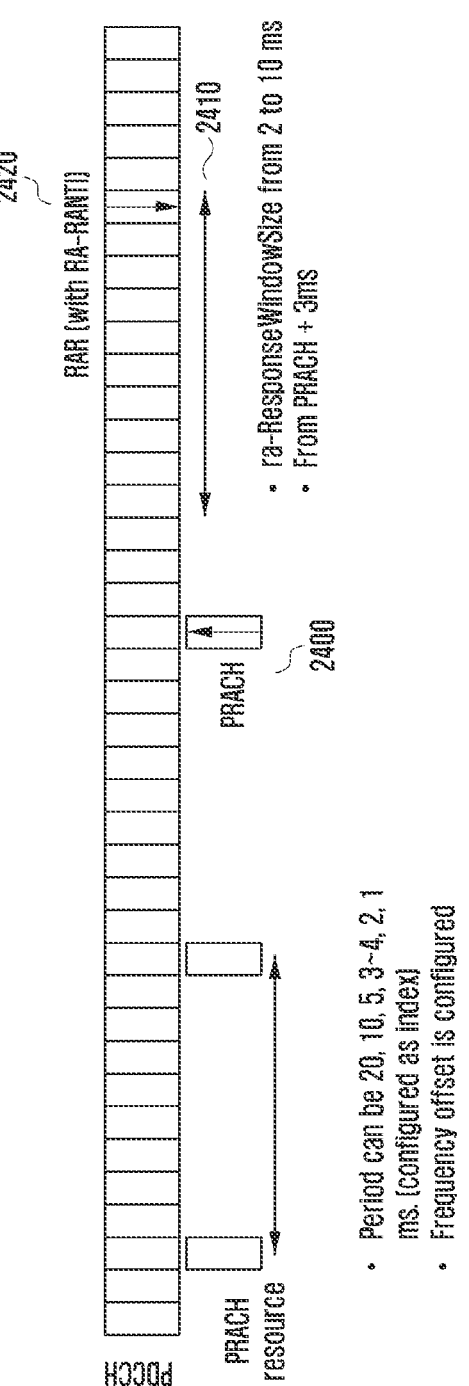
FIG. 24 illustrates an example of relationship between a PRACH preamble configuration resource and an RAR reception timing in an LTE system.
Figure 25:
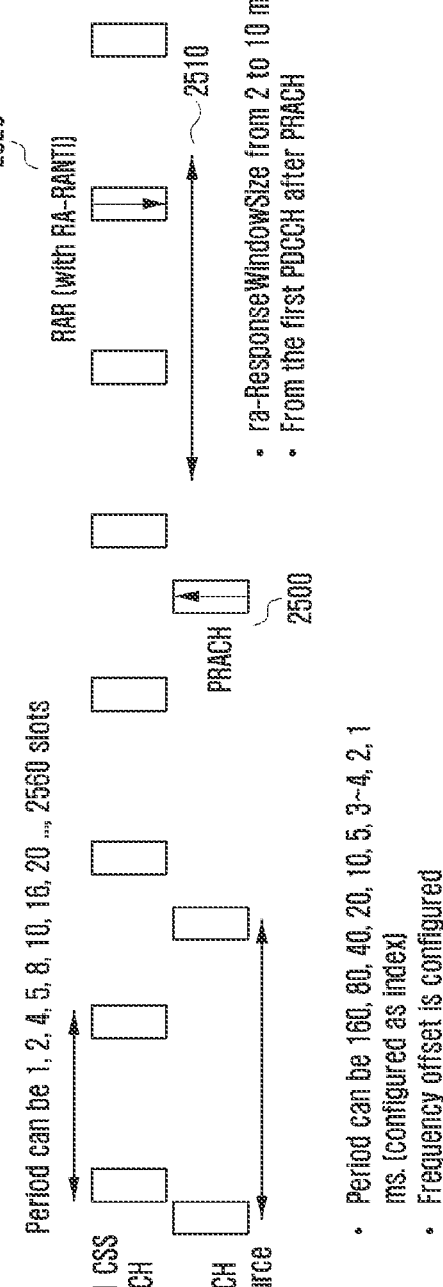
FIG. 25 illustrates an example of relationship between a PRACH preamble configuration resource and an RAR reception timing in a 5G NR system.

FIG. 24 illustrates an example of the relationship between a PRACH preamble configuration resource and an RAR reception timing of the LTE system, and FIG. 25 illustrates an example of the relationship between a PRACH preamble configuration resource and an RAR reception timing of the 5G NR system. Referring to FIG. 24, in a case of LTE, a random access window 2410 starts after 3 ms from a timing at which a PRACH (or a random access preamble) is transmitted (indicated by reference numeral 2400), and the UE may determine that the transmission of the PRACH preamble is successful when receiving the RAR within the random access window (indicated by reference numeral 2420). Referring to FIG. 25, in a case of NR, a random access window 2510 starts from a control information area for RAR scheduling which appears first after a PRACH (or a random access preamble) is transmitted (indicated by reference numeral 2500).

When the UE receives an RAR within the random access window (indicated by reference numeral 2520), the UE may determine that the transmission of the PRACH preamble is successful.

For example, a TA for uplink transmission timing in a 5G NR system may be determined as follows. First, $T_c=1/(\Delta f_{max}\cdot N_f)$ is determined, where $\Delta f_{max}=480\cdot 10^3$ Hz and $N_f=4096$ are given. In addition, $\kappa=T_s/T_c=64$, and this may be defined as $T_s=1/(\Delta f_{ref}\cdot N_{f,ref})$, $\Delta f_{ref}=15\cdot 10^3$ Hz, and $N_{f,ref}=2048$, respectively.

Figure 26:
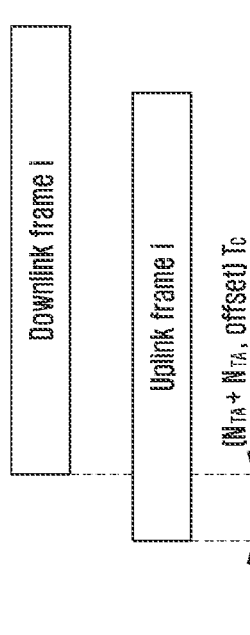
FIG. 26 illustrates an example of downlink frame timing and uplink frame timing in a UE.

FIG. 26 illustrates an example of downlink frame timing and uplink frame timing in a UE. The UE may bring an uplink frame temporally forward by $T_{TA}=(N_{TA}+N_{TA,offset})T_c$, based on a downlink frame timing, to perform uplink transmission. In the above, a value of $N_{TA}$ may be transmitted through an RAR or may be determined based on a MAC CE, and $N_{TA,offset}$ may be a value configured in the UE or determined based on a predetermined value.

The RAR of the 5G NR system may indicate a TA value, and in this case, the TA may indicate one value among 0, 1, 2, ..., and 3846. In this case, if the subcarrier spacing (SCS) of the RAR is $2^\mu\cdot 15$ kHz, the $N_{TA}$ is determined by $N_{TA}=T_A\cdot 16\cdot 64/2^\mu$. After completing the random access process, the UE may receive an indication of the TA change value from the base station, and the TA change value may be indicated through the MAC CE or the like. TA information indicated through the MAC CE may indicate one value among 0, 1, 2, ..., and 63, which is added or subtracted to or from the existing TA value and used to calculate a new TA value. As a result, the TA value may be newly calculated as $N_{TA\_new}=N_{TA\_old}+(T_A-31)\cdot 16\cdot 64/2^\mu$. The indicated TA value may be applied to the uplink transmission by the UE after a predetermined time.

Figure 27A:
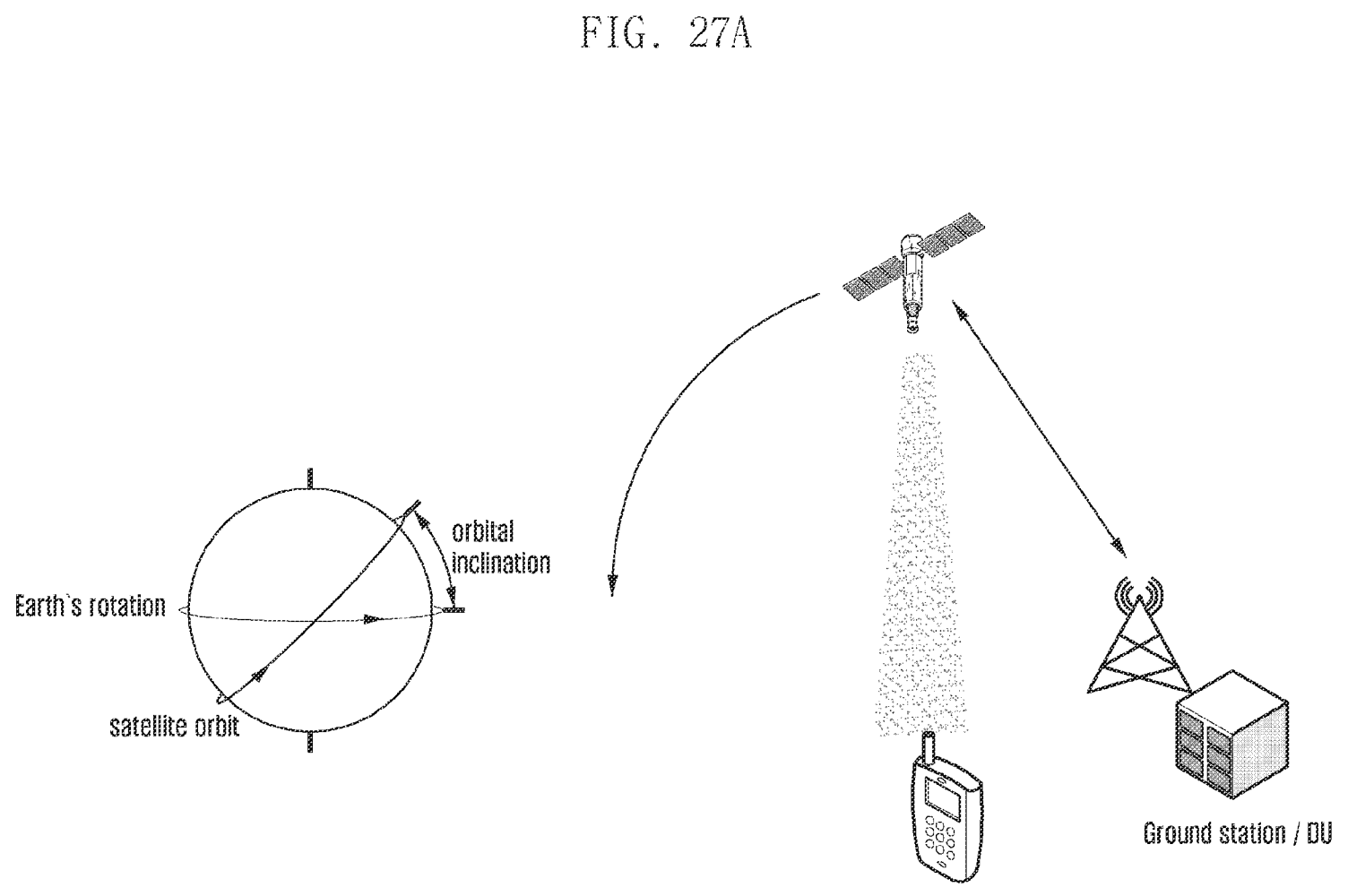

FIG. 27A illustrates an example of continuous movement of a satellite in a UE located on the ground or on the Earth as the satellite revolves around the Earth along a satellite orbit. Since a distance between a UE and a satellite varies according to an elevation angle at which the UE looks at the satellite, a propagation delay among the UE, the satellite, and the base station varies.

Figure 27B:
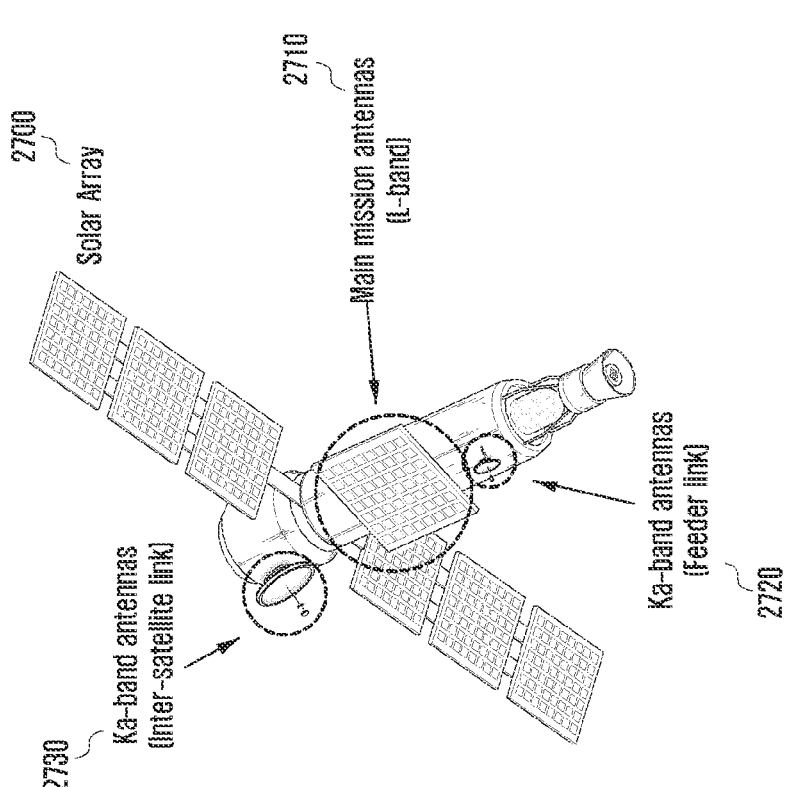
FIG. 27B illustrates an example of a structure of an artificial satellite.

FIG. 27B illustrates an example of the structure of an artificial satellite. The satellite may include a solar panel or solar array 2700 for photovoltaic or solar power generation, a transmission/reception antenna (main mission antenna 2710) for communication with a UE, and a transmission/reception antenna (feeder link antenna 2720) for communication with a ground station, a transmission/reception antenna for inter-satellite communication (inter-satellite link) 2730, a processor configured to control transmission/reception and perform signal processing, and the like. In a case where inter-satellite communication is not supported according to the satellites, an antenna for transmitting/receiving signals between satellites may not be included. In FIG. 27B shows that an L band of 1 to 2 GHz is used for communication with the UE, but high frequency bands, such as a K band (18 to 26.5 GHZ), a Ka band (26.5 to 40 GHz), and a Ku band (12 to 18 GHz) may also be used.

In a UE-satellite direct communication, since a distance between a UE and a satellite and a distance between the satellite and a base station are long, and the satellite moves continuously, a time offset due to a propagation delay, etc. occurs when a signal transmitted by the base station or the UE is received by the UE or the base station. Accordingly, the disclosure provides a method and an apparatus in which a base station indicates time offset information so as to enable correction of the time offset, and a UE corrects the time offset accordingly. The following embodiment has been described on the assumption that a UE communicates with a satellite and a ground station, and a case of communication between a satellite base station and a UE is not excluded. In the disclosure, a time offset may be used interchangeably used with timing advance.

First Embodiment

The first embodiment provides a method and apparatus in which a base station indicates time offset information to a UE, and the UE applies the indicated value.

A UE may estimate a propagation delay between a satellite and the UE based on the location of the UE and a location of the satellite, and may perform uplink transmission by correcting the estimated propagation delay value by the UE itself. For example, the satellite may transmit information about the location of the satellite via broadcast information, and the UE may receive the information about the location of the satellite transmitted by the satellite and compare the location of the satellite with the location of the UE. The location of the UE may be found by using a global positioning system (GPS) or the like. The UE may calculate uplink transmission time by estimating a time required for a radio wave to be transmitted to the satellite based on a result of comparing the location of the satellite with the location of the UE. For example, in case that the UE receives a signal in a slot n via a downlink at a specific timing and needs to perform uplink transmission corresponding to the received signal in a slot n+k, the UE may perform the uplink transmission earlier, by 2*Td, than a timing of the slot n+k. In the above, Td may correspond to a propagation delay from the UE to the satellite, calculated based on the location information of the satellite and the UE. The propagation delay Td may be a value obtained by dividing a distance between the UE and the satellite by the speed of light. In the above, the location of the satellite may be a value calculated based on the slot n+k in which the UE performs the uplink transmission. This is because the location of the satellite in a slot n and the location of the satellite in a slot n+k may be different according to the movement of the satellite.

FIG. 28 illustrates an example of a difference in a propagation delay in a terrestrial network and a/satellite network. In a case of a terrestrial network, a propagation delay of 1 ms or less occurs when considering a distance to a base station of up to about 100 km. However, in a case of a satellite network, a distance to the satellite may be several thousand km and a distance from the satellite to the base station may also be several thousand km, and thus a propagation delay may be much larger than that of the terrestrial network. In a case of satellite network communication, a propagation delay varies depending on the altitude and the elevation angle of the satellite. FIG. 28 shows a distance between the UE and the satellite according to the elevation angle when the altitude of the satellite is 700 km and the time required for a radio wave to travel back and forth. In FIG. 28, in a case of a satellite network, a low-orbit satellite has been assumed, and therefore, it is shown that a radio round trip time (radio RTT) may occur from 40.9 ms to 9.3 ms when the elevation angle is 0 to 180° (the radio RTT may include RTT required for a signal to be transmitted/received between a transmitter and a receiver and a processing time consumed at a counterpart node).

FIG. 29 illustrates an example of applying a timing advance in a terrestrial network and a satellite network. Since a maximum propagation delay is within 1 or 2 ms in a terrestrial network, a slot timing at which a base station transmits a downlink and a slot timing at which the base station receives an uplink may match based on a timing advance provided by LTE and 5G NR systems (that is, a DL slot index and a UL slot index may match). That is, if a UE performs an uplink transmission earlier than a downlink timing by a timing advance value indicated by a base station, when the uplink signal transmitted by the UE is received by the base station, the uplink signal reception timing coincides with the downlink timing of the base station.

Meanwhile, in a satellite network, it may be impossible to match a slot timing for a base station to transmit a downlink and a slot timing for the base station to receive an uplink based on a timing advance provided by the conventional LTE and 5G NR systems. This is why propagation delay that occurs in the satellite network is much longer than propagation delay that occurs in a terrestrial network by tens of ms, and therefore, this propagation delay is longer than a maximum value of a timing advance considered in the conventional LTE and 5G NR systems.

Figure 30:
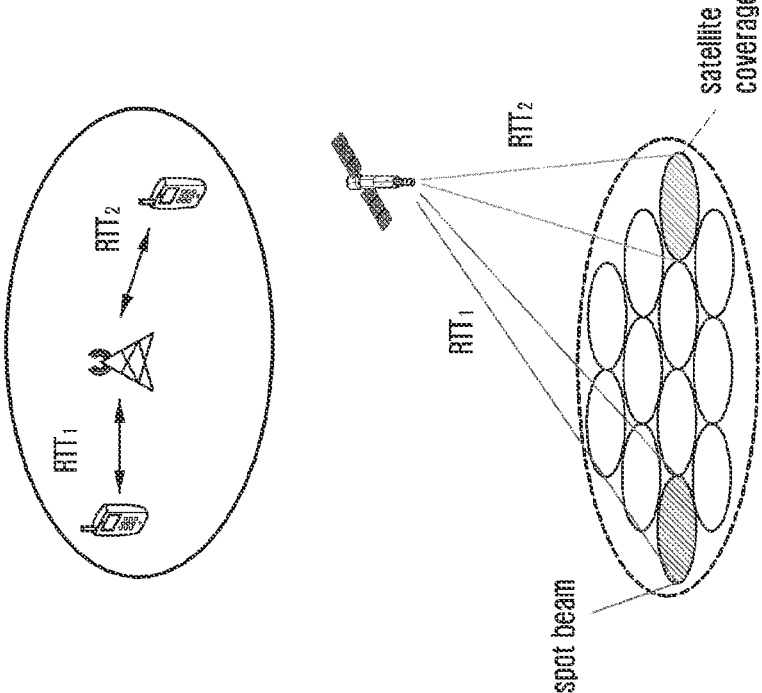
FIG. 30 illustrates an example of a maximum difference value among difference values in round trip propagation delay among a UE, a satellite, and a base station, experienced by a plurality of users when the users are located in one beam transmitted by a satellite.

FIG. 30 illustrates an example of a maximum difference value among difference values in round trip propagation delay among a UE, a satellite, and a base station, experienced by multiple users when the users are located in one beam among a plurality of beams transmitted by a satellite. FIG. 30 shows that the smaller the beam size is, the smaller the difference in the round trip propagation delay according to an elevation angle experienced by a user is.

Figure 31A:
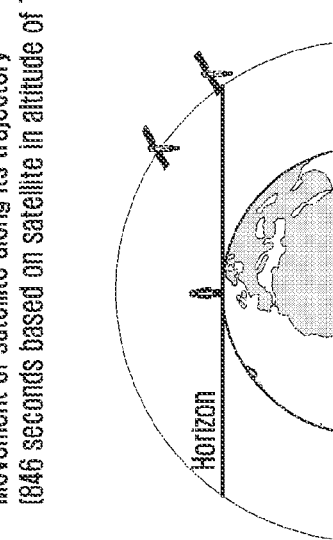
FIG. 31A illustrates an example of a round trip time between a UE and a base station which varies according to a movement of a satellite along an orbit.

FIG. 31A illustrates an example of a round trip propagation delay between a UE and a base station which varies according to a movement of a satellite along an orbit. Referring to FIG. 31A, since a satellite moves along an orbit, and a round trip propagation delay between a UE and a base station may change according to passage of time. It may be seen that, in a terrestrial network, a propagation delay changes at a time equal to or less than a predetermined period of time, whereas, in a satellite network, a variation in the propagation delay is very large according to passage of time.

The satellite instructs the UE to time offset information by using the following method, and the UE may correct the transmission time using the indicated time offset information according to the following method so as to perform downlink or uplink signal transmission and reception.

Method 1: the size of a bit field for an indication range for propagation delay, an indication of the propagation delay, or an indication of a timing advance may be determined based on a frequency area or a frequency band (or spectrum). For example, an RAR MAC CE may include 12-bit TA information for a frequency area having a center frequency of 1 GHz or less, and include 16-bit TA information for a frequency area having a center frequency greater than 1 GHz.
    Method 2: a base station may indicate a rate of change of a timing advance. A satellite moves regularly according to time, and thus propagation delay may change linearly in a specific time interval. Accordingly, a base station may indicate, to a UE, how to change a TA in the future by indicating, to the UE, propagation delay or a rate of change of the timing advance. A rate of change of a time offset (or the timing advance) may correspond to amount of change in a TA to be applied at a specific time point in the future. Together while indicating the rate of change of the time offset or in advance thereof, the base station may configure, for the UE, a time period and a timing for applying the rate of change of the time offset, together or previously, via L1 control information (e.g., DCI) or higher layer signaling. The higher layer signaling may be, for example, a MAC CE or RRC signaling rather than a physical layer signal.

Figure 31B:
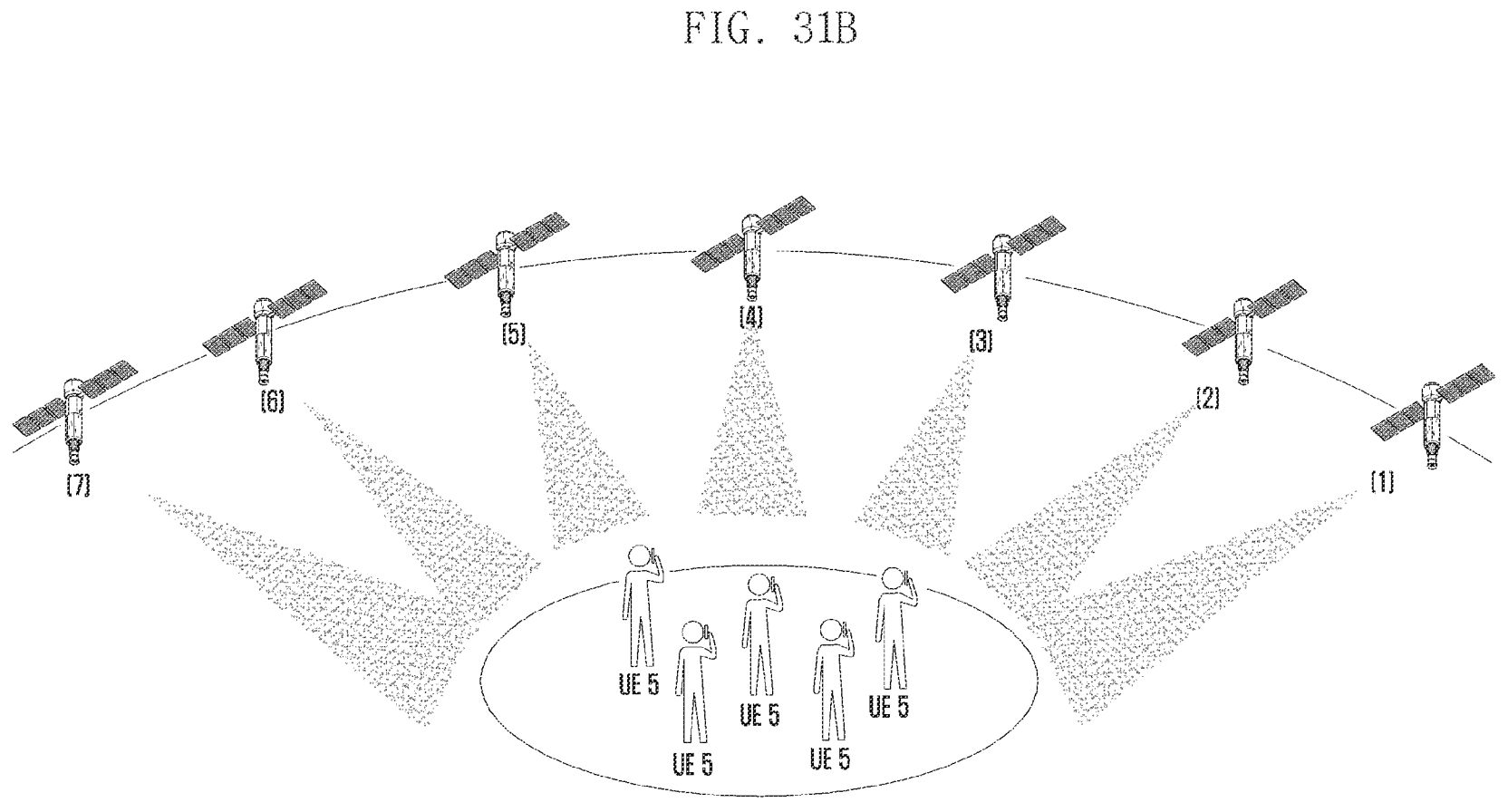

Method 3: a TA value or a rate of change of the TA may be indicated to one or more UEs on a group basis (e.g., group-common) via the same DCI or the same MAC CE. According to the method 3, the TA or the rate of change of the TA may be indicated to the one or more UEs via the same indication information field, or the TA or the rate of change of the TA may be indicated to each UE via a different indication information field. If a TA or a rate of change of the TA is indicated to different UEs via different indication information fields, a location of a bit field which a UE needs to interpret or an offset value of the location of the bit field may be pre-configured. The UE may identify a value of the bit field to be applied to the corresponding UE based on the location of the bit field or the offset information of the location of the bit field. FIG. 31B illustrates an example in which a plurality of UEs are located in one beam area provided by one satellite. As shown in FIG. 31B, UEs located in one beam area provided by a satellite may transmit and receive signals to and from the same satellite, and thus propagation delay and change values of Doppler shift may be similar. Therefore, UEs, for example, a UE1, a UE2, a UE3, a UE4, and a UE5 which are located in one beam in FIG. 32B may perform a time offset correction for correcting propagation delay or timing advance values based on the same indication information.

Figure 31C:
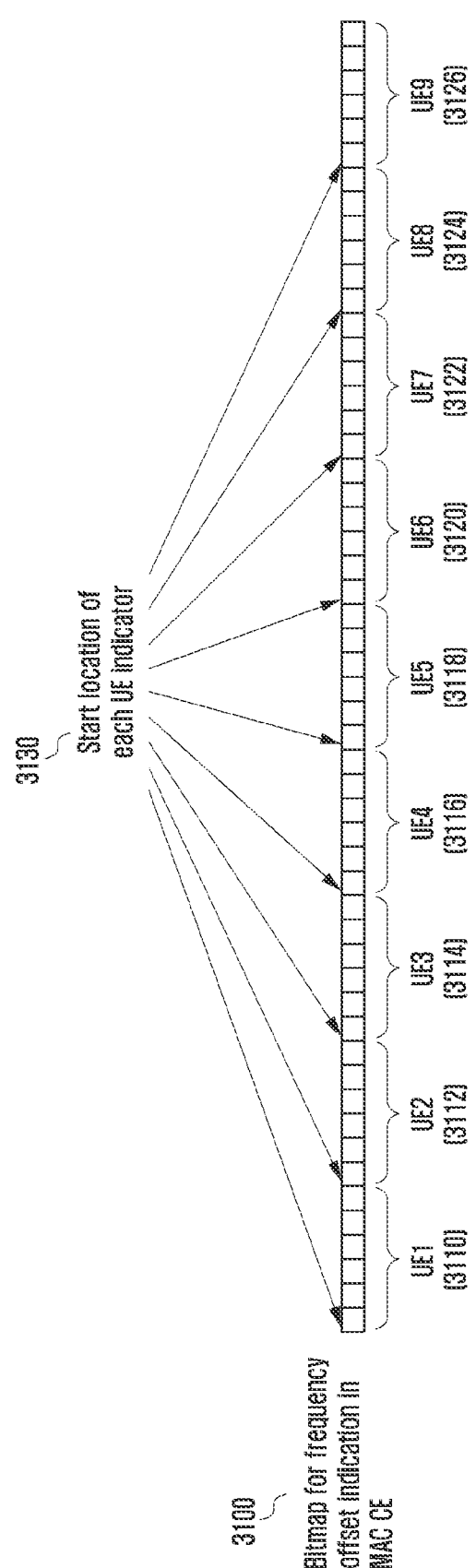
FIG. 31C illustrates an example of indicating a time offset to UEs included in one group by using one MAC CE.

FIG. 31C illustrates an example of indicating a time offset to UEs included in one group by using one MAC CE. Referring to FIG. 31C, when a time offset is indicated to UEs 3110, 3112, 3114, 3116, 3118, 3120, 3122, 3124, and 3126 included in one group in a group unit by using the same MAC CE 3100, the one MAC CE may include time offset indication information for the multiple UEs. Here, a start location 3130 of a time offset indicator for each UE may be configured in advance via higher layer signaling. In addition, time offset indication information may be transmitted to UEs in a group unit via DCI as well as a MAC CE. Here, a bit field indicating a plurality of TAs may be a part of the DCI. For example, a DCI format including the bit field indicating the plurality of TAs may be used. In this case, the UEs in a group may perform blind decoding by using a value of an RNTI which is predefined or configured via higher layer signaling.

Method 4: a TA value to be commonly applied by a UE corresponding to a specific beam may be indicated in system information via an SIB. For example, a time offset TA_offset may be calculated by TA_offset1+ TA_offset2, where TA_offset1 may be a value commonly configured or indicated to UEs belonging to a corresponding beam, and TA_offset2 may be a value configured or indicated to a specific UE. Here, TA_off-set2 may be configured by using at least one of the methods 1 to 3.
    Method 5: a base station may configure a unit of a time offset to the corresponding UE via RRC configuration.

If the base station indicates the unit of the time offset via the RRC configuration and indicates the number of units of the time offset via a MAC CE or DCI, the UE may calculate an accurate time offset value by using the unit of the time offset. As a modified example, the base station may indicate candidate values of the unit of the time offset via RRC configuration, and indicate one of the candidate values via MAC CE or DCI. Here, the candidate values of the unit of the time offset may be configured via RRC signaling within a predetermined range, and if only one candidate value is configured as the candidate values of the unit of the time offset, the configured one candidate value may be applied without the MAC CE or DCI.

Method 6: a time offset value may be configured to a UE via RRC configuration. Alternatively, the time offset value may be delivered to the UE based on a combination of the RRC configuration and a MAC CE.

The methods are not mutually exclusive, and a combination of more than one method may be used.

Second Embodiment

The second embodiment provides a method and apparatus for a base station or a satellite to indicate a TA value to a UE. In the disclosure, a satellite may be an object located high above the ground, and may be a concept including an airplane, an airship, and the like.

Figure 32:
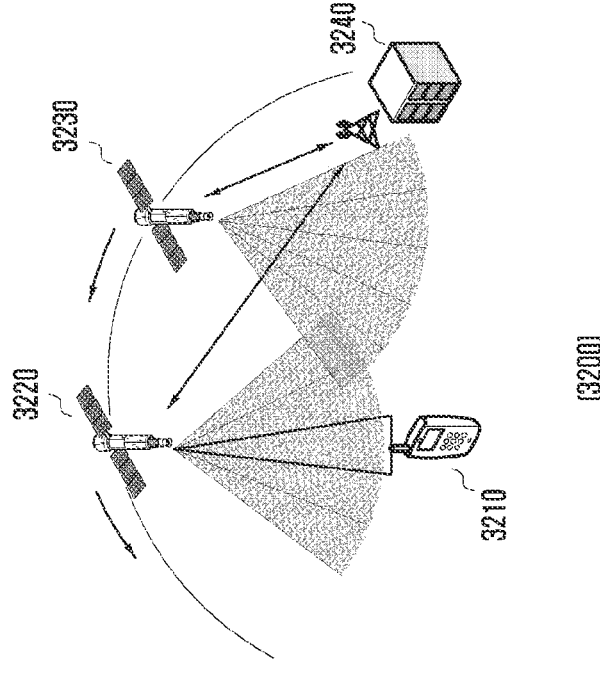
FIG. 32 illustrates an example in which a beam or satellite to which a UE is connected is changed, but a terrestrial base station connected to the UE is not changed.
Figure 33:
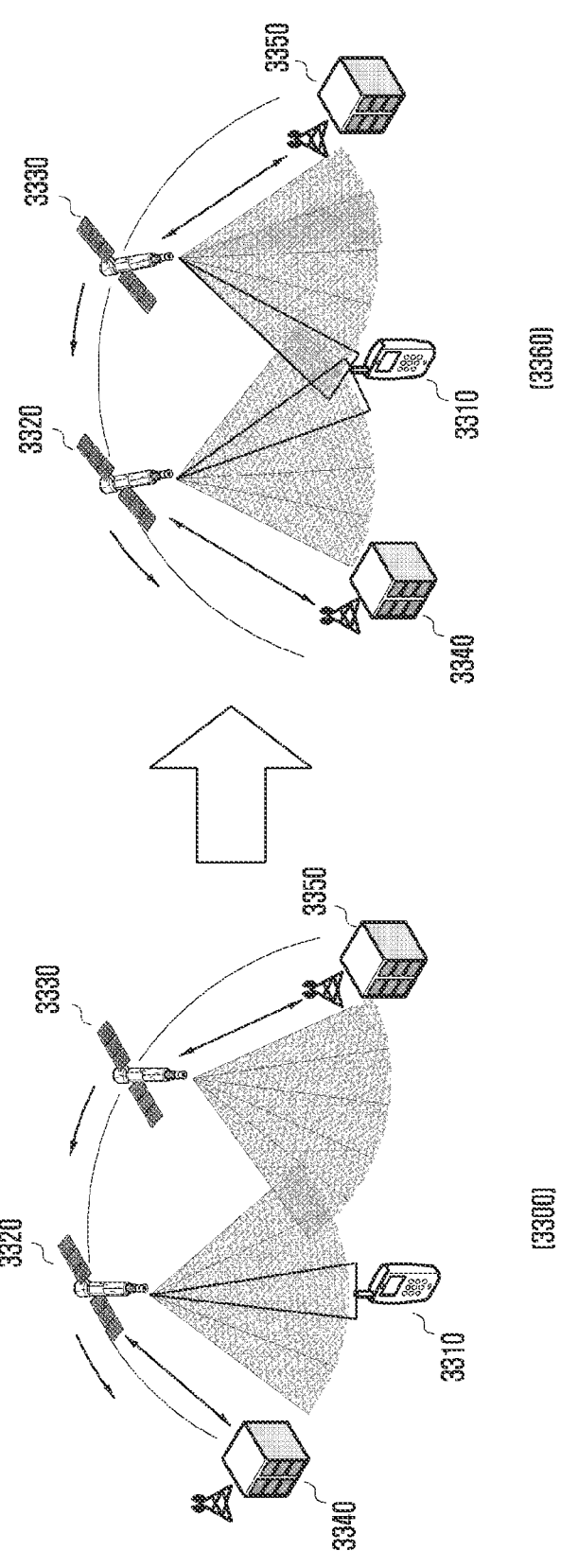
FIG. 33 illustrates an example in which, when a beam or satellite to which a UE is connected (or from which the UE receives a service) is changed, a terrestrial base station or a ground station connected to the UE is also changed.

FIGS. 32 and 33 illustrate an example in which a satellite or a beam from which one UE receives a service is changed according to the movement of a satellite when one satellite performs transmission and reception using a plurality of beams. FIG. 32 illustrates an example in which a beam or satellite to which a UE is connected (or from which a UE receives a service) is changed, but the terrestrial base station or ground station connected to the UE is not changed. As a specific example, in a case of reference numeral 3200, a UE 3210 is connected to satellite 1 3220 to communicate with a ground station 3240, and when the location of the satellite is changed as in reference numeral 3250 according to the movement of the satellite, the UE 3210 is connected to satellite 1 3220 and communicates with the ground station 3240 while the beam used for connection with satellite 1 may be changed, or the UE 3210 may be connected to satellite 2 3230 and communicate with the ground station 3240. FIG. 33 illustrates an example in which, when a beam or satellite to which a UE is connected (or from which a UE receives a service) is changed, a terrestrial base station or ground station connected to the UE is also changed. As a specific example, in a case of reference numeral 3300, a UE 3310 is connected to satellite 1 3320 to communicate with ground station 1 3340, and when the location of the satellite is changed as in reference numeral 3360 according to the movement of the satellite, the UE 3310 may be connected to satellite 2 3330 to perform communication with ground station 2 3350.

In case that a satellite or beam for transmitting a signal to the UE is changed in the above, a timing advance (TA) value for uplink time synchronization may be suddenly greatly changed. In this case, the base station needs to notify the UE of the changed TA value so that signal interference with a signal transmitted by another UE may not occur. In order to notify of a large amount of change in the TA value, a method of increasing the number of bits of the TA indicator or configuring the granularity (unit) of the TA value indicated by the bit value may be used. Alternatively, in order to notify of a TA again, if the satellite or beam for transmitting/ receiving signals to/from the UE is changed, the UE may restart the random access process, but if the satellite or/and beam is frequently changed, overhead due to the random access process increases, and thus data transmission rate or service quality may decrease.

The disclosure provides a TA indication method and apparatus for transmitting, to a UE, a TA value that is suddenly and greatly changed.

Figure 34:
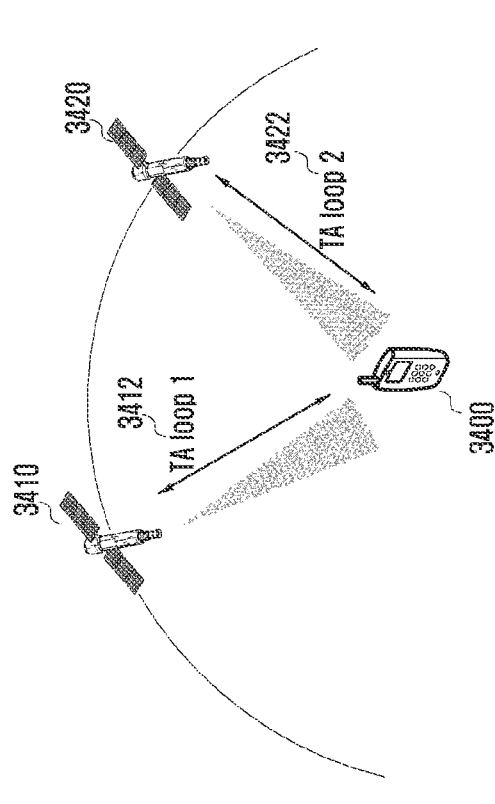
FIG. 34 illustrates an example of a TA loop.

The UE and the base station may store a plurality of candidates for the TA value. For example, the UE and the base station each store four TA candidate values, and according to the instruction of the base station, the UE may continuously update the four TA candidate values or apply the corresponding values as actual TAs. Each TA candidate value may be referred to as a TA loop. The base station may indicate a TA value, which needs to be updated or applied by the UE, by notifying of a TA loop index in the process of indicating a TA for the UE. FIG. 34 illustrates an example of a TA loop. An example is shown in which, when a UE 3400 is connected to one or more satellites 3410 and 3420 or when the connection is changed from one satellite 3410 to another satellite 3420, multiple. TA loops for applying different TA values are defined (for example, TA loop 1 3412 applied to satellite 1 3410, and TA loop 2 3422 applied to satellite 2 3420 may be configured), and the base station and the UE understand this situation. In a process of accessing one base station, the UE receives a TA value to be applied when the UE performs uplink transmission in a random access (RACH) stage. The TA value received in the RACH stage may be determined as a TA value of TA loop index 0. Thereafter, the UE may also be configured with other TA candidate values. Index numbers such as TA loop index 1, 2, 3 may be attached to the TA candidate values configured. Table 21 is a table describing the values of the TA loop configured for the UE. TA loop indices 0 to 3 may respectively correspond to the configured TA values, and each TA value may be different from each other.

TABLE 21

| Index/TCI | Current TA value |
|-----------|------------------|
| 0 | 0 |
| 1 | 200 |
| 2 | 500 |
| 3 | 800 |

In the above, the number of TA loops may be configured by the base station to the UE through higher layer signaling such as RRC signaling or MAC CE. In the above, the signaling for the base station to configure for the UE may be transmitted to the UE via a satellite. Alternatively, the number of TA loops may be determined as a fixed value, or may be a value configured based on the capability of the UE. The UE may report UE capability information related to the number of TA loops, which can be supported by the UE itself, to the base station.

In order to indicate one of the values of the TA loop, the base station may indicate the index of the TA loop to the UE using one-bit field of DCI or the value of MAC CE. For example, the base station may indicate the TA loop index using some bits of the DCI in order to indicate the TA value to be applied by the UE while scheduling PUSCH, which is uplink data, via DCI, and the UE may transmit the scheduled PUSCH by applying a TA value corresponding to the indicated TA loop. And/or as an example, the base station may indicate an index of a TA loop to be applied by the UE by using the MAC CE, and may apply a TA change value indicated by the MAC CE to a TA value corresponding to the indicated TA loop. In this case, the MAC CE may include a TA loop index and one or more TA change values for the TA loop index.

Figure 35A:
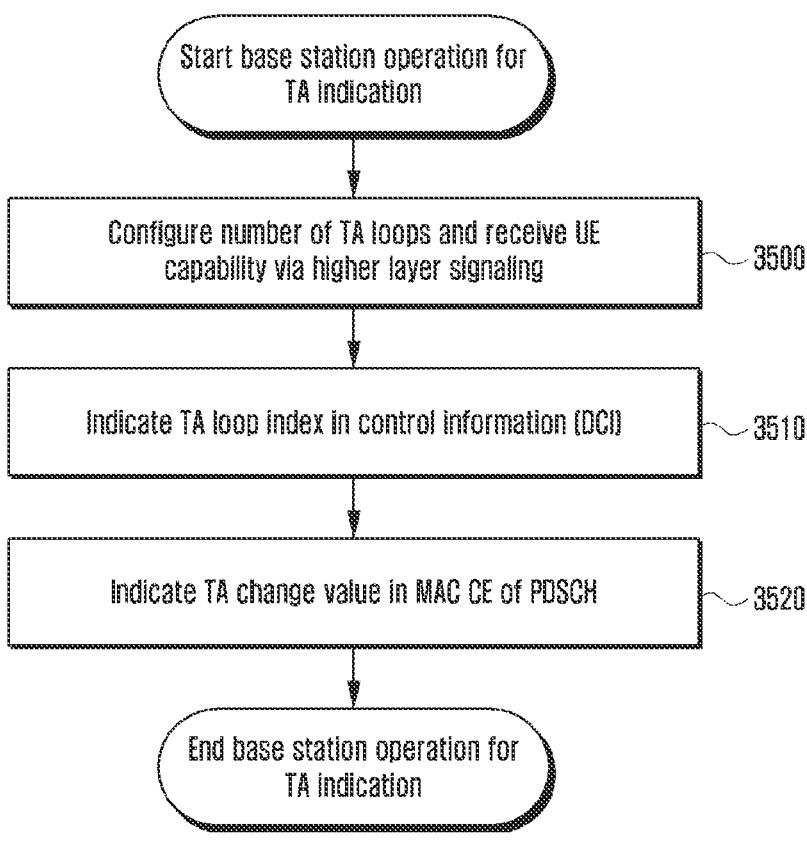
FIG. 35A illustrates an example of a base station operation for such a TA change.
Figure 35B:
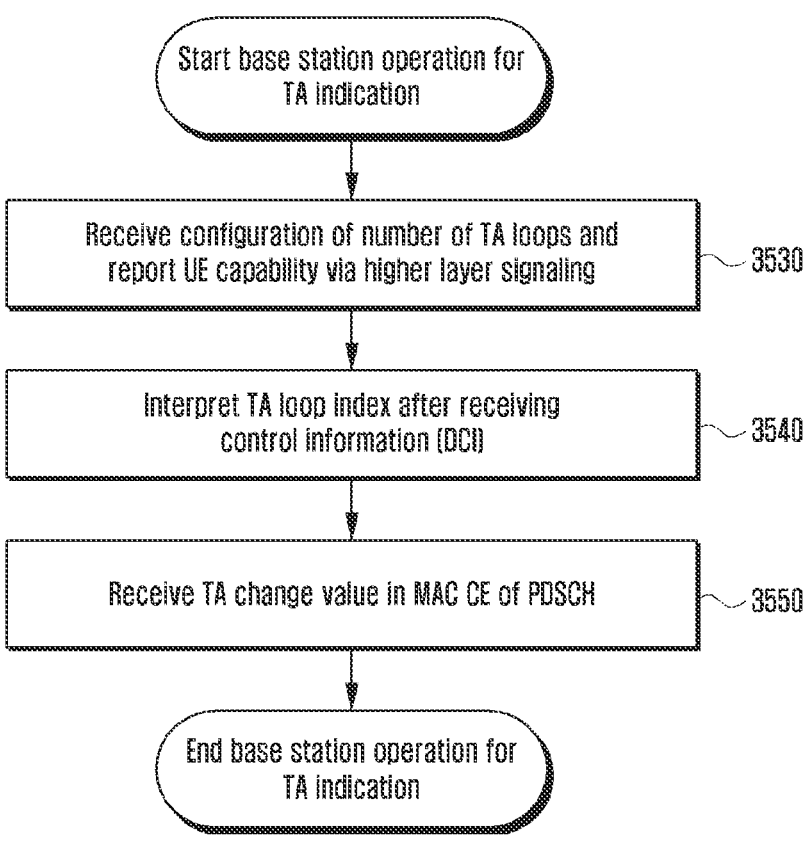
FIG. 35B illustrates an example of a UE operation for such a TA change.

FIGS. 35A and 35B illustrate an example of operations of a base station and a UE for such TA change. FIG. 35A is an operation of a base station for a TA indication. The base station configures the number of TA loops to the UE via higher layer signaling. This configuration may be performed by transmitting information on the number of TA loops or transmitting configuration information about the index of each TA loop. This configuration may be performed based on UE capability information related to the TA loop transmitted by the UE (indicated by reference numeral 3500). The base station instructs the TA loop index to the UE by using some bit fields included in the L1 control information (e.g., DCI) (indicated by reference numeral 3510). The base station may indicate a change value of TA with respect to the TA value of the indicated TA loop index via the MAC CE transmitted on the PDSCH (indicated by reference numeral 3520).

FIG. 35B is a UE operation for a TA indication. The UE receives the number of TA loops configured from a base station via higher layer signaling. This configuration may be performed by receiving information on the number of TA loops or receiving configuration information on the index of each TA loop. The UE may transmit UE capability information, which is related to the TA loop, to the base station (indicated by reference numeral 3530). The UE receives L1 control information (e.g., DCI), and obtains an indicated TA loop index using some bit fields included in DCI (indicated by reference numeral 3540). The UE may receive a TA change value with respect to the TA value of the indicated TA loop index via the MAC CE received on the PDSCH (indicated by reference numeral 3550). The UE may use the applied TA value to uplink transmission. Each of the stages shown in FIGS. 35A and 35B may be applied by changing the order, and other stages may be added or omitted.

Figure 36A:
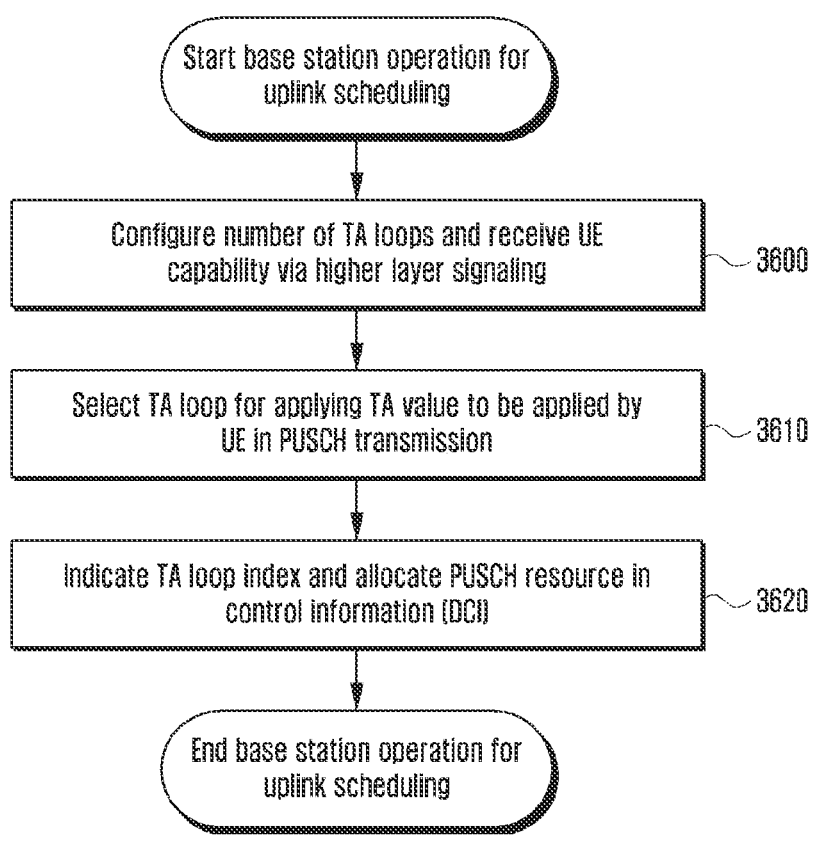
FIG. 36A illustrates an example of a base station operation for transmitting a PUSCH by applying a TA indication.
Figure 36B:
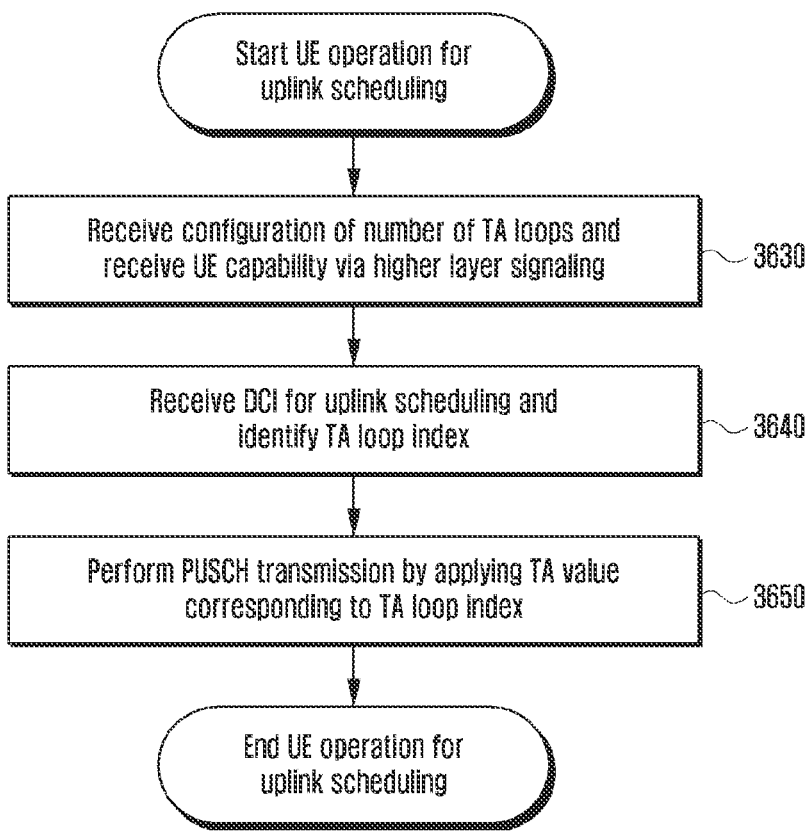
FIG. 36B illustrates an example of a UE operation for transmitting a PUSCH by applying a TA indication.

The UE may apply the determined TA value to HARQ ACK/NACK feedback transmission, uplink data transmission, PUSCH and PUCCH transmission, and the like. FIGS. 36A and 36B illustrate an example of operations of a base station and a UE transmitting a PUSCH by applying a TA indication. FIG. 36A illustrates an operation of a base station. The base station configures the number of TA loops to the UE via higher layer signaling. This configuration may be performed by transmitting information on the number of TA loops or transmitting configuration information about the index of each TA loop. This configuration may be performed based on UE capability information, which is related to the TA loop and transmitted by the UE (indicated by reference numeral 3600). The base station identifies the TA value to be applied by the UE when receiving the PUSCH, and identifies the TA loop index for indicating the TA value (indicated by reference numeral 3610). The base station transmits a UL grant for scheduling PUSCH to the UE, and the UL grant includes a bit field indicating a TA loop index and a bit field indicating resource allocation information for PUSCH transmission (indicated by reference numeral 3620).

FIG. 36B illustrates an operation of a UE. The UE receives the number of TA loops configured from a base station via higher layer signaling. This configuration may be performed by receiving information on the number of TA loops or receiving configuration information about the index of each TA loop. This configuration may be performed based on UE capability information, which is related to the TA loop and transmitted by the UE (indicated by reference numeral 3630). The UE receives a UL grant for scheduling a PUSCH from the base station, and the UL grant includes a bit field indicating a TA loop index and a bit field indicating resource allocation information for PUSCH transmission. The UE identifies the TA loop index indicated by the base station based on the bit field (indicated by reference numeral 3620). The UE identifies a TA value corresponding to the TA loop index, and transmits the PUSCH by applying the TA value (indicated by reference numeral 3650). Each of the stages shown in FIGS. 36A and 36B may be applied by changing the order, and other stages may be added or omitted.

In connection with indicating the index of the TA loop in some bits of the DCI in the above, the DCI may denote DCI for uplink scheduling, and the UE performs uplink transmission scheduled by the DCI using the TA value corresponding to the TA loop index indicated above. Alternatively, when the DCI corresponds to DCI for scheduling downlink data and indicates a TA loop index, the UE may perform transmission by applying a TA value corresponding to the indicated TA loop index during transmission of a PUCCH transmitting HARQ-ACK corresponding to the downlink data.

Alternatively, the DCI may include a bit field indicating a TA value or a TA change value via DCI for scheduling downlink data, or may correspond to a separate DCI format indicating a TA value or a TA change value. Here, in case that the TA loop index is indicated via DCI, a change indicated by the DCI may be applied only to the TA value of the corresponding index, or in case that the TA loop index is not included in the DCI, a change indicated by the DCI may be applied to the TA values corresponding to all TA loops. Whether the TA loop index is included in DCI and indicated may be configured via higher layer signaling of the base station, or/and may be determined based on the number of TA loops supported by the UE (i.e., capability of the UE).

Alternatively, in a case of DCI scheduling downlink data, the base station may indicate a TA value or a TA change value in MAC CE transmitted through a PDSCH scheduled by the corresponding DCI. Here, if the TA loop index is indicated in the DCI, a change indicated by the MAC CE may be applied only to the TA value of the corresponding index, or if the TA loop index is not included in the DCI, changes indicated by the MAC CE may be applied to TA values corresponding to all TA loops. Whether the TA loop index is included in DCI and indicated may be configured via higher layer signaling of the base station, or/and may be determined based on the number of TA loops supported by the UE (i.e., capability of the UE).

As described above, when a TA value or a TA change value is indicated via DCI for scheduling downlink data or in a separate DCI format, or in a MAC CE transmitted through a PDSCH scheduled by the DCI for scheduling downlink data, the UE may apply the TA, having been applied in the above, to PUSCH or PUCCH transmission scheduled later. If a TA loop index is indicated as being included in DCI in a separate DCI format or DCI for scheduling downlink data, the UE may apply the TA value of the TA loop index indicated via the DCI to the PUSCH or PUCCH transmission scheduled later. A bit field indicating a TA loop index may not be included in the DCI for scheduling the PUSCH scheduled later or DCI scheduling a PDSCH associated with a PUCCH (or HARQ-ACK).

Third Embodiment

The third embodiment provides a method and apparatus in which a UE transmits (reports) a timing advance (TA) value, having been applied or being applied by the UE itself, to a base station or a satellite.

The UE may perform an operation of transferring the TA value being applied by the UE itself to the base station. This operation may be performed, when the UE applies a TA value without a separate instruction from the base station, in order to notify the base station of the applied TA value, or to identify or determine how the UE is applying the TA value indicated by the base station. For example, when a satellite to which the UE is connected is changed, this operation may be performed so that the satellite newly connected to the UE may identify the TA value of the UE. For example, the UE may apply the TA, calculated based on the locations of the UE and the satellite, by itself.

In order for the UE to report the TA value to the base station, a combination of at least one of the following methods may be used.

Method 1: a base station may trigger TA value reporting of a UE via DCI. The base station may trigger the TA value reporting via, for example, some bit field values of the DCI or a combination of values of bit fields of the DCI. A field indicating the triggering of the TA value reporting may be included in the DCI. In this case, the UE may identify that the TA value reporting is triggered if the field in received DCI is configured to a specific value. Alternatively, if a value of at least one field (for example, for a different use) included in the received DCI is configured to a predetermined value, the UE may identify that the TA value reporting is triggered. In addition, the UE may transfer, to the base station, a TA value at a specific time point based on a time point at which the UE receives the DCI.

Method 2: a base station may trigger TA value reporting of a UE via a MAC CE. The base station may trigger the TA value reporting by using some bit values or a value of a bit field of the MAC CE, and the UE may report, to the base station, a TA value at a time point at which the UE receives the MAC CE or a TA value at a time point after a predetermined time from the time point at which the UE receives the MAC CE.

Method 3: a base station may indicate which TA value a UE needs to report via RRC configuration. For example, the base station may configure a period and an offset value for TA reporting and/or a specific condition in which the UE reports a TA value via higher layer signaling, and thus the UE may determine at which time point to report the TA value. In this case, the base station may also designate reference TA value application time (i.e., time to which a TA value to be reported is applied) (Hereinafter, referred to as "TA value reference time point"). In the above, the specific condition for the UE to report the TA value may correspond to, for example, a case in which the TA value is greater than or equal to a predetermined TA value, or a case in which a distance between the UE and a satellite is longer than or equal to a predetermined value of distance. The predetermined values may be configured via higher layer signaling or transmitted via an SIB, etc., or may be fixed values.

Method 4: a UE may report a TA value without a separate trigger from a base station. For example, Method 4 may be understood as that the UE transmits information indicating the TA value to the base station according to a specific condition. The specific condition corresponds to a condition relating to time for performing TA value reporting (without signaling such as DCI, a MAC CE, RRC, etc. for a separate trigger from the base station), a comparison result for a TA value applied by the UE and a specific threshold value, and/or the like. The specific condition may be predetermined.

In a case of transmitting the TA value as described above, the UE may transmit the TA value using a physical channel such as a PUCCH or PUSCH, or may transmit TA value information to the base station via higher layer signaling. When the UE transmits TA value information using a physical channel, a resource to be used for reporting TA value information may be configured via higher layer signaling.

The reference time point for determining a TA value reported by a UE and a time point for reporting the TA value may be determined based on a time at which the UE performs TA value reporting, a time point at which the TA value reporting is triggered, and/or the like. For example, if the TA value reporting is triggered via DCI in a slot n, the UE may report a TA value applied or calculated in a slot n-K to the base station. The UE may report, to the base station, the TA value in a slot n+N. Here, each of K and N may be a value which is determined according to subcarrier spacing or a UE capability, DL/UL configuration of slots, PUCCH resource configuration, and/or the like. In the above, K may be zero (K=0). Here, K is 0 (K=0) may denote that the UE reports the TA value based on a time point at which the UE receives a signal triggering the TA value reporting. Alternatively, K may be a value smaller than 0. This case may denote, for example, that the UE pre-calculates a TA value at a time point at which the UE reports the TA value, and generates report information based on the TA which is pre-calculated to report the report information. In addition, K may be a value greater than 0. This may denote that the UE reports a TA value at a time point before a time point (e.g., the slot n+N) at which the UE reports the TA value, and this is because there is a need for time required for the UE to encode information to be reported and prepare transmission.

Figure 37A:
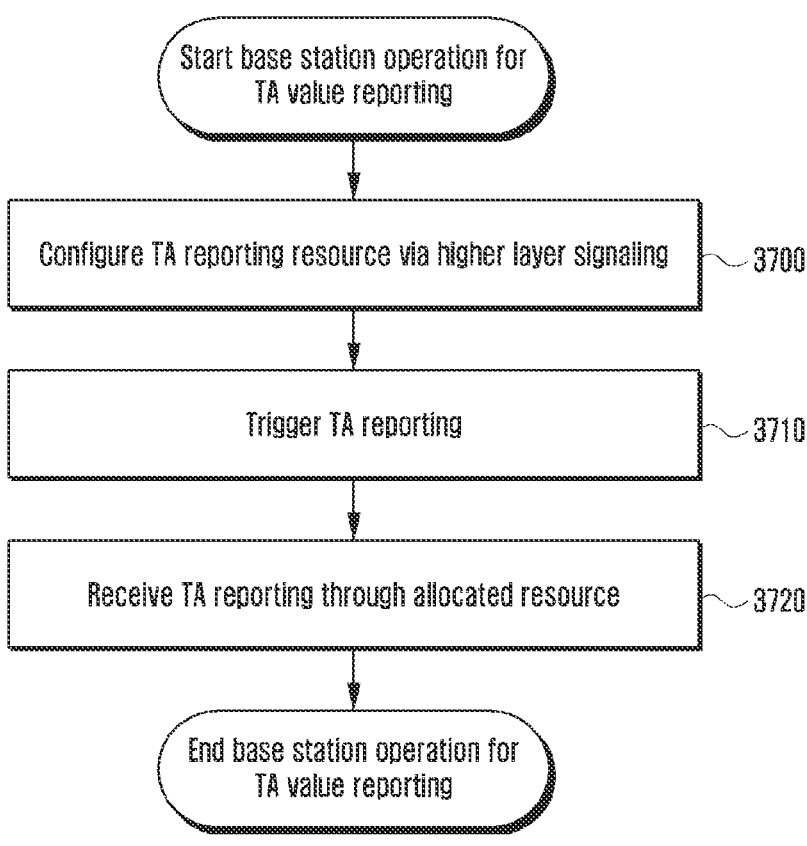
FIG. 37A illustrates an example of a base station operation for a TA value reporting of a UE.
Figure 37B:
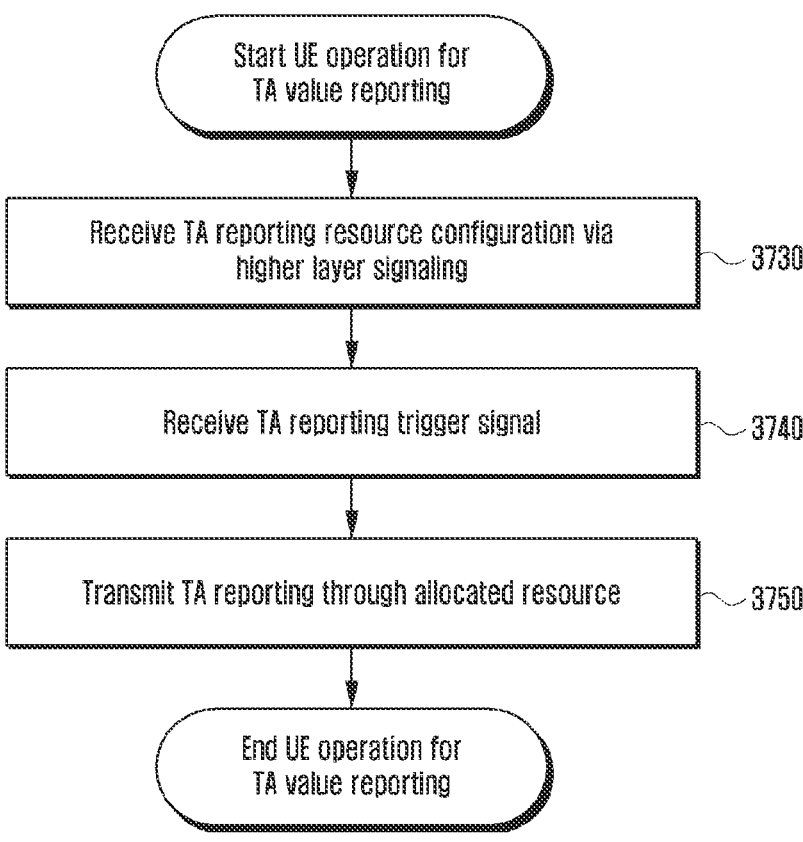
FIG. 37B illustrates an example of a UE operation for a TA value reporting of a UE.

FIGS. 37A and 37B illustrate an example of operations of the base station and the UE for reporting the TA value of the UE. When reporting the TA value of the disclosure, the TA value applied by the UE may be indicated in ms units, slot units, symbol units, or the like, or may be provided as information including a value after a decimal point rather than an integer. In the disclosure, the TA value reporting may include an absolute value of the TA value, however, the UE may also report a TA value indicated from a previous base station, a relative TA value excluding a determined TA value, or amount of change in a TA value (this may be, for example, the amount of change in the TA value for a predetermined period of time).

FIG. 37A illustrates an operation of a base station. A base station transmits configuration information related to TA reporting via higher layer signaling in operation 3700. Here, the configuration information related to TA reporting may include, for example, at least one of information for configuring TA reporting such as a period and an offset at which TA reporting is to be performed, a TA reporting trigger condition, TA reference time information, a type of TA to be reported, configuration information about a resource through which TA reporting is to be performed, and/or the like. The base station triggers TA reporting to the UE in operation 3710. Here, the TA reporting trigger for the UE may be performed, for example, via higher layer signaling or DCI, but may be omitted if necessary. The base station receives a TA report transmitted by the UE based on the transmitted configuration information in operation 3720. FIG. 37B illustrates an operation of a UE. A UE receives configuration information related to TA reporting transmitted by a base station via higher layer signaling in operation 3730. The configuration information related to TA reporting may include, for example, at least one of information for configuring TA reporting such as a period and an offset at which TA reporting is to be performed, a TA reporting trigger condition, TA reference time information, a type of TA to be reported, configuration information about a resource through which TA reporting is to be performed, and/or the like. The UE receives a signal triggering TA reporting which is transmitted by the base station in operation 3740. The signal triggering TA reporting may be transmitted, for example, via the higher layer signaling or DCIs, but may be omitted if necessary. The UE transmits a TA report based on the received configuration information in operation 3720. For example, in case that the UE receives information about a resource through which TA reporting is to be performed, the UE transmits the TA report through the configured resource. An order of operations shown in FIGS. 37A and 37B may be changed, other operations may be added to the operations, and at least one of the operations may be omitted.

Fourth Embodiment

The fourth embodiment provides a method and apparatus in which a UE configures a TA to 0 or a predetermined value.

When a satellite or base station from which a UE receives service is suddenly changed, the TA value to be applied by the UE for the next uplink transmission may be suddenly changed. For the reasons described above, a procedure for changing the TA value to be applied by the UE to 0 or a predetermined value may be required. In this case, the TA value may be initialized using the following methods.

Initializing the TA value in the disclosure may correspond to a method of configuring the TA value to 0, or a method of configuring the TA value to a value previously configured by DCI or higher layer signaling. In the disclosure, higher layer signaling may be signaling transmitted in layers such as a MAC, a PDCP, and an RRC, and may be a value pre-stored in memory or a pre-configured value.

Method 1: Based on the location of a satellite and a UE, the UE may initialize a TA when it is determined that a satellite (or a connected satellite) from which the UE receives a service is changed. In this case, the UE may report the TA value being applied by the UE itself to the base station.

Method 2: The base station may instruct TA initialization through DCI. In this method, TA initialization may be indicated by a specific bit field value of DCI or a combination of bit field values. For example, a field indicating TA initialization may be included in DCI. In this case, when the field of the received DCI is configured to be a specific value, the UE may understand that TA initialization is indicated. Alternatively, when the values of one or more (for example, other uses) fields included in the DCI are configured to be a predetermined value, the UE may understand that TA initialization is indicated.

Method 3: When the TA value applied by the UE exceeds a TA threshold, the UE may perform TA initialization, and the TA threshold may be a value preconfigured by higher layer signaling.

In the above, for convenience of explanation, the disclosure has been described separately from a first embodiment to a fourth embodiment, however, the first to fourth embodiments include operations related to each other, and therefore at least two of the embodiments may be combined. In addition, methods according to embodiments may not be mutually exclusive, and at least two of the methods may be combined and performed.

In order to perform the embodiments of the disclosure, a base station, a satellite, and a UE. or a transmission and reception method by a transmission terminal or a reception terminal are described. To this end, each of the base station, the satellite, and a receiver, a processor, and a transmitter of the UE should operate according to embodiments.

Figure 38:
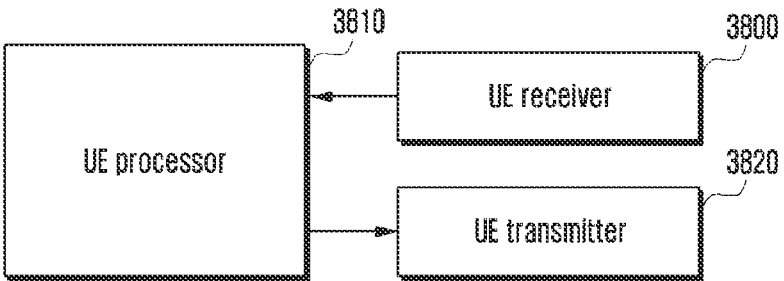
FIG. 38 is a block diagram illustrating an internal structure of a UE according to an embodiment of the disclosure.

Specifically, FIG. 38 is a block diagram illustrating an internal structure of a UE according to an embodiment of the disclosure. As shown in FIG. 32, a UE of the disclosure may include a UE receiver 3800, a UE transmitter 3820, and a UE processor 3810. The UE receiver 3800 and the UE transmitter 3820 may collectively be referred to as a transceiver according to an embodiment of the disclosure. The transceiver may transmit/receive signals to/from a base station. The signals may include control information and data. To this end, the transceiver may include an RF transmitter for frequency-up converting and amplifying transmitted signals and an RF receiver for low-noise amplifying and frequency-down converting received signals. In addition, the transceiver may receive signals via a radio channel, output the signals to the UE processor 3810, and may transmit signals output from the UE processor 3810 via a radio channel. The UE processor 3810 may control a series of processes for the UE to operate according to the above-described embodiments of the disclosure. For example, the UE receiver 3800 may receive a signal from a satellite or a terrestrial base station, and the UE processor 3810 may transmit/receive the signal to/from the base station according to the described method. Thereafter, the UE transmitter 3820 may transmit a signal at a determined time point.

Figure 39:
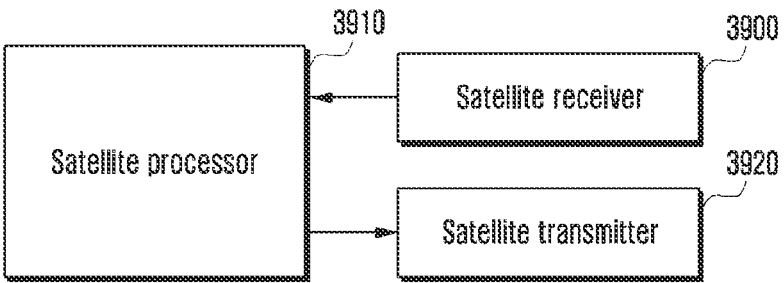
FIG. 39 is a block diagram illustrating an internal structure of a satellite according to an embodiment of the disclosure.

FIG. 39 is a block diagram illustrating an internal structure of a satellite according to an embodiment of the disclosure. As shown in FIG. 39, a satellite of the disclosure may include a satellite receiver 3900, a satellite transmitter 3920, and a satellite processor 3910. In the above, the receiver, the transmitter, and the processor may be implemented in the plural form. That is, a receiver and a transmitter for receiving and transmitting signals from and to a UE, and a receiver and a transmitter for receiving and transmitting signals from and to a base station (further, a receiver and a transmitter for receiving and transmitting signals from and to another satellite) may be implemented. The satellite receiver 3900 and the satellite transmitter 3920 may collectively be referred to as a satellite transceiver according to an embodiment of the disclosure. The transceiver may transmit/receive signals to/from the UE and the base station. The signals may include control information and data. To this end, the transceiver may include an RF transmitter for frequency-up converting and amplifying transmitted signals and an RF receiver for low-noise amplifying and frequency-down converting received signals. In addition, the transceiver may receive signals via a radio channel, output the signals to the satellite processor 3910, and transmit signals output from the satellite processor 3910 via a radio channel. The satellite processor 3910 may include a compensator (or a pre-compensator) for compensating for a frequency offset or Doppler shift, and a device for estimating a location from a GPS, and/or the like. The satellite processor 3910 may include a frequency shift function which may shift a central frequency of a received signal. The satellite processor 3910 may control a series of processes for the satellite, the base station, and the UE to be able to operate according to the above-described embodiments. For example, the satellite processor may be configured to determine the satellite receiver 3900 to receive, from the UE, a PRACH preamble, and to transmit TA information to the base station while transmitting again, to the UE, an RAR in response to the PRACH preamble. Thereafter, the satellite transmitter 3920 may transmit corresponding signals at a determined time point.

Figure 40:
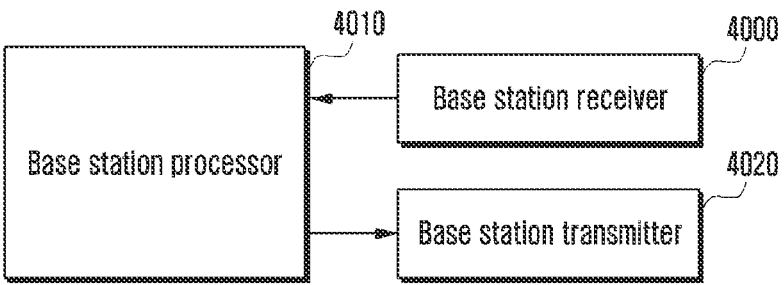
FIG. 40 is a block diagram illustrating an internal structure of a base station according to an embodiment of the disclosure.

FIG. 40 is a block diagram illustrating an internal structure of a base station according to an embodiment of the disclosure. As shown in FIG. 40, a base station of the disclosure may include a base station receiver 4000, a base station transmitter 4020, and a base station processor 4010. The base station may be a terrestrial base station or a part of a satellite. The base station receiver 4000 and the base station transmitter 4020 may collectively be referred to as a transceiver according to an embodiment of the disclosure. The transceiver may transmit/receive signals to/from a UE. The signals may include control information and data. To this end, the transceiver may include an RF transmitter for frequency-up converting and amplifying transmitted signals and an RF receiver for low-noise amplifying and frequency-down converting received signals. In addition, the transceiver may receive signals via a radio channel, output the signals to the base station processor 4010, and may transmit signals output from the base station processor 4010 via a radio channel. The base station processor 4010 may control a series of processes for the base station to be able to operate according to the above-described embodiments. For example, the base station processor 4010 may transmit an RAR including TA information.

As an example, provided is a method by a UE in a communication system, the method including: receiving downlink control information including first timing advance (TA) loop index information from a base station; identifying a first TA value corresponding to a first TA loop index identified based on the first TA loop index information; and transmitting uplink data based on the downlink control information by applying the first TA value, wherein the downlink control information further includes uplink data scheduling information.

In addition, provided is a method by a base station in a communication system, the method including: transmitting downlink control information including first timing advance (TA) loop index information to a UE; and receiving uplink data according to the downlink control information, wherein the TA, based on which the uplink data transmission is performed, corresponds to a first TA value corresponding to a first TA loop index identified based on the first TA loop index information, and the downlink control information further includes uplink data scheduling information.

Further, provided is a UE in a communication system, the UE including a transceiver, and a controller configured to: receive downlink control information including first timing advance (TA) loop index information from a base station; identify a first TA value corresponding to a first TA loop index identified based on the first TA loop index information; and transmit uplink data based on the downlink control information by applying the first TA value, wherein the downlink control information further includes uplink data scheduling information.

In addition, provided is a base station in a communication system, the base station including a transceiver, and a controller configured to perform further control to transmit downlink control information including first timing advance (TA) loop index information to a UE; and receive uplink data according to the downlink control information, wherein the TA, based on which the uplink data transmission is performed, corresponds to a first TA value corresponding to a first TA loop index identified based on the first TA loop index information, and the downlink control information further includes uplink data scheduling information.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. Further, other variants of the above embodiments, based on the technical idea of the embodiments, may also be implemented in LTE or 5G systems.

The invention claimed is:

1. A method performed by a base station in a communication system, the method comprising:

transmitting, to a user equipment (UE), configuration information on a non-terrestrial network (NTN) communication;

receiving, from the UE, an uplink signal associated with a timing advance (TA);

receiving, from the UE, a TA report via a medium access control (MAC) control element (CE), wherein the TA report is triggered based on a threshold value for the TA report configured by the base station, wherein the TA report includes a value of a TA that the UE calculates, and the value of the TA included in the TA report is determined with reference to a timing of TA reporting, and wherein the value of the TA is associated with a first offset common for plural UEs and a second offset specific for the UE.

2. The method of claim 1, wherein the first offset is based on a rate of change of the TA, and the second offset is based on higher layer signaling.

3. The method of claim 1, wherein the value of the TA included in the TA report is indicated in slot units.

4. The method of claim 1, wherein the threshold value for the TA report is transmitted via higher layer signaling.

5. A method performed by a user equipment (UE) in a communication system, the method comprising:

receiving, from a base station, configuration information on a non-terrestrial network (NTN) communication;

identifying a value of a timing advance (TA);

transmitting an uplink signal by applying the value of the TA;

identifying that a TA report is triggered based on a threshold value for the TA report configured by the base station; and transmitting, to the base station, the TA report via a medium access control (MAC) control element (CE), wherein the TA report includes the value of the TA that the UE calculates, and the value of the TA included in the TA report is determined with reference to a timing of TA reporting, and wherein the value of the TA is associated with a first offset common for plural UEs and a second offset specific for the UE.

6. The method of claim 5, wherein the first offset is based on a rate of change of the TA, and the second offset is based on higher layer signaling.

7. The method of claim 5, wherein the threshold value for the TA report is configured via higher layer signaling.

8. The method of claim 5, wherein the value of the TA included in the TA report is indicated in slot units.

9. A base station in a communication system, the base station comprising:

a transceiver; and a controller coupled with the transceiver and configured to:

transmit, to a user equipment (UE), configuration information on a non-terrestrial network (NTN) communication, receive, from the UE, an uplink signal associated with a timing advance (TA), and receive, from the UE, a TA report via a medium access control (MAC) control element (CE), wherein the TA report is triggered based on a threshold value for the TA report configured by the base station, wherein the TA report includes a value of the TA that the UE calculates, and the value of the TA included in the TA report is determined with reference to a timing of TA reporting, and wherein the value of the TA is associated with a first offset common for plural UEs and a second offset specific for the UE.

10. The base station of claim 9, wherein the first offset is based on a rate of change of the TA, and the second offset is based on higher layer signaling.

11. The base station of claim 9, wherein the value of the TA included in the TA report is indicated in slot units.

12. The base station of claim 9, wherein the threshold value for the TA report is transmitted via higher layer signaling.

13. A user equipment (UE) in a communication system, the UE comprising:

a transceiver; and a controller coupled with the transceiver and configured to:

receive, from a base station, configuration information on a non-terrestrial network (NTN) communication, identify a value of a timing advance (TA), transmit an uplink signal by applying the value of the TA, identify that a TA report is triggered based on a threshold value for the TA report configured by the base station, and transmit, to the base station, the TA report via a medium access control (MAC) control element (CE), wherein the TA report includes the value of the TA that the UE calculates, and the value of the TA included in the TA report is determined with reference to a timing of TA reporting, and wherein the value of the TA is associated with a first offset common for plural UEs and a second offset specific for the UE.

14. The UE of claim 13, wherein the first offset is based on a rate of change of the TA, and the second offset is based on higher layer signaling.

15. The UE of claim 13, wherein the value of the TA included in the TA report is indicated in slot units.

16. The UE of claim 13, wherein the threshold value for the TA report is configured via higher layer signaling.

* * * * *